US008121914B1

(12) United States Patent
Drummond et al.

(10) Patent No.: US 8,121,914 B1
(45) Date of Patent: Feb. 21, 2012

(54) AUTOMATED BANKING MACHINE CUSTOMER PROFILE METHOD

(75) Inventors: Jay Paul Drummond, Massillon, OH (US); Bob A. Cichon, Norton, OH (US); David Weis, Boynton Beach, FL (US); James R. Church, Kent, OH (US); Mikal R. Gilger, Wadsworth, OH (US); Jagadesh Myana, North Canton, OH (US); Todd Blakeslee, Canton, OH (US); Aravind Dongara, Sunnyvale, CA (US); Mark A. Moales, Grantham, NH (US); Radhika Reddy Bodapatla, Fairborn, OH (US)

(73) Assignee: Diebold, Incorporated, North Canton, OH (US)

( * ) Notice: Subject to any disclaimer, the term of this patent is extended or adjusted under 35 U.S.C. 154(b) by 3176 days.

(21) Appl. No.: 09/639,310

(22) Filed: Aug. 14, 2000

Related U.S. Application Data

(63) Continuation-in-part of application No. 09/193,787, filed on Nov. 17, 1998, now Pat. No. 7,624,050, which is a continuation-in-part of application No. PCT/US97/21422, filed on Nov. 25, 1997.

(60) Provisional application No. 60/031,956, filed on Nov. 27, 1996, provisional application No. 60/149,765, filed on Aug. 19, 1999, provisional application No. 60/091,887, filed on Jul. 7, 1998, provisional application No. 60/095,626, filed on Aug. 7, 1998, provisional application No. 60/098,907, filed on Sep. 2, 1998.

(51) Int. Cl.
*G06Q 40/00* (2006.01)
(52) U.S. Cl. ........................................................ 705/35
(58) Field of Classification Search .................. 235/379, 235/380; 705/35–44, 79, 26; 379/91.01; 109/2; 400/621, 708; 455/406; 713/201
See application file for complete search history.

(56) References Cited

U.S. PATENT DOCUMENTS 3,970,992 A    7/1976  Boothroyd et al.
(Continued)

FOREIGN PATENT DOCUMENTS

EP    000219880 A2    4/1987
(Continued)

OTHER PUBLICATIONS

Minhas, Raj Singh et al., Benefit Segmentation by Factor Analysis: An Improved Method of Targeting Customers for Financial Services, International Journal of Bank Marketing, 1996, vol. 14, Issue 3, p. 3, 11p, 5 charts.*

(Continued)

*Primary Examiner* — Olabode Akintola
(74) *Attorney, Agent, or Firm* — Ralph E. Jocke; Daniel D. Wasil; Walker & Jocke

(57) ABSTRACT

A method for visual programming an automated transaction machine (12). The method includes the creation of terminal directors (225) that generally correspond to transactions performed by the automated transaction machine. The terminal directors are programmed by visually creating associations (238) between a plurality of ATM objects (230, 232) in a work space (224). Exemplary ATM objects include an authorization object (260), a back stage control object (262), a card reader object (264), a customer profile object (266), a depositor object (268), a dispenser object (270), keypad object (272), a logic object (274), a OCS object (276), a presenter object (278), a PIN entry object (280), a printer object (282), a sync object (284), and a transaction data object (286). The customer profile object is operative to retrieve customer profile information responsive to a determined customer of a person using the ATM. A portion of the exemplary ATM objects are operative to interface with a device interface layer (728) for communicating with physical hardware devices (724, 726). The device interface layer is operative to retrieve rules (721) and capability features from a data store (720) for automatically switching between two or more different devices of similar type when one of the devices becomes inoperative.

10 Claims, 48 Drawing Sheets

U.S. PATENT DOCUMENTS

| | | | |
|---|---|---|---|
| 4,091,448 A * | 5/1978 | Clausing | 235/379 |
| 4,114,027 A | 9/1978 | Slater et al. | |
| 4,317,957 A | 3/1982 | Sendrow | |
| 4,641,239 A | 2/1987 | Takesako | |
| 4,660,168 A | 4/1987 | Grant et al. | |
| 4,803,347 A | 2/1989 | Sugahara et al. | |
| 5,220,501 A * | 6/1993 | Lawlor et al. | 705/40 |
| 5,315,511 A | 5/1994 | Matsuura et al. | |
| 5,336,870 A * | 8/1994 | Hughes et al. | 235/379 |
| 5,367,609 A * | 11/1994 | Hopper et al. | 704/278 |
| 5,389,773 A | 2/1995 | Coutts et al. | |
| 5,465,206 A | 11/1995 | Hilt et al. | |
| 5,539,825 A * | 7/1996 | Akiyama et al. | 380/24 |
| 5,546,523 A * | 8/1996 | Gatto | 715/811 |
| 5,619,558 A * | 4/1997 | Jheeta | 379/90 |
| 5,642,485 A * | 6/1997 | Deaton et al. | 705/14 |
| 5,742,845 A * | 4/1998 | Wagner | 710/11 |
| 5,761,662 A * | 6/1998 | Dasan | 707/10 |
| 5,787,403 A | 7/1998 | Randle | |
| 5,881,268 A | 3/1999 | McDonald et al. | |
| 5,915,246 A * | 6/1999 | Patterson et al. | 705/43 |
| 5,937,396 A | 8/1999 | Konya | |
| 5,974,451 A * | 10/1999 | Simmons | 709/218 |
| 5,987,439 A | 11/1999 | Gustin et al. | |
| 6,003,019 A | 12/1999 | Eaton et al. | |
| 6,049,812 A * | 4/2000 | Bertram et al. | 707/516 |
| 6,055,514 A * | 4/2000 | Wren | 705/27 |
| 6,085,177 A * | 7/2000 | Semple et al. | 705/43 |
| 6,115,737 A * | 9/2000 | Ely et al. | 709/203 |
| 6,304,860 B1 * | 10/2001 | Martin, Jr. et al. | 705/43 |
| 6,850,996 B2 * | 2/2005 | Wagner | 710/33 |

FOREIGN PATENT DOCUMENTS

| | | | |
|---|---|---|---|
| GB | 2083259 A | | 3/1982 |
| JP | 357005169 A | | 1/1982 |
| WO | WO 9912091 | * | 3/1999 |

OTHER PUBLICATIONS

Bosco, Pearl, Knowledge is Power, Profit: Beefing Up Customer Profiles With Market Savvy, American Banker, Aug. 18, 1997, vol. 162, Issue 158, p6A, 2p.*

Sweeney, Paul, U.S. Banker, Jun. 2001, vol. 111, Issue 6, p52, 3p.*

* cited by examiner

242 Source Object
243 Source Event
244 Target Object
245 Target Method

| Icon | OPTInet bean | Description |
|---|---|---|
|  | Authorize | Interacts with Authorization Plug-In to manage Authorization, Commit, and Reverse requests to the authorization agent. |
|  | BackStageControl | Uses the services of DirectorManager to control the URL property of the browser, to load directors, and to receive events from the browser. |
|  | CardRead | Device Control |
|  | Customer Profile | Interacts with the CustomerProfile Plug-ins to capture and retrieve information about a customer. |
|  | Depositor | Device Control |
|  | Dispenser | Device Control |
|  | Keypad | Device Control |
|  | Logic bean | Determines the truth value of comparisons between two operands. |
|  | OCS bean | Interacts with the OCS Server and the Command/Status Plug-In so that host commands and host command responses can be processed by directors. |
|  | Presenter | Device Control |
|  | PINEntry | Interacts with the PINEntryEvent Server to manage the PIN Entry mode. |
|  | Printer | Device Control |
|  | Sync | Synchronizes two forked processing paths and provides a timer for one or two processing paths. |
|  | TransactionData | Provides a repository of data that can be shared among directors, the browser, and the authorization agent. |

FIG. 39

AUTOMATED BANKING MACHINE CUSTOMER PROFILE METHOD

This application claims the benefit of U.S. Provisional Application No. 60/149,765 filed Aug. 19, 1999, and is a continuation-in-part of U.S. application Ser. No. 09/193,787 filed Nov. 17, 1998 now U.S. Pat. No. 7,624,050, which claims the benefit of U.S. Provisional Application Nos. 60/091,887 filed Jul. 7, 1998; 60/095,626 filed Aug. 7, 1998; and 60/098,907 filed Sep. 2, 1998, and which is a continuation-in-part of U.S. application Ser. No. 09/077,337, filed May 27, 1998, which was the National Stage of International Application No. PCT/US97/21422, filed Nov. 25, 1997, which claims the benefit of U.S. Provisional Application No. 60/031,956, filed Nov. 27, 1996.

TECHNICAL FIELD

This invention relates to automated banking machines. Specifically this invention relates to an automated banking machine apparatus and system that are capable of use in a wide area network, which provides a user with a familiar interface from their home institution at banking machines operated by other institutions, and which provides greater options for machine outputs.

BACKGROUND ART

Automated banking machines are well known. A common type of automated banking machine used by consumers is an automated teller machine ("ATM"). ATMs enable customers to carry out banking transactions. Common banking transactions that may be carried out with ATMs include the dispensing of cash, the receipt of deposits, the transfer of funds between accounts, the payment of bills and account balance inquiries. The type of banking transactions a customer can carry out are determined by capabilities of the particular banking machine and the programming of the institution operating the machine. Other types of automated banking machines may allow customers to charge against accounts or to transfer funds. Other types of automated banking machines may print or dispense items of value such as coupons, tickets, wagering slips, vouchers, checks, food stamps, money orders, scrip or travelers checks. For purposes of this disclosure an automated banking machine or automated transaction machine shall encompass any device which carries out transactions including transfers of value.

Currently ATMs are operated in proprietary communications networks. These networks interconnect ATMs operated by financial institutions and other entities. The interconnection of the networks often enables a user to use a banking machine operated by another institution if the foreign institution's banking machine is interconnected with the network that includes the user's institution. However when the customer operates the foreign institution's machine the customer must operate the machine using the customer interface that has been established by the foreign institution for its banking machines. In addition the user is limited to the transaction options provided by the foreign institution.

A customer may encounter difficulties when using a foreign institution's machine. Problems may occur because the user is not familiar with the type of machine operated by the foreign institution. Confusion may result because the customer does not know which buttons or other mechanisms to actuate to accomplish the desired transactions. The transaction flow for a customer at a foreign institution machine may be significantly different from machines operated by the user's home institution. This may be particularly a problem when the user is from another country and is not familiar with the type of banking machine or the language of the interface provided by the foreign institution. Likewise, the documents which are printed by printers in an automated banking machine are generally limited to a limited group of defined formats in a single language.

A foreign institution may also provide different types of transactions than the user is familiar with at their home institution. For example the user's home institution may enable the transfer of funds between accounts through their automated banking machines, to enable the user to maintain funds in higher interest bearing accounts until they are needed. If the foreign institution does not provide this capability, the user will be unable to do this when operating the foreign machine. The inability of a user at a foreign machine to conduct the transactions that they are accustomed to may present problems.

The networks that operate automated teller machines and other types of automated banking machines generally operate proprietary networks to which access is restricted. This is necessary to prevent fraud or tampering with the network or user's accounts. Proprietary networks are also generally used for the transmission of credit card messages and other financial transaction messages. Access to such credit card processing systems is also restricted primarily for purposes of maintaining security.

Communication over wide area networks enables messages to be communicated between distant locations. The best known wide area network is the Internet which can be used to provide communication between computers throughout the world. The Internet has not been as widely used for financial transaction messages because it is not a secure system. Messages intended for receipt at a particular computer address may be intercepted at other addresses without detection. Because the messages may be intercepted at locations that are distant in the world from the intended recipient, there is potential for fraud and corruption.

Companies are beginning to provide approaches for more secure transmission of messages on the Internet. Encryption techniques are also being applied to Internet messages. However the openness of the Internet has limited its usefulness for purposes of financial messages, particularly financial messages associated with the operation of automated banking machines.

Messages in wide area networks may be communicated using the Transmission Control Protocol/Internet protocol ("TCP/IP"). U.S. Pat. No. 5,706,422 shows an example of a system in which financial information stored in databases is accessed through a private wide area network using TCP/IP messages. The messages transmitted in such networks which use TCP/IP may include "documents" (also called "pages"). Such documents are produced in Hypertext Markup Language ("HTML") which reference to mark up language herein being to a type of programming language used to produce documents with commands or "tags" therein. The tags are codes which define features and/or operations of the document such as fonts, layout, imbedded graphics and hypertext links. Mark up language documents such as HTML documents are processed or read through use of a computer program referred to as a "browser". The tags tell the browser how to process and control what is seen on a screen and/or is heard on speakers connected to the computer running the browser when the document is processed. HTML documents may be transmitted over a network through the Hypertext Transfer Protocol ("HTTP"). The term "Hypertext" is a reference to the ability to embed links into the text of a document that allow communication to other documents which can be accessed in the network.

Thus there exists a need for an automated banking machine and system that can be used in a wide area network such as the Internet while providing a high level of security. There further exists a need for an automated banking machine and system which provides a user with the familiar interface and transaction options of their home institution when operating foreign institution machines. There further exists a need for a machine which may provide more transaction options and types of promotional and printed materials to users.

DISCLOSURE OF INVENTION

It is an object of the present invention to provide an automated banking machine at which a user may conduct transactions.

It is a further object of the present invention to provide an automated banking machine that may be operated through connection to a wide area network.

It is a further object of the present invention to provide an automated banking machine and system that provides a user with a familiar interface and transaction options of their home institution at machines operated by foreign institutions.

It is a further object of the present invention to provide an automated banking machine that communicates using HTML documents and TCP/IP messages.

It is a further object of the present invention to provide an automated banking machine that enables the connection of the banking machine to a user's home institution through mark up language documents and TCP/IP messages generated responsive to indicia on a card input by a user.

It is a further object of the present invention to provide an automated banking machine and system that accomplishes transactions over a wide area network while maintaining a high level of security.

It is a further object of the present invention to provide an automated banking machine and system that controls connection of the banking machine to foreign addresses through a proxy server.

It is a further object of the present invention to provide an automated banking machine that limits the operation of devices in the machine through a local device server.

It is a further object of the present invention to provide an automated banking machine and system that is operable through connection to the Internet.

It is a further object of the present invention to provide an automated banking machine that may be used to provide a user with more types of messages including messages targeted to particular users.

It is a further object of the present invention to provide an automated banking machine which is capable of providing users with a wider variety of printed documents.

It is a further object of the present invention to provide an automated banking machine which provides additional options for identifying authorized users.

It is a further object of the present invention to provide an automated banking machine that can be used in connection with existing transaction systems while providing enhanced functionality.

It is a further object of the present invention to provide an automated banking machine which provides enhanced diagnostic and service capabilities.

It is a further object of the present invention to provide an automated banking machine which performs transactions at a rapid pace.

It is a further object of the present invention to provide improved systems in which automated banking machines are used.

It is a further object of the present invention to provide improved methods of operation for automated banking machines and systems.

Further objects of the present invention will be made apparent in the following Best Modes for Carrying Out Invention and the appended Claims.

The foregoing objects are accomplished in an exemplary embodiment of the invention by an automated banking machine that includes output devices such as a display screen, and input devices such as a touch screen and/or a keyboard. The banking machine further includes devices such as a dispenser mechanism for sheets of currency, a printer mechanism, a card reader/writer, a depository mechanism and other transaction function devices that are used by the machine in carrying out banking transactions.

The banking machine is in operative connection with at least one computer. The computer is in operative connection with the output devices and the input devices, as well as with the sheet dispenser mechanism, card reader and other physical transaction function devices in the banking machine. The computer includes software programs that are executable therein. The software includes a document handling portion for handling HTML or other documents. The document handling portion operates to send and receive HTML documents and HTTP messages. The HTML document handling portion is preferably in operative connection with the output device to display screens including hypertext link indicators. The document handling portion is also preferably in operative connection with the input device which enables user selection and the generation of response messages from the computer. The document handling portion preferably operates in connection with a JAVA software environment and has the capability of executing instructions in JAVA script transmitted with documents.

The software in the computer of the exemplary embodiment further preferably includes a device application portion. The device application portion includes software that is operative to control the sheet dispenser and other devices. In the exemplary form of the invention the device application portion includes a plurality of JAVA applets for operating devices in the machine.

The computer in the exemplary automated banking machine further includes a device interfacing software portion. The device interfacing software portion operates to receive messages from the device application portion and to cause the devices to operate through appropriate hardware interfaces. In one exemplary form of the automated banking machine, the document handling portion, device application portion and device interfacing software portion each reside on the same computer and communicate at different IP ports.

The automated banking machine of the invention in one exemplary configuration communicates using TCP/IP messages in an intranet which includes a plurality of such machines. The intranet is in turn connected to at least one computer which is operated by a home institution. The home institution is the entity that operates the banking machines.

The computer of the home institution preferably includes a home HTTP server, a proxy server and a device server. The proxy server communicates through the intranet with the document handling portion of the software in each of the banking machines. The proxy server is also connectable to a wide area network, such as the Internet, to which foreign servers are connected. The device server is operative to pass messages between the device application portion and the device interfacing software portion of the banking machines. The device server may include monitor software which monitors and selectively limits the use and operation of the devices in the banking machine. This provides a level of security.

The automated banking machine and system of an exemplary embodiment is operative to place a user in connection with the institution where they have their accounts. This can be either the home institution that operates the banking machine where the user is present, or a foreign institution which is connected to the wide area network. To operate the banking machine a user provides inputs which correspond to an address, such as a URL address, through an address input device. The document handling portion operates to cause the banking machine to be connected to the server corresponding to that address. This may be accomplished in an exemplary embodiment by the user having indicia representative of the address on a card that is read by a card reader in the banking machine, or other input device which identifies the user or an institution or entity with which the user has accounts.

The document handling portion is responsive to the address on the card or other input data to connect through the proxy server to the user's institution. If the user's home institution address corresponds to the home server, the banking machine operates responsive to messages from the home server. If however the user's input address corresponds to an address of a foreign server, the proxy server is operative to communicate through the wide area network with the foreign server at the customer's home institution. If the customer causes the machine to connect a server operated by a foreign institution, the documents sent from the foreign institution correspond to those normally provided by the foreign institution. As a result the customer is familiar with the interface produced by these documents and will be able to more readily operate the banking machine.

The foreign server or home server operates the banking machine by sending documents that include instructions which enable operation of the devices in the banking machine. The instructions are transmitted from the document handling portion to the device application portion of the software, which operates the devices in response to the instructions. The instructions from the device application portion to the devices in the automated banking machine are passed through the device server of the home institution. This helps to maintain security. In addition, the proxy server may include screening software which limits the foreign servers which may connect to and operate the banking machine. This is referred to as a "fire wall."

Embodiments of the present invention also provide enhanced user interfaces and for the printing of a wide variety of documents with the banking machine. The invention also enables achieving enhanced functionality while utilizing existing transaction networks and automated transaction machines.

BRIEF DESCRIPTION OF DRAWINGS

FIGS. 3 through 18 schematically represent steps in a transaction carried out at the banking machine with the computer system of the home bank.

FIGS. 19 through 24 schematically represent steps in a transaction carried out at the banking machine with the computer system of the foreign bank.

FIG. 39 is a chart representative of ATM objects and associated visual icons.

BEST MODES FOR CARRYING OUT INVENTION

Figure 1:
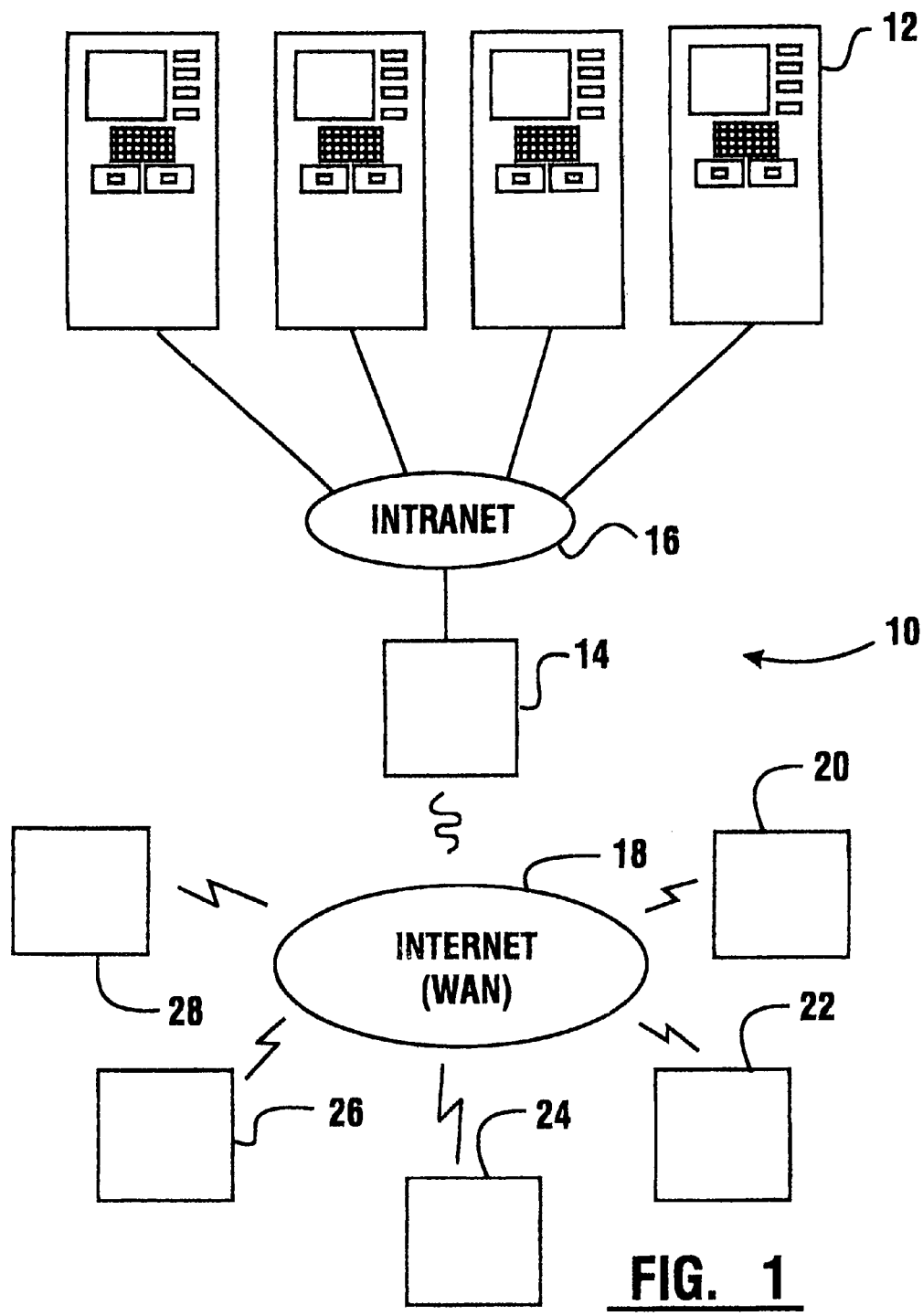
FIG. 1 is a schematic view of a network configuration including an exemplary embodiment of the automated banking machine apparatus and system of the present invention.

Referring now to the drawings and particularly to FIG. 1, there is shown therein a network configuration schematically indicated 10, which includes the automated banking machine apparatus and system of one exemplary embodiment of the present invention. Network 10 includes a plurality of automated banking machines 12 which in the exemplary system are ATMs. ATMs 12 are connected to a computer system of a home bank schematically indicated 14. Home bank computer system 14 is the computer system that is operated by the bank or other institution which has primary responsibility for the ATMs 12. Home bank computer system 14 is connected to the ATMs 12 through an intranet 16. Intranet 16 is preferably a local or proprietary network that provides communication between the computer system 14 and the banking machines 12 using messages in the transmission control protocol/internet protocol ("TCP/IP") format.

The messages that are communicated through the intranet 16 in the exemplary embodiment are preferably TCP/IP messages and hypertext mark up language ("HTML") documents. In one exemplary embodiment of the invention the HTML documents sent through intranet 16 include embedded object oriented programming instructions, preferably in the JAVA® format which has been developed by Sun Microsystems. The messages sent through intranet 16 may be sent in an encrypted or unencrypted form depending on the nature of the system and the security needs of the home bank.

It should be understood that embodiments of the invention may process other forms of documents which include tags or instructions therein. For example a form of "extended" HTML ("XML") has recently been developed which may be used in embodiments of the invention. For purposes of the invention all such forms of languages and variants which include documents, which documents include instructions therein shall be referred to as mark up language documents. Likewise, while JAVA® is used in the described embodiment, other programming languages may be used. For example, Active-X™ developed by Microsoft Corporation or other languages may be used in other embodiments. Further it should be understood that the instructions included in documents may be operative to cause a computer to access other documents, records or files at other addresses to obtain a program to carry out an operation.

Home bank computer system 14 is also connectable as shown to a wide area network 18. In some embodiments of the invention the wide area network 18 is the Internet. In other embodiments of the invention, other wide area networks may be used. The wide area network preferably communicates messages in TCP/IP between numerous computer systems connected to the wide area network. These foreign computer systems are schematically represented by servers 20, 22, 24, 26 and 28. It should be understood that servers 20 through 28 may be operated by or connected to other financial institutions throughout the world. Servers 20 through 28 preferably operate by communicating mark up language documents and other HTTP messages.

Figure 2:
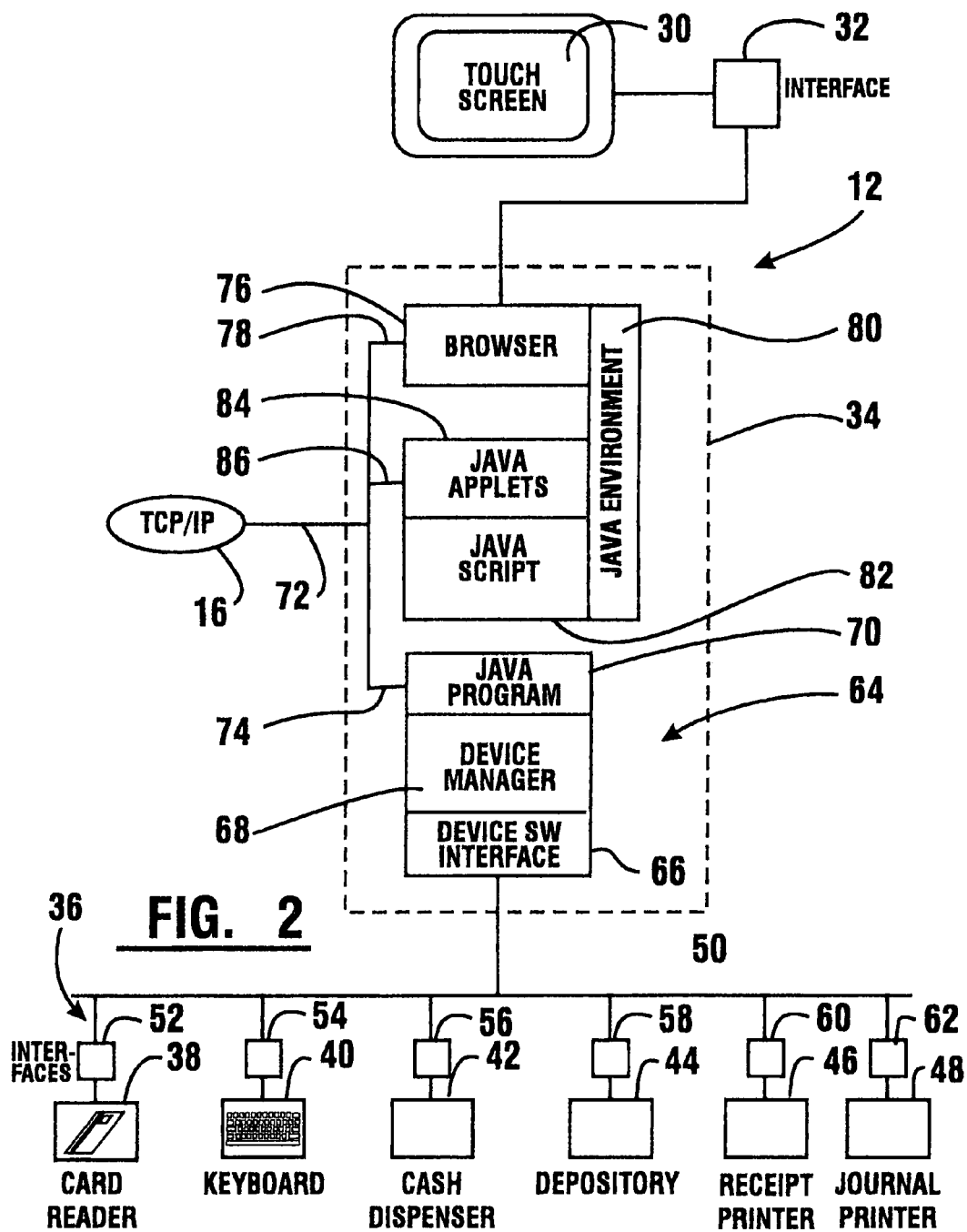
FIG. 2 is a schematic view of the exemplary embodiment of an automated banking machine of the present invention.

FIG. 2 shows a schematic view of the ATM 12 used in connection with one exemplary embodiment of the invention. ATM 12 includes a touch screen 30. Touch screen 30 includes a display screen which serves as an output device for communication with a user of the machine. Touch screen 30, because it is a touch screen, also serves as an input device for receiving input instructions from a user. Touch screen 30 is connected through an interface 32 to at least one computer 34 which is preferably housed within the machine. Alternative embodiments of the invention may include other types and/or additional output devices such as audio speakers.

Computer 34 is also in connection with a plurality of transaction function devices 36 which are included in ATM 12. Devices 36 include for example, a reader such as a card reader/writer mechanism 38 and a keyboard 40. Devices 36 further include a sheet dispenser mechanism 42 which is operative to dispense sheets, which in some preferred forms of the invention are currency or bank notes. Devices 36 also include a depository 44 for accepting deposits into a secure location in the machine. Deposits in embodiments of the invention may include sheets such as notes and checks, and/or items of value housed in containers such as deposit envelopes. A receipt printer 46 for providing transaction receipts to customers is also included among devices 36. A journal printer 48 is also included among the devices for keeping a hard copy record of transaction information. In other embodiments other or additional transaction function devices which carry out other transaction functions may be used. Other embodiments may include fewer transaction function devices. It should be further understood that while the described embodiment of the invention is an automated banking machine, the principles of the invention may be employed in many types of transaction machines that do not necessarily carry out banking transactions.

Each of the devices is operatively connected to an internal control bus 50 within the banking machine 12. The control bus 50 outputs the internal messages to the particular devices. Each device has an appropriate hardware interface which enables the particular device to operate to carry out its respective function in response to the messages transmitted to it on control bus 50. Card reader/writer 38 has a hardware interface schematically shown as 52. Hardware interfaces 54, 56, 58, 60 and 62 are respectively operative to connect keyboard 40, sheet dispenser mechanism 42, depository mechanism 44, receipt printer mechanism 46 and journal printer mechanism 48 to the control bus 50.

Computer 34 has several software programs that are executable therein. In the exemplary embodiment of the invention these software programs include a device interfacing software portion generally indicated 64. Device interfacing software portion 64 preferably includes a software device interface 66 that causes the computer to communicate electronic messages through the control bus 50. The device interface software portion 64 also preferably includes a device manager 68. The device manager is preferably operative to manage the various devices 36 and to control their various states so as to be assured that they properly operate in sequence. The device manager is also preferably operative to communicate with software device objects so as to enable operation of the devices responsive to at least one object-oriented program 70. Device interfacing software portion 64 also includes the object oriented program portion 70, which in one exemplary embodiment is an application written in the JAVA language. Program 70 works in conjunction with the device manager to receive messages which cause the devices to operate, and to transmit device operation messages indicative of a manner in which devices are operating and/or are receiving input data.

The device interfacing software portion 64 in the described embodiment operates on computer 34 and communicates through a physical TCP/IP connection 72 with the intranet 16. The physical connection may be analog dial-up, serial port, ISDN connection or other suitable connection. In the configuration of the system as shown, device interfacing software portion 64 communicates at the IP address of computer 34 and at an IP port or socket indicated 74 that is different from the other software applications. In other embodiments of the invention, device interfacing software portion 64 may operate in a different computer than the other software applications.

It should further be understood that although in the exemplary embodiment of the invention the device interfacing portion 64 is software, in other embodiments of the invention all or portions of the instruction steps executed by software portion 64 may be resident in firmware or in other program media in connection with one or more computers, which are operative to communicate with devices 36. For purposes of the invention all such forms of executable instructions shall be referred to as software.

Other software also operates in computer 34. This software includes document handling software which includes a browser, schematically indicated 76. In one exemplary embodiment of the invention the document handling software includes a Netscape Navigator® browser provided by Netscape Communications. However in other embodiments other document handling and communicating software and browser software, such as Hot JAVA® by Sun Microsystems or Internet Explorer™ from Microsoft, may be used. Browsers used in embodiments of the invention may be operative to process documents and cause a computer to produce outputs that can be used to produce visible outputs on a screen, as well as other types of signals or messages. In the exemplary embodiment browser 76 communicates in computer 34 at an IP port indicated by 78.

Browser 76 is in operative connection with JAVA environment software 80 which enables computer 34 to run JAVA language programs. JAVA language programs have the advantage that they may operate the same on a variety of hardware platforms without modification. This "write once\run anywhere" capability makes the JAVA environment well-suited for the described embodiment of the invention. However other embodiments may use different types of software programs.

The JAVA environment software 80 enables computer 34 to execute instructions in JAVA script, schematically indicated 82. The instructions that are executed by the computer in JAVA script are preferably embedded JAVA script commands that are included in HTML documents which are received through the browser 76. In this exemplary embodiment the browser 76 in connection with the JAVA environment software 80 which executes instructions in the embedded JAVA script 82, serve as an HTML document handling software portion for transmitting and receiving HTML documents and TCP/IP messages through the IP port indicated by 78. In other embodiments other browsers and/or software may be used for handling HTML documents.

Computer 34 also has software executable therein having a device application portion 84. The device application portion 84 contains executable instructions related to operation of the devices 36. In the exemplary embodiment of the invention, the device application portion includes a plurality of JAVA applets. In the described embodiment the applets are also preferably programs operable to control and keep track of the status of the devices with which they are associated. Certain applets are also preferably operable to configure the browser to communicate messages. Certain applets manage security and authenticate entities that use the ATM.

In the described form of the invention, JAVA applets are associated with functions such as enabling the card reader mechanism, notifying the browser when a user's card data has been entered, operating the receipt printer mechanism, operating the journal printer mechanism, enabling the customer keyboard and receiving data input through the keyboard, operating the sheet dispenser mechanism, operating the depository, navigating to document addresses, timing device functions, verifying digital signatures, handling encryption of messages, controlling the mix of bills dispensed from multiple sheet dispenser mechanisms, calculating foreign exchange, and ending a transaction and instructing the browser to return to communication with the home server. Of course in other embodiments, other applets may be used to control devices and use data to carry out various desired functions with the machine. The device application portion 84 communicates in the computer 34 at an IP port indicated 86.

In the described embodiment of the invention, the device application portion 84 of the software does not communicate its messages directly to the device interfacing software portion 64. As later explained, this is one approach to providing heightened security. However it should be understood that embodiments of the invention may provide for the device application portion 84 to directly communicate device operation messages to the device program 70. This may be done either internally using TCP/IP, by delivery of messages in a conventional manner through a queue established in the operating system of the computer that is associated with the software that interfaces with the devices, or by direct call to this software.

From the foregoing discussion it will also be appreciated that certain applets in the device application 84 may correspond to devices which are not present in all automated teller machines. For example an automated teller machine that operates only as a cash dispenser does not include a depository mechanism like depository 44. To accommodate the situation where a user requests a transaction that is not physically possible with the ATM 12, the device interfacing software portion 64 may be programmed to provide an appropriate response message to indicate that the function is not available.

Alternatively, the device interfacing software portion may include a function which checks for the presence or absence of each type of physical device within the ATM. Information indicative of the devices present in the ATM may be included as part of the messages generated by the ATM. For example, information indicative of the devices which are operative in the ATM may be included as a portion or several parts of the URL addresses to which messages are directed by the ATM. In this way, the URL in the server to which the ATM connects may be configured for providing only documents which correspond to the types of transactions that the ATM is capable of performing. As a result the browser avoids displaying documents which include references to transaction types that the machine is not capable of performing. Thus for example, a machine may avoid producing a display in response to a document which includes a reference to a deposit transaction if the machine does not include a depository.

Alternatively the machine may include in memory, data representative of the functional devices included in the machine. This may include for example data representative of a plurality of devices in the machine and the configurations of such devices, or alternatively, a designator such as a machine number sufficient to identify the capabilities of the machine. The device data indicative of the functional devices in the machine is communicated to a server and the server is operative to deliver the appropriate documents for the devices present in the machine. This may be done based on the data corresponding to the device data from the machine or may be resolved from a memory which holds data representative of the functional devices in a machine associated with a particular designator. Documents selectively delivered by the server to the browser of the machine will include the appropriate references to the functional devices present in the machine. In alternative embodiments messages from the machine may indicate the type of transaction being requested or other information which corresponds to devices or transaction capabilities available at the particular machine where a transaction is requested by a customer. Documents accessed may be static documents or may be generated at run time from sub-documents or other data, to provide the appropriate outputs and instructions to the output devices of the transaction machine.

Figure 3:
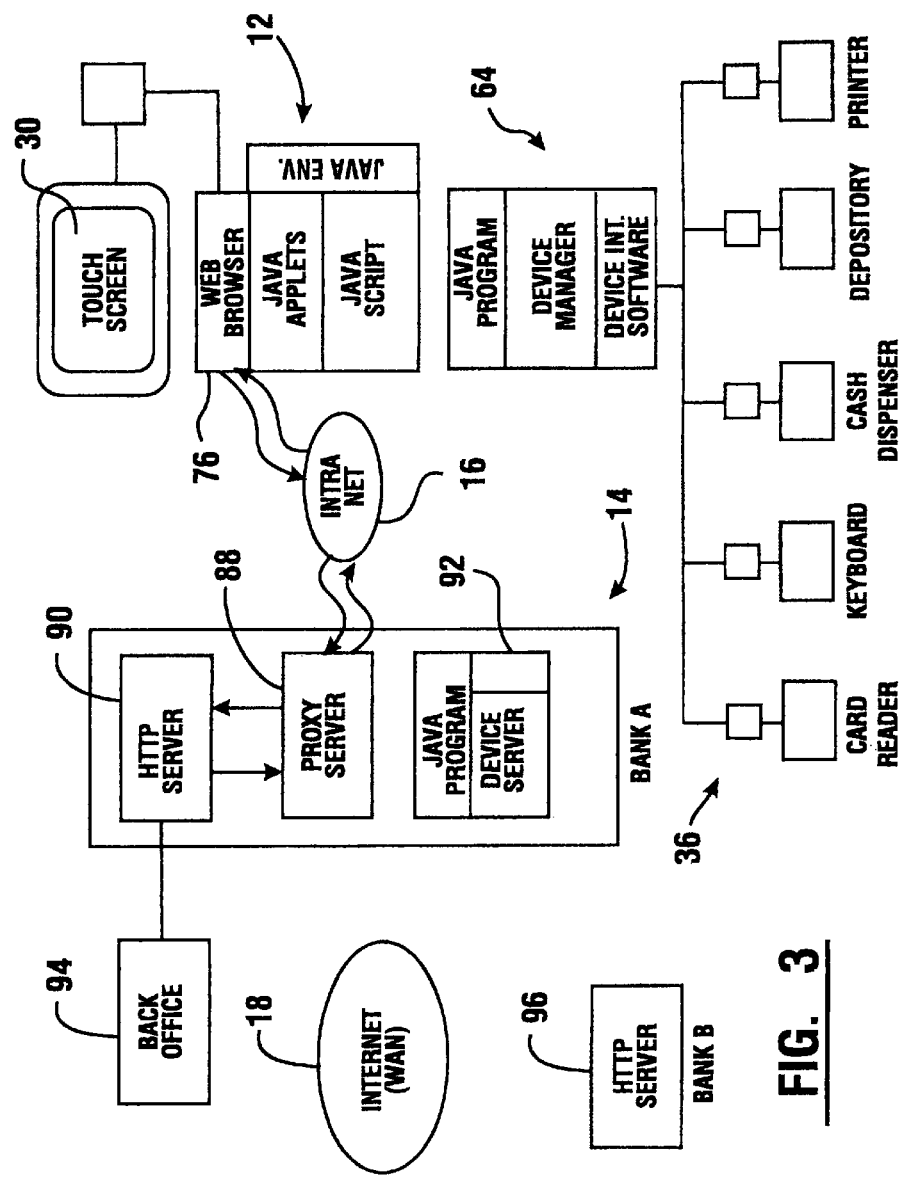
FIGS. 3 through 24 show schematic views of the automated banking machine, an intranet connecting the banking machine to a computer system of a home bank and a wide area network connecting the computer system of the home bank to a foreign bank.
Figure 4:
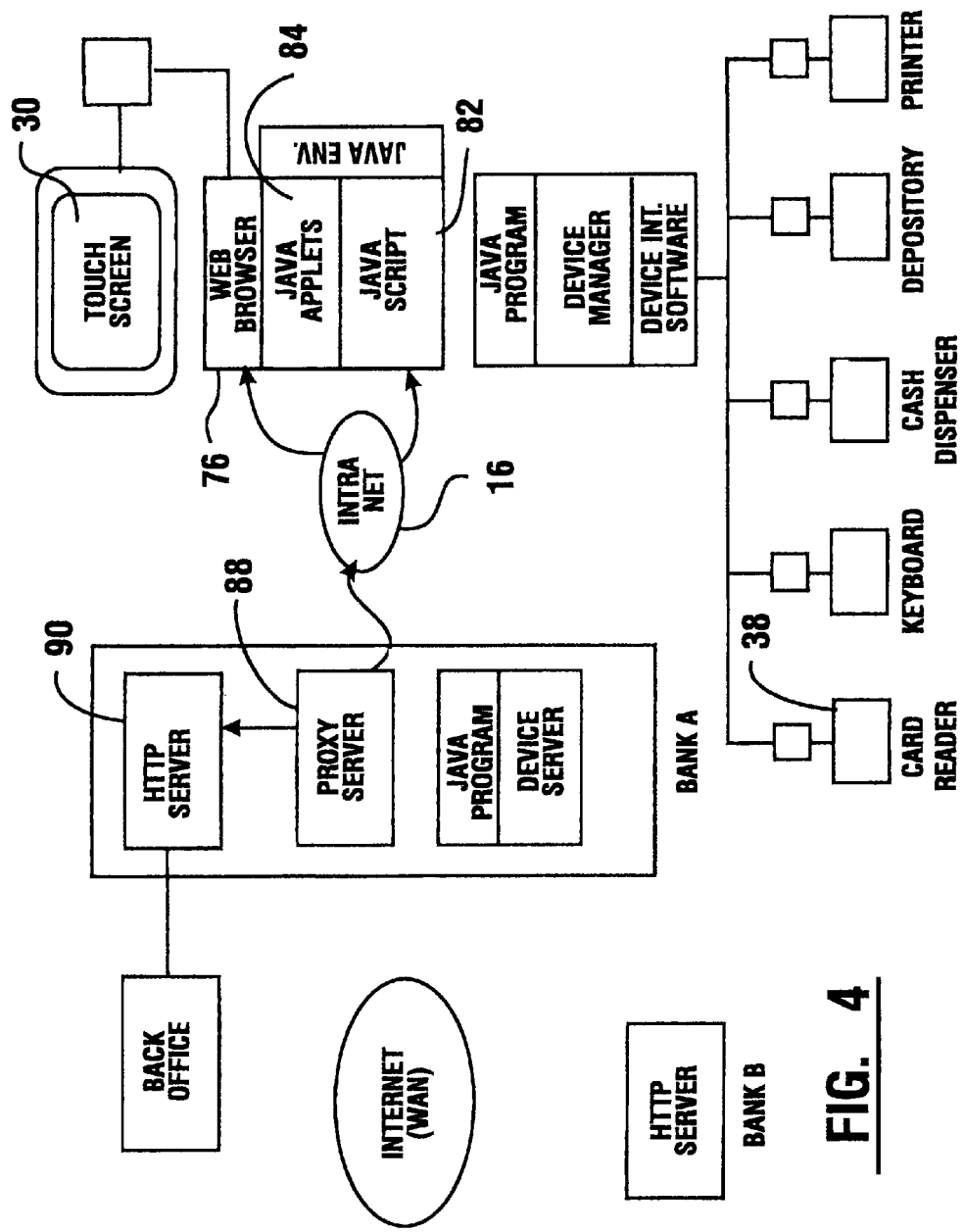

FIG. 3 shows the ATM 12 in communication through the intranet 16 with the home bank computer system 14. Computer system 14 includes a proxy server 88. System 14 further includes a home HTTP server 90. Computer system 14 further includes a device server 92. The proxy server, home HTTP server and device server may be included in a single computer as shown, or in other embodiments may be separate computers. Additional servers may be operative in other embodiments.

The home HTTP server 90 is preferably in communication with a data store and is in electronic communication with a back office computer system, schematically indicated 94. Back office computer system 94 is operative to keep track of debiting or crediting customers' accounts when they conduct transactions at the automated banking machines. In addition back office 94 is also preferably operative to track transactions for purposes of accomplishing settlements with other institutions who are participants in the system and whose customers conduct transactions at the ATMs 12.

As later explained, proxy server 88 is also operative in the described embodiment to communicate through the wide area network 18 with foreign servers such as foreign server 96. Foreign server 96 is an example of a server operated by an institution or entity other than the institution which operates computer system 14. It should be understood that while foreign server 96 is indicated as operated by a "foreign" institution, this is not necessarily indicative that the institution is located in another country from the institution that operates computer system 14. However, it is possible that foreign server 96 could be located in such a foreign country, including a country in which the language spoken is different from that generally used in the country where ATM 12 is located.

The conduct of transactions using the ATM 12 is now explained with reference to FIGS. 3-24. It should be understood that the following described transaction flows are merely examples of the operation of the apparatus and system, and the apparatus and system may be configured and operated in numerous ways to carry out transactions.

At the start of an exemplary transaction, as schematically represented in FIG. 3, the browser 76 communicates through the intranet 16 with the proxy server 88. The communication is established preferably in a manner so that HTML documents intended to attract customers to the ATM 12 are processed and produce outputs displayed on the touch screen 30. This is referred to as the "attract mode." These HTML documents which are processed in the browser to produce the outputs in the form of screens on the touch screen 30 (and/or outputs through other output devices included in the machine) may originate from home HTTP server 90 which is operative to deliver the HTML documents to the proxy server. The home HTTP server sends the messages addressed to the IP port associated with browser 76, so as to cause their display at the proper ATM machine. It should be understood that while in this example, home server 90 is described as communicating with the ATMs through the proxy server 88, the server 90 may in other systems encompassed by the invention communicate directly with the ATMs.

A fundamental advantage of the system is that home HTTP server 90 may deliver documents selectively to the ATMs 12 connected to the intranet 16. These documents may include messages or material tailored to the particular location in which an ATM 12 is located. Examples of particularly tailored screens may include bilingual messages in certain neighborhoods or information concerning currency exchange at various ports of entry. The material or messages could include advertising for various products or services or other material targeted to particular machine locations. The JAVA applets and JAVA script are loaded from a central location providing selective software distribution in the ATMs which may also be used to tailor the ATM to its environment by causing it to access documents which include material intended to be useful in that location, and which is not provided in documents delivered to at least some other machines in the system.

Systems of the present invention may be configured to have selected machines access HTML documents at different addresses, so that the particular documents accessed include the material targeted to users of the particular machine. Alternatively, a machine may communicate machine data indicative of its identity and/or location to a server. From the machine data, and data stored in a data store in connection with the server, the server may operate to deliver the documents including the targeted material. This may be accomplished by assembling subdocuments, or otherwise, to generate the documents that will be delivered to the browser of the particular machine. In addition it should be understood that while in the embodiment shown the HTML documents are accessed through a server of an institution associated with the machine, the documents used for the attract mode may be accessed from other servers operated by other entities.

The touch screen 30 in this exemplary transaction sequence displays a screen which includes an icon which indicates in one or more languages that to commence a transaction a user should touch the screen. If a user touches the screen in the area of the icon an input signal is generated. The input signal or HTTP message is transmitted through the browser 76 to the home address of the home HTTP server 90 to which the ATM 12 is currently in communication. The message generated back to the home HTTP server is represented by the arrows directed from the browser 76 to the intranet 16, from the intranet 16 to the proxy server 88, and from the proxy server to the HTTP server 90 in FIG. 3.

In response to the home HTTP server 90 receiving the message indicating that a customer has touched the icon on the screen, the home server is operative responsive to the address accessed to send a message through the proxy server 88 (or in other embodiments directly) to the browser 76. This message preferably includes an HTML document which when processed through the browser produces a screen instructing the customer to insert their card into the card reader mechanism 38. The HTML document flow which is represented graphically in FIG. 4, preferably also includes embedded JAVA script or other instructions which operate in the JAVA environment to communicate a message to the JAVA applet responsible for enabling the card reader in the device application portion 84. In one exemplary embodiment the instructions provide a pointer or tag to the applet which executes responsive to receipt of the document instructions. Of course in other embodiments other software and approaches may be used.

Figure 5:
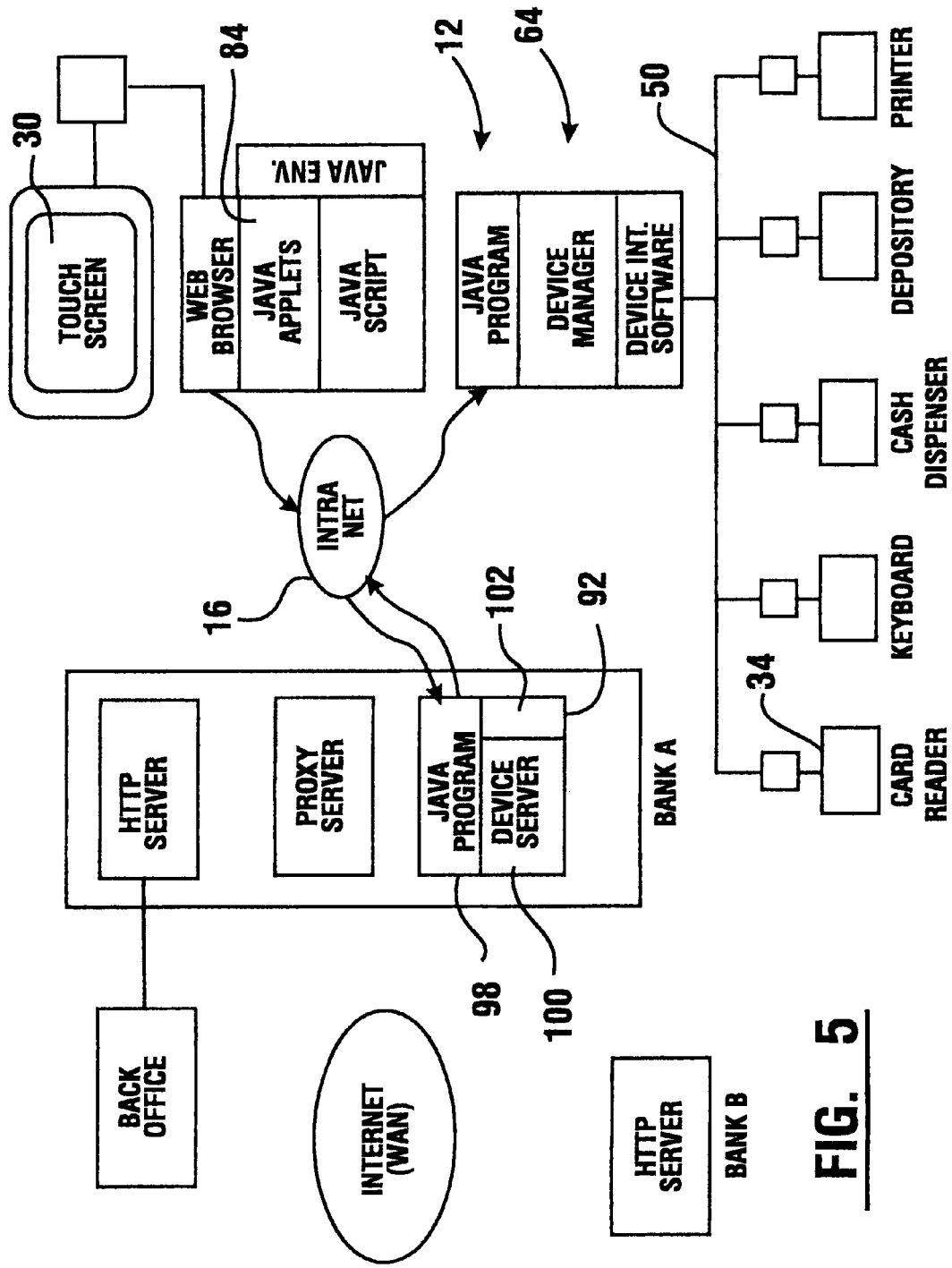

As schematically represented in FIG. 5, in response to the embedded JAVA script activating the JAVA applet associated with the enable card reader function, the JAVA applet in the device application portion 84 communicates with the device server 92. The device server 92 includes a device server program 98 which in the exemplary embodiment is a JAVA program that enables communication with the JAVA applets and the device server application 100. The device server 92 further preferably includes a monitor software application 102 which is operative to monitor device operation instructions. The monitor software minimizes the risk of fraud or abuse in a manner later explained.

Returning to the sample transaction, as represented in FIG. 5, in response to receiving the enable card reader message from the device application portion 84, the device server 92 is operative to generate a message through the intranet 16 to the device interfacing software portion 64 of the ATM 12. This message which comprises an HTTP record including instructions for operating the card reader, is directed to the IP port indicated 74 where the device interfacing software portion 64 communicates. In response to receiving this message, the software portion 64 is operative to send a message or messages on the control bus 50 which enables card reader mechanism 34.

Figure 6:
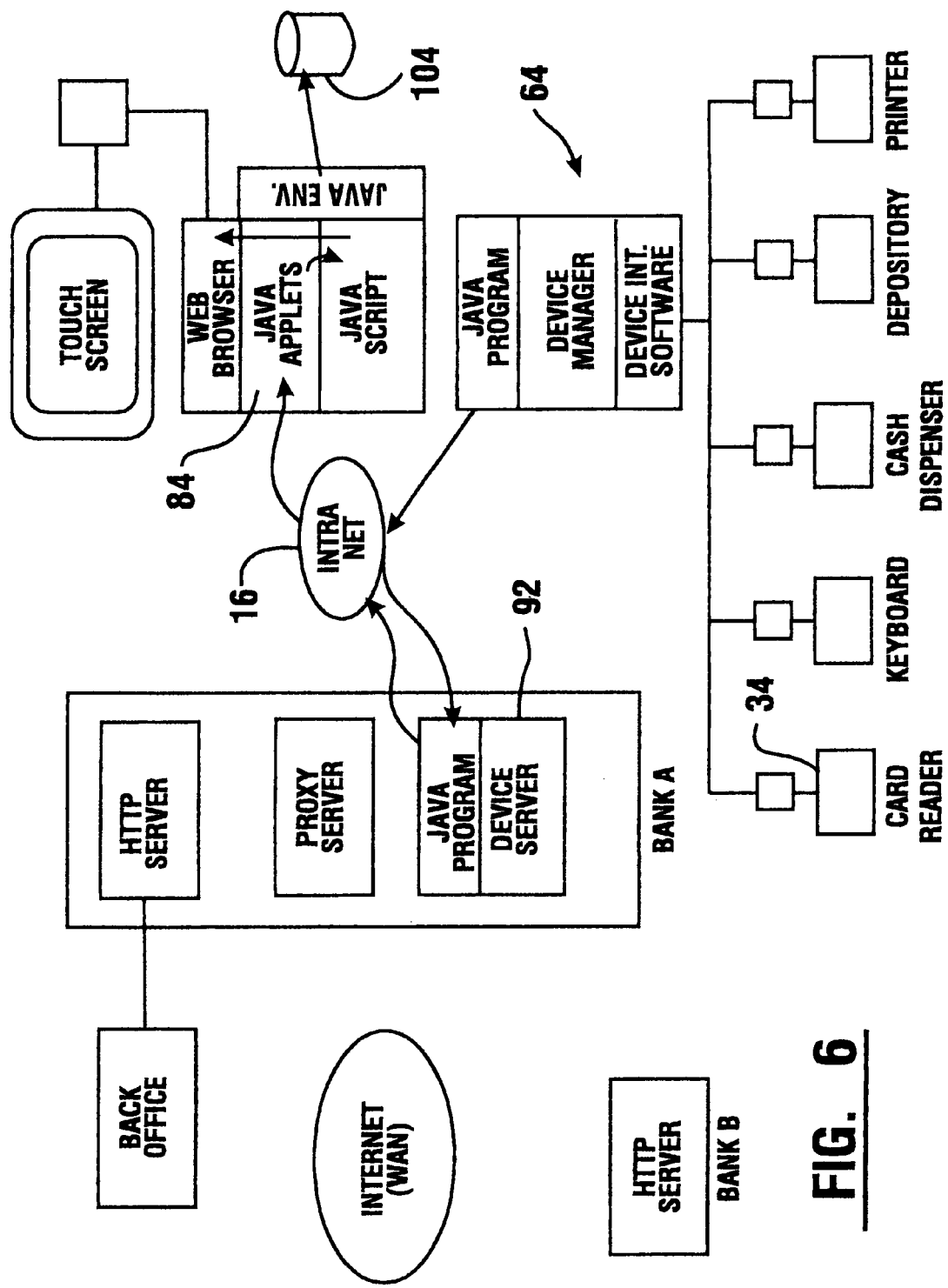

Continuing with the exemplary transaction, as represented in FIG. 6, the input of the card by the customer to the card reader 34 is operative to cause the card data to be read and the device interfacing program portion 64 to send a message to the device server 92 indicating the card data has been read. This message is transmitted by the device server through the intranet 16 to the device application portion 84. The device application portion then sends a message to the device server requesting the card data. The device server 92 transmits a message with instructions to deliver the card data from the device interfacing software portion 64 which responds with a message sending the card data through the intranet to the device server. The device server, if there is no basis for stopping the transaction, transmits an HTTP record including card data back through the intranet 16 to the device application portion 84.

In one exemplary embodiment of the invention, the card input by a user or customer includes indicia which corresponds to an address associated with the user in the network. In such an embodiment the indicia corresponds to a uniform resource locator ("URL") address which provides information on the computer where the user information resides, as well as a directory or subdirectory which includes the user information and the name of the document or resource that includes the user information. The URL address may be encoded on a customer's card. The address may be encoded on track 3 of a magnetic stripe, in other locations within the magnetic stripe data or through encoding other readable indicia on the card. Alternatively, if the customer's card is a "smart" card which includes semiconductor storage thereon, the URL address associated with the customer may be included as part of the stored data on the integrated circuit chip on the customer's card.

Alternatively, a URL could be derived from other data on the card by accessing a database in which address data is correlated with other data read from the card. For example, conventionally encoded magnetic stripe cards include as part of the encoded account information identifying indicia which indicates the institution or entity with which the customer's account is associated. For example, in the use of debit cards the card data includes a "bank identification number" (BIN). Exemplary embodiments of the invention may include in operative connection with the computer, a data store which includes data corresponding to BIN number or other entity data identifying associated network address data. The machine may operate to resolve a network address for the customer's "home" institution in response to the identifying data. The machine may use the resolved address information from the card data, access the server operated by the entity with which the user has an account relationship. As user later explained, this feature can be used to present a customer with HTML documents or other type documents which provide interface screens and transaction flows from their familiar home institution or entity, even though the machine they are operating is not controlled by that entity.

As can be appreciated from the following disclosure, the entity owning the banking machine may be a totally independent entity from the entity with which the customers have accounts. Nonetheless the customer is provided with interface outputs which suggests that the machine is one operated by "their" particular bank or entity with whom they have an account relationship. The customer may be charged a transaction fee for the convenience of using the banking machine. In exemplary embodiments, at least a portion of this fee will be shared between the customer's institution and the entity operating the banking machine which provides this capability.

The data necessary to derive the address for accessing documents associated with a customer could also be derived from inputs to readers or other input devices other than or in addition to card data, including for example biometric data which is input by a customer through a biometric reading device. Such biometric data may include for example, data corresponding to one or more fingerprints, data from the user's appearance such as face or iris scan, inputs from a user's voice, including voice prints or spoken passwords, or combinations thereof.

For example and without limitation, data input by a customer such as through a card input to a card reader may correspond to or otherwise be useable to determine an address for accessing an HTTP record, which may be a file or document which includes information which can be used for verifying the identity of a user. This record could include data corresponding to a PIN number. The information may include biometric data corresponding to the authorized user of the card. The browser may access the record and use the contents of the record such as data and/or instructions to verify that the indicia corresponding to biometric data in the record corresponds to the biometric data of the user entering the card. Alternatively, input data representative of appearance, voice, other features (or combinations thereof) or other input data, may be used to generate one or more addresses which correspond to a user, and the content of the record at the accessed address used to verify that the user at the machine corresponds to the user associated with the record. Numerous approaches within the scope of the invention may be used. The information in the record corresponding to a user may likewise be used to authorize certain functional devices on the machine to operate for the user while other devices may not. For example, a user who is overdrawn may have information in the record accessed that prevents them from actuating the cash dispenser, while users who are not overdrawn may include information which enables such operation. Alternatively, the absence of information in a corresponding record may enable operation, while the inclusion of information selectively limits the operation of devices.

Alternatively or in addition, in embodiments of the invention the information which is useable to determine the identity of the customer and/or their accounts may be usable by a computer in connection with the machine to generate documents such as XML documents. Such documents may be used to generate outputs from the machine presented to the customer. Such documents may alternatively or additionally include information corresponding to one or more network addresses. Such network addresses may be used to access documents appropriate for the particular customer or their transaction.

Returning to an exemplary transaction, the card data from a successfully read card is delivered responsive to the programming of the device application portion 84 to a JAVA applet associated with notifying that the card data has been entered. In response, the JAVA applet operates to generate JAVA script which configures the browser with the URL address corresponding to the data read from the card. The JAVA applet is also preferably operative to open a record schematically indicated 104 concerning the transaction, which includes the user's network address, the time and other card data. This record in the exemplary embodiment may be stored in memory as data in an object in software. The object is preferably used to accumulate data as the transaction proceeds. The data stored in the transaction data object preferably includes data input through input devices by the user as well as data representative of operations carried out by transaction function devices.

The record or transaction data object provides persistence through what may be several different transaction steps executed by the customer. The ability to use and share the data in a number of different operations avoids the need to derive it or obtain it from a customer more than once in the course of a user session involving a number of transaction steps. The use of a transaction data object enables applets to run largely independently, obtaining needed data from the transaction object. The transaction data object can be instantiated or accessed from various documents. Its content can also be instantiated and used to populate forms presented in HTML documents. The record or data object may also be used to produce an appropriate record at the end of the transaction session. This record may be stored, collected into a batch or delivered to selected addresses in a local or wide area network.

In alternate forms of the invention the customer's card or other article presented by the customer to the banking machine may include additional personal data concerning the customer. Such personal data may include demographic and/or marketing preference data related to the customer. This personal data may also be read by the card reader and stored in the transaction data object or other suitable storage. Such data may be used by the system to make targeted marketing presentations and/or to present other material specifically for the particular customer. The inclusion of personal data on the customer's card enables the customer to exercise greater control over their personal data that is made available to the machine and to third parties who make marketing presentations to the customer. Such an approach may be used as an alternative or as an adjunct to systems that utilize a central repository of customer personal information. The approach of allowing the customer to control what information about them is made available to others may be more acceptable to customers from a privacy protection standpoint.

Figure 7:
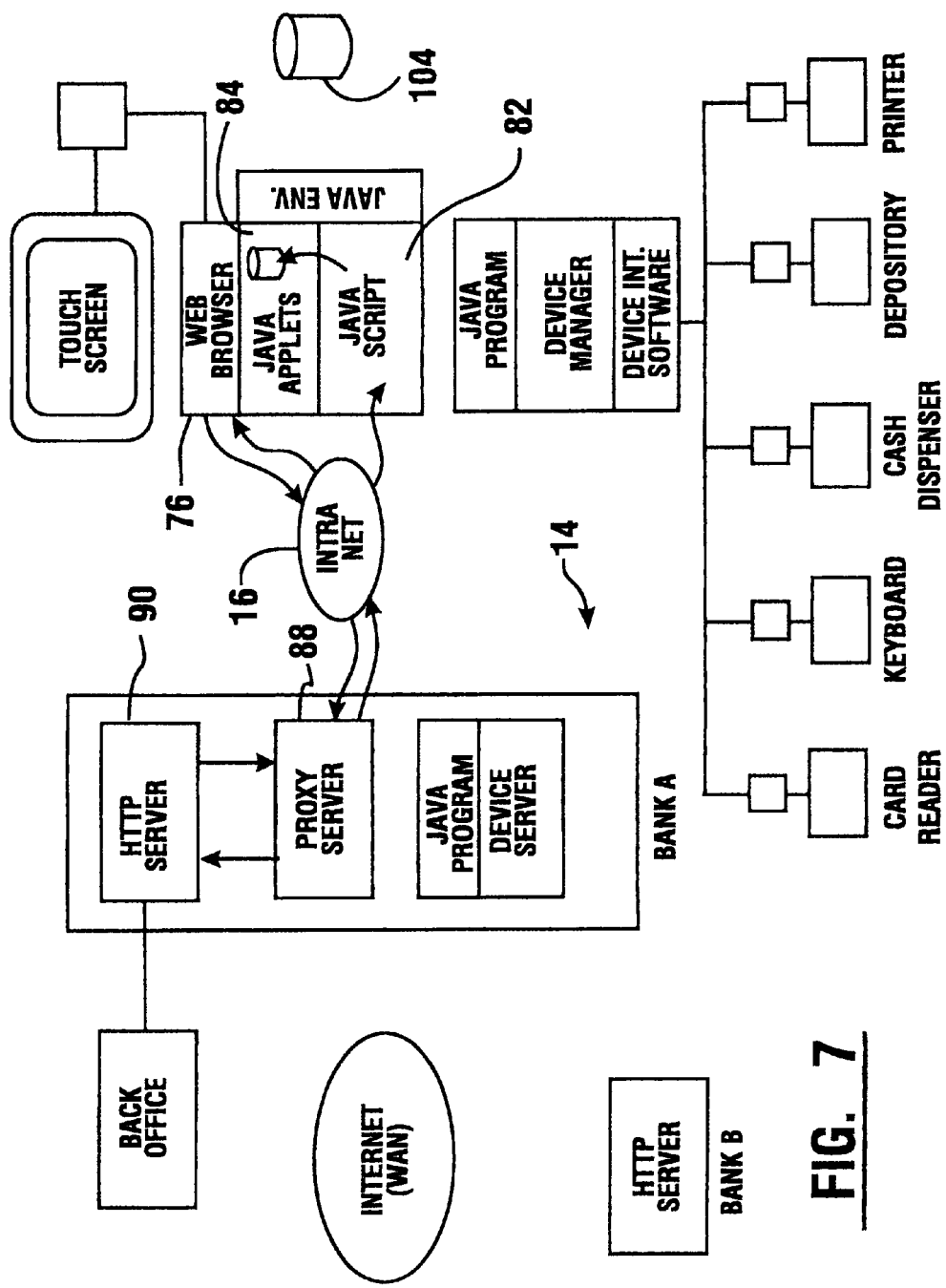

As schematically represented in FIG. 7, in the exemplary transaction in response to the browser 76 receiving the URL network address data, the browser is operative to transmit a message through the intranet 16 to the proxy server 88. For purposes of this example, the network address associated with the card data is that of a customer associated with the home bank which operates system 14. As a result, the customer's address will cause the message to be directed from the proxy server 88 to the home HTTP server 90 and to access the address corresponding thereto. Alternatively, in other systems the connection may be made directly with server 90 without the intervening proxy server 88. As previously discussed, the network address may also include portions indicative of data representative of the devices which are operative in the ATM.

In the exemplary transaction in response to receiving the message, home HTTP server 90 finds the data corresponding to the customer's address data (or other data) in its associated memory and delivers to the browser at its IP port one or more HTML documents. These HTML documents may include a screen acknowledging the particular customer by name as well as the name of the banking institution or other entity which operates the home bank computer system 14.

In addition, the HTML document preferably includes embedded JAVA script which has a digital signature or a means to obtain a digital signature associated with the home HTTP server 90. The script instruction included in the document in certain embodiments causes the device application portion to access an HTTP address on a server, which in the described embodiment is server 90. The HTTP address corresponds to an HTTP record which includes at least one instruction and preferably includes a program such as a JAVA applet or Active-X file. The instruction is used to operate the appropriate transaction function device. The HTTP record preferably includes data representative of a signature, such as a digital signature. This digital signature is received responsive to the JAVA script 82 and processed in the device application portion 84. A JAVA applet processes the digital signature to authenticate it, and if it is an acceptable signature authorizes operation of the banking machine. In certain embodiments the applet may compare the signature to signature data stored in memory for a predetermined relationship, such as a match. Of course other approaches of verifying the authority of servers, documents or instructions to operate the machine or particular devices therein may be used in embodiments of the invention.

After the applet verifies that HTTP server 90 or other accessed HTTP record has sent a proper digital signature, or other authorization, the transaction will be allowed to continue. If for some reason a proper digital signature has not been sent, the JAVA applet will stop the transaction and return banking machine 12 back to the condition prior to the start of the transaction by connecting the ATM to the address associated with the attract mode in home server 90. The use of signed instructions may be used to assure that the various transaction function devices are only operated in response to appropriate messages. The use of signed instructions may be particularly appropriate for instructions that run the sheet dispenser or otherwise provide value to the user of the machine.

Figure 8:
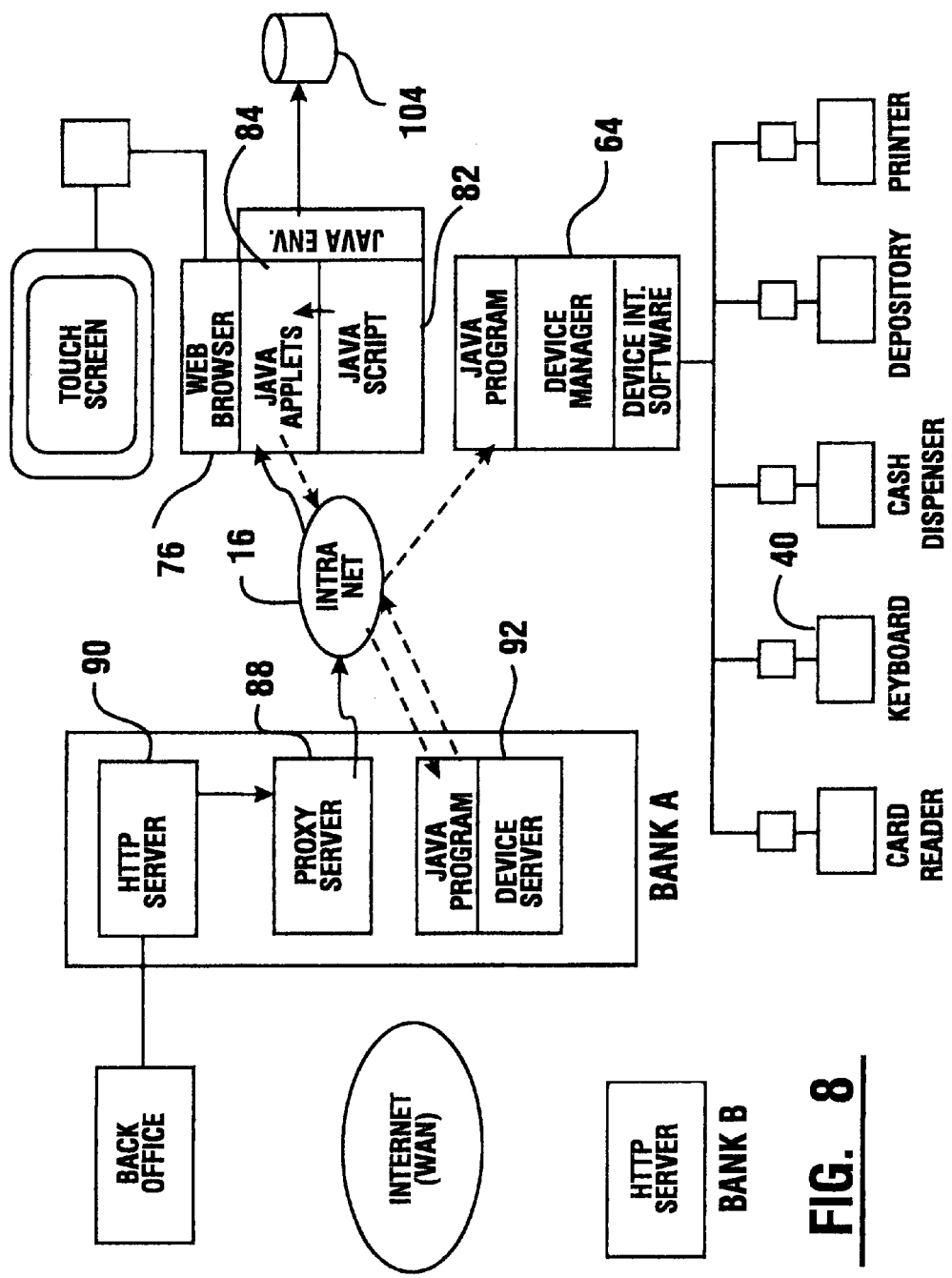

For purposes of this example it will be assumed that the digital signature received is a proper signature, in which case a message is returned from the browser 76 to home server 90 indicating that the transaction may proceed. As shown in FIG. 8, in this exemplary transaction the HTTP home server 90 then operates to deliver at least one HTML document to the browser 76. This document includes instructions which when processed produce a visible page or screen which instructs the customer to enter their personal identification number or PIN. This HTML document preferably includes embedded JAVA instructions or other instructions which operate to cause the device application portion 84 enable the keyboard 40 of the ATM so the machine may receive the PIN number. Such a message is schematically shown in FIG. 8 with the JAVA script 82 signaling the JAVA applet responsible for the keyboard that it has been requested to enable the keyboard. In response the JAVA applet in the device application portion 84 sends a message through the intranet 16 to the device server 92. The device server 92 sends a message through the intranet to the device interfacing software portion 64 in the ATM. The instructions in this message cause the device software to enable keyboard 40. The JAVA applet responsible for enabling the keyboard is also preferably operative to update the transaction record 104 to indicate that the PIN was requested.

Figure 9:
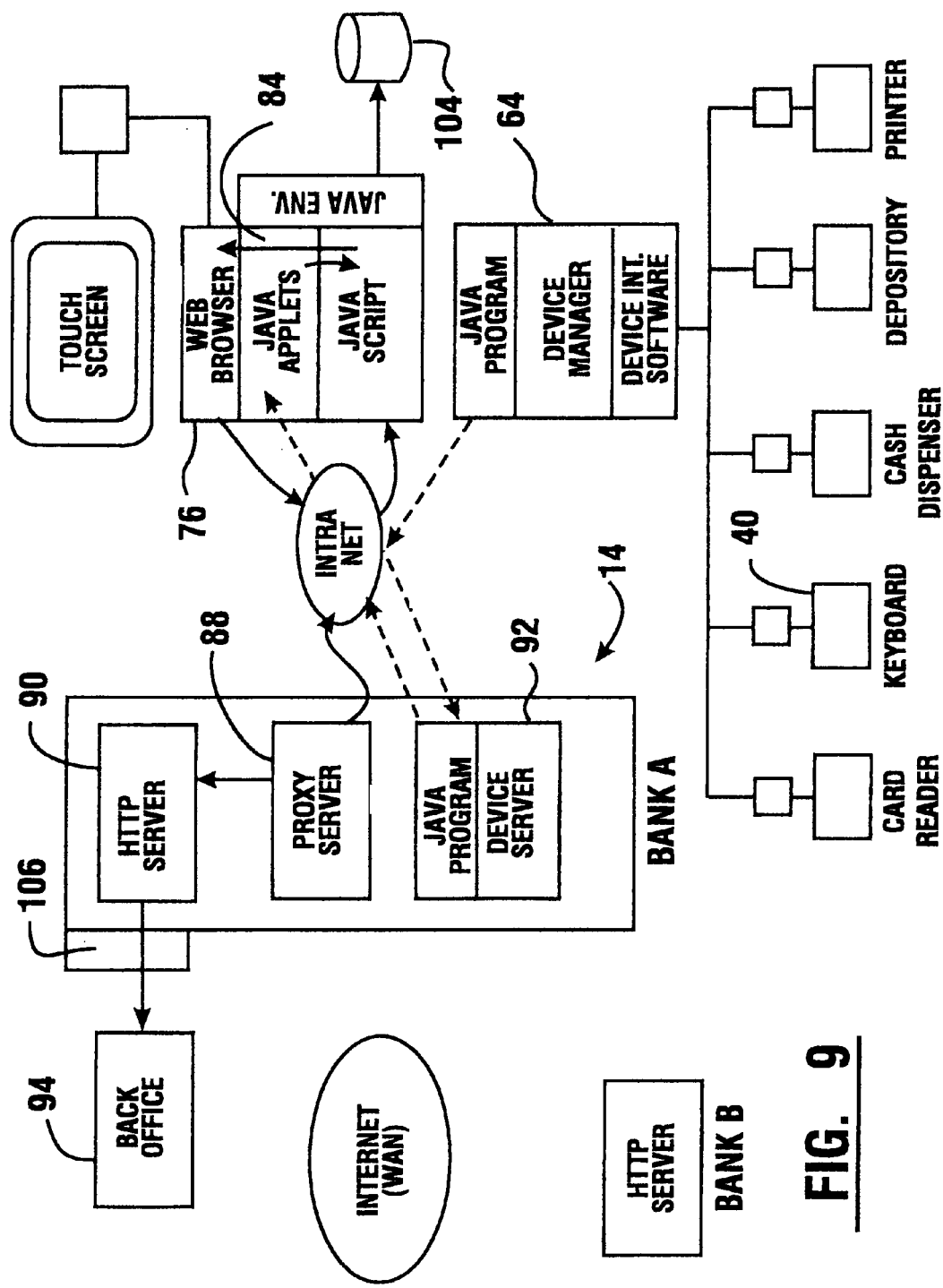

As shown in FIG. 9, the PIN entered through the keyboard 40 is transmitted in a message from the device interfacing software portion 64 to the device server 92. The device server 92 returns a message to the responsible JAVA applet in the device application portion. The JAVA applet then operates to send a message back through the HTML document handling portion and the browser 76 to the HTTP address of home server 90. This message includes data representative of the PIN input by the customer. In some embodiments it is not desirable to display the customer's PIN on the screen. In such embodiments the keyboard applet may be operative to display a default character on the screen such as a "*" symbol or other symbol in lieu of the PIN digits. Further as later discussed it may be desirable to avoid transmission of PIN or other data through the browser, in which case PIN data may be handled as a separate HTTP message or in other manner to reduce the risk of detection.

The software operating in connection with HTTP server 90 is then operative to either verify the PIN itself or to verify the customer's PIN number and account number by sending it to the back office 94 and waiting for a response. Alternatively, customer PIN verification may be carried out in the ATM through an appropriate applet. This can be done in situations where data on a customer's card, such as an account number, or portions thereof can be correlated to the customer's PIN number through an algorithm. The embedded JAVA script in the HTML messages may include or point to an address to obtain the data and/or instructions which the applet may use to perform this verification function, including certain encryption key data. This may include user information in the HTML document or other record data that was accessed in response to the user's card data. The BIN number read from the customer's card may alternatively be used as an indicator of the approach to be used in verifying PIN data. As shown schematically in FIG. 9, the transaction data object 104 is also appropriately updated by the applet to indicate the entry of the customer's PIN.

In alternative embodiments the machine may include a biometric reader device or other reader type input device to accept data from a user. The user may input data through such a device which may be used in lieu of, or in addition to, PIN data to verify that the user is an authorized user. This may be done for example by comparing the user data input to information corresponding to the authorized user of the card included in a record or a document which has an HTTP address and is accessed by a browser or by an HTTP client application through an HTTP server in response to card data. Alternatively input data may be used to generate addresses for documents or records which are accessed by the browser or client, and which records or documents contain information that is used to verify the user's identity. For example, data concerning users may be stored in a data store in connection with an HTTP server, which delivers data from a record responsive to the user data, which data is used to verify the user's identity.

It should be noted that the page or screen which requests the customer to enter their PIN is shown generated from the home HTTP server 90. This is preferably a screen that is associated with the particular URL address associated with the customer. This will be the interface of the customer's home bank and will be familiar to the customer. Alternatively, the customer address may access what may be essentially the customer's personal "home page" with the institution that operates computer system 14. As such, it is not only something the user is familiar with, but is ideally tailored to the user's particular transaction needs.

Alternatively, the document(s) or record(s) which contain the customer data may be used to generate the addresses for other documents. The information may also be used by the computer to dynamically generate a document for the particular customer in the particular circumstances. This approach may be useful to reduce the effort associated with developing in advance a personal visual page or document for each customer.

Approaches for accomplishing this may involve including various types or categories of user information in the document(s) or record(s) that pertain to a particular customer. This may include information such as gender, related persons, account types, permitted transactions, customer preferences, customer interests, account balances, previous offers declined or accepted and other information. This customer information can be used by an appropriate applet among applets 86 to address and/or generate an appropriate document for the browser to access based on the customer "profile". In addition, the profile applet may take into consideration the transaction devices present in the particular machine, information on which is stored in a data store in the machine or elsewhere in the system, as well as other factors such as the day of the week and time of day based on a system clock. In this way the machine determines the appropriate document to access or generate for the particular customer under the particular circumstances. As previously discussed some personal data may be obtained from information encoded on the customer's card.

The logic used in the profile applet may act to cause documents to be built or accessed for the customer which include transaction options based on the customer information, information about the terminal and other factors. The profile applet may operate to offer transaction options or information selectively based on the customer information. For example, the operator of the machine may offer incentives, premiums, additional transaction options or advertising information selectively to customers. Certain types of customers of the institution operating the machine may receive screen outputs with options that encourage them to do more business or different types of business with the institution. Likewise, customers that are identified as customers of foreign institutions may be provided with incentives to do business with the institution operating the machine.

The profile applet may operate to cause the computer to access other documents in other servers, such as stock market data, and selectively provide it to customers. It should be understood that the profile applet may operate to determine an address or generate documents to produce initial display screens of a transaction sequence. The profile applet may also operate to provide information or access or produce documents which generate visual outputs to the customer at other points in a transaction or between transactions. This may further be used in systems in which the operator of the machine is able to sell paid advertising to third parties and then access the HTTP records such as HTML files corresponding to those third parties' products or services. Such accessing may be done based on a periodic or other basis, but may be done effectively by selecting the HTTP record to access in response to the profile of the particular customer. As later described, advertising documents may be accessed from advertising servers connected to the network. Advertising materials may be delivered to customers from the machine at various times during transactions, such as between steps controlled by documents from the server operated by the customer's institution. Advertising materials may be displayed when transaction function devices, such as a sheet dispenser are operated. The operator of the machine and/or a system in which the machine is connected, may also require payment from advertisers for presenting the advertising materials.

Figure 10:
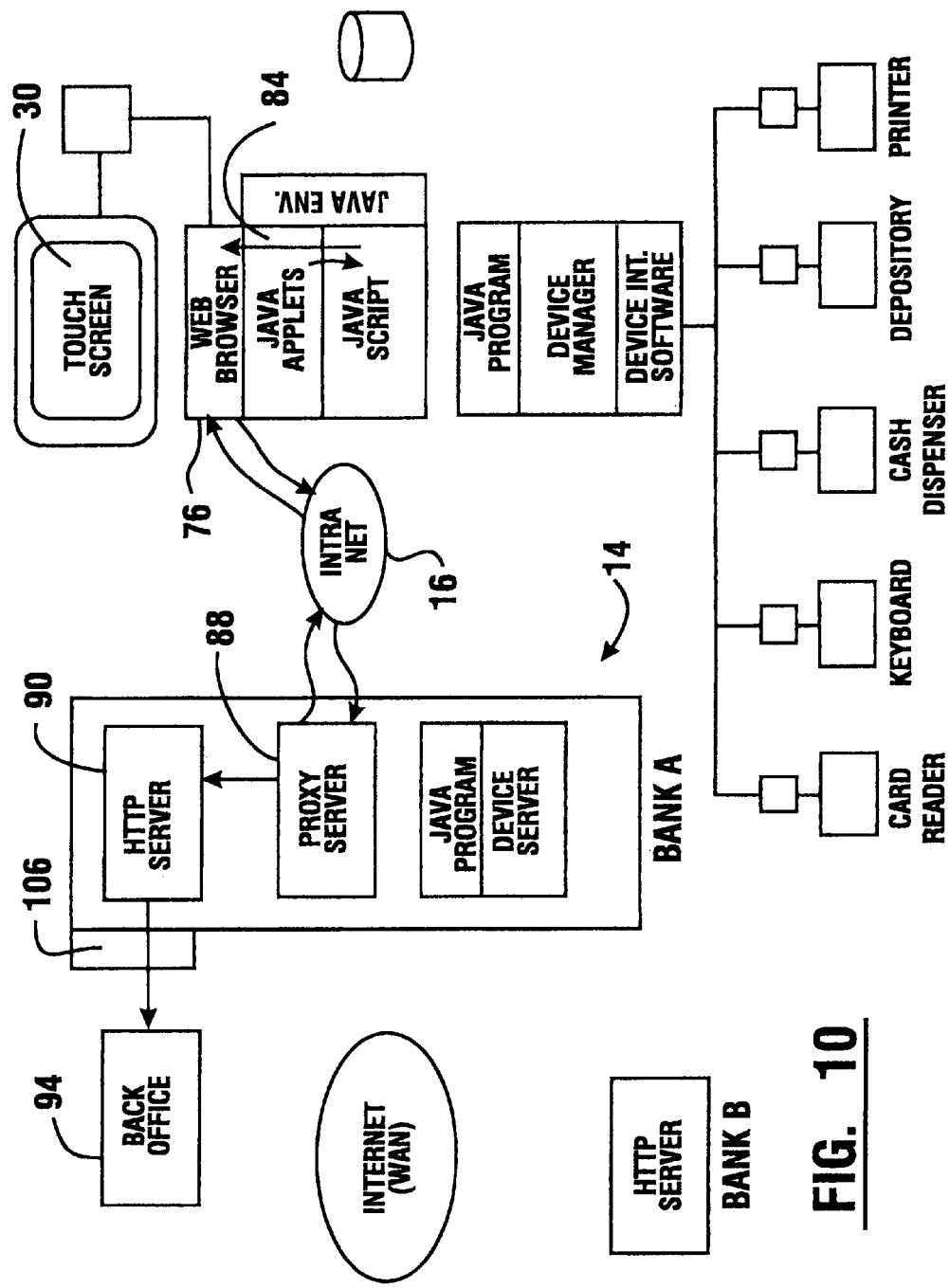

The continuation of the transaction flow from the point represented in FIG. 9 for this exemplary transaction by a customer of the institution that operates computer network 14, is schematically represented in FIG. 10. The home HTTP server 90 is operative in response to the customer inputting the correct PIN to send HTML documents to the HTML document handling portion of the software in the computer which operates the ATM. These messages may include information and instructions used to generate screens which prompt the customer to select a transaction. For purposes of this example, it will be assumed that the customer inputs at the touch screen 30 a selection which corresponds to the dispense of cash, which is a common transaction at an automated banking machine.

The selection of the customer through the input device of the touch screen is communicated back through the HTML document handling portion which communicates an HTTP message to the home HTTP server 90. Server 90 then responds by sending another HTML document to the banking machine which prompts the customer to select an amount. Again the customer may input a selection on the touch screen which indicates the amount of cash requested by the customer. This HTTP message passes through the HTML document handling portion and the browser 76 to the home server 90.

In response to the receipt of amount data from the customer, the home server 90 is preferably operative to communicate electronically with the back office 94 to verify that the customer has the amount requested in their account. This may be accomplished through a Common Gateway Interface (CGI) 106 which is in operative connection with the home server 90. For purposes of this transaction it will be assumed that the back office 94 indicates that the money is available in the customer's account and sends a message through the CGI 106 to the home server 90 indicating that it may proceed.

Figure 11:
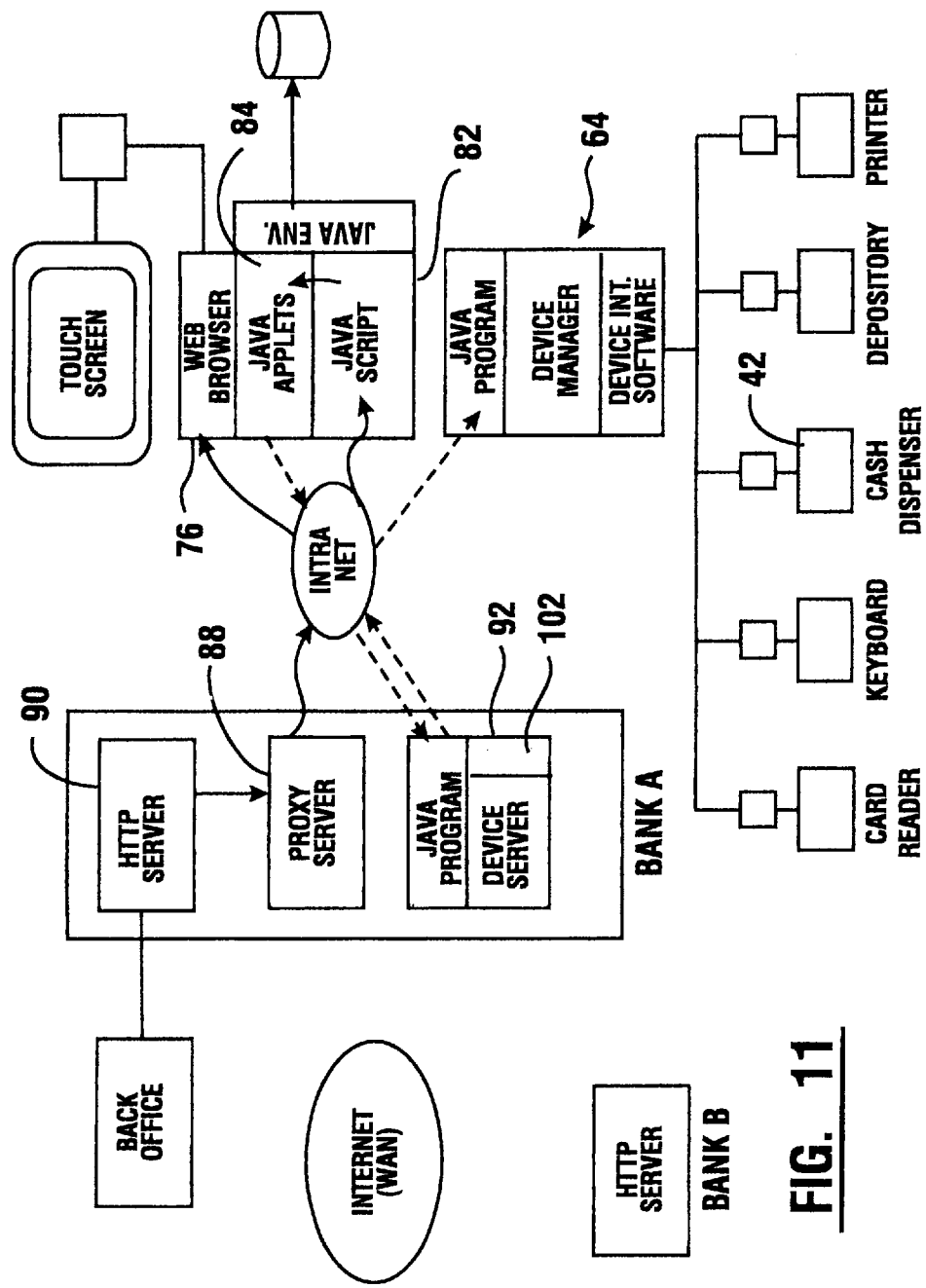

As schematically represented in FIG. 11, the home server 90 then operates to send a document back to the HTML document handling portion in the ATM software. This message when processed by the browser preferably will cause information to be displayed on the screen which advises the customer that the transaction is being processed. In addition the HTML document returned preferably includes JAVA script which includes embedded instructions which are executed and communicated to a JAVA applet associated with the operation of the sheet dispensing mechanism 42.

The document returned from the home server 90 may include advertising or other information instead of or in addition to the customer message. The document returned may also include an instruction which causes the machine to access or generate another document. These instructions may invoke methods in the profile applet which depend on the properties associated with the customer, the machine, the current time and/or other circumstances. This enables accessing documents that provide promotional messages such as advertising or other information to the customer while the customer is waiting for the sheet dispenser or other transaction function device in the machine to operate. It should be understood that these documents may be accessed from servers connected to the system anywhere, including servers connected to the Internet. This makes it possible to selectively present a wide range of materials to customers. It also enables operators of ATMs and other transaction machines to present advertising to customers, on a broad basis, or targeted to categories of customers or even targeted to individual customers on a segment of one basis. This could be advertising of the machine operator such as a bank, or advertising pertaining to virtually any type of goods or services. The advertising may also be selectively presented based on the particular transaction device being operated, the amount of funds involved or other parameters. The documents may also enable the presentation of video and sound to the customer which may enhance the effectiveness of promotions. Access to advertising documents may be tracked and payments made to the customer's institution, the operator of the system and/or the owner of the machine, by the entity associated with the advertising materials presented to the customers.

In the exemplary embodiment, the message to the JAVA applet in the device application portion 84 of the software to enable operation of the sheet dispenser results in generation of a message to the device server 92. The message to the device server 92 to dispense cash is preferably analyzed by the monitor software 102 to check to see if the message is appropriate. For example the monitor software 102 is preferably operative to assure that the amount of cash being requested does not exceed a preset amount. It can also optionally check to verify that the amount provided to this customer within a prior period has not exceeded an amount. This may be done by the device server sending a message to the back office which includes the card data or other data it has previously received from or resolved concerning this customer. This message may pass through server 90 and its associated CGI, or other connection. Assuming that the dispense instruction is not prevented by a message from the back office or the monitor software, the device server 92 is operative to send a dispense message to the device interfacing software portion 64 in the ATM. The software portion 64 is thereafter operative responsive to the message to operate the sheet dispensing mechanism 42 to dispense the amount of cash requested by the customer.

The monitor software 102 preferably performs additional functions in the device server. For example, government regulations or good business practice may require limiting the size and amounts of deposits which may be made into an ATM. This may be advisable to prevent "money laundering" or other suspicious activities. The monitor software preferably operates to limit the amount of any single deposit to below a set limit. It may further operate by communicating with the home bank back office system 94 to prevent a series of deposits within a preset time from exceeding a certain limit. The monitor software may also work in connection with the proxy server to limit certain transactions that may be carried on at the banking machine responsive to instructions from foreign servers as later discussed.

It should be noted that in this exemplary embodiment of the invention, the JAVA applet which is operative to send the message which causes cash to be dispensed, works in connection with another applet which controls the mix of bills dispensed to a customer. Many automated teller machines have the ability to dispense two or more denominations of currency bills. It is desirable to control the mix of bills dispensed to a customer to suit that which is available in the machine and to avoid running out of one denomination of bills before the other. The bill mix applet is preferably operable to control the bill mix in accordance with the desires of the institution operating the ATM machine as well as is in accordance with the ATM machine's capabilities. Alternatively, a JAVA applet for controlling bill mix may reside in device program 70 in device interfacing software portion 64.

As will be appreciated by those skilled in the art, the particular JAVA applets and/or configuration data in the machine may be selectively loaded from the home server 90 at machine start up or at other times. Because the applets and configuration data may be selectively delivered to particular machines, the machines may be tailored specifically to the particular currency dispensing and other capabilities of the ATM. For example, the ATM may be configured so that certain applets or groups of applets must be present to enable the machine to operate. One approach to loading such data or programs is to provide address values in the terminal software to indicate where the needed instructions to acquire the applets or data may be obtained. If the applets or groups of applets are not already present in memory of the ATM terminal at start up, the software is operative to access the system addresses for the documents which contain the required records or instructions which will cause the machine to load the required records. A browser may be used to access the addresses, and the software loads data corresponding to the instructions from the accessed documents into a memory in the ATM terminal so that the terminal has the required applets and data. Such document addresses may be accessible through the home server 90.

Alternatively the addresses may be on a separate development server connected to the intranet 16. In this way each transaction machine is able to load the applets and data which include the operative code needed to operate the transaction devices in the machine. Alternatively, the documents may be provided through a development server or other server that is accessible to the machine through a wide area network. The documents may be provided on the development server to provide the machine with instructions on how to acquire the operating code to carry out a wide variety of functions. The instructions may direct the machine to acquire the necessary data and code from addresses accessible through HTTP servers by an HTTP client in the machine. The data and code can be acquired responsive to instructions in one or several documents. The machine may also require that the applets loaded in this manner be signed applets including digital signatures or other authenticating features to achieve operation of certain devices in the machines.

Alternatively, embodiments of the invention may acquire the necessary applets and data from a remote data store. The data store preferably includes the data and/or programs that enable the machine to operate as desired, or have instructions on where the machine may acquire the necessary instructions and data for operation. The data may be accessible from a database server. The transaction machine addresses a query to the database server. The query includes or is accompanied by indicia from the machine which identifies the machine. This may be the particular machine such as a machine number, and/or may include indicia representative of the type or functional device capabilities of the machine.

The data store preferably includes records which have the data or programs that are to be transmitted to the machine. In response to the query to the server, the server retrieves records from the data store and responsive thereto delivers one or more messages to the HTTP client in the transaction machine. The message(s) includes the configuration data or applets to enable the machine to operate in the manner desired or may include instructions which indicate how the machine is to acquire such programs from servers connected in the system.

In the example shown the configuration server and data store may operate on the same computer as home bank server 90. In other embodiments the database server may reside elsewhere in the networks to which the machine is operatively connected.

An advantage of the machines and systems which employ such features is the flexibility to change the operation and customer interface of the machine to respond to changing conditions. This may include a change in a transaction function device. Conditions may change so that certain transactions are limited or are not available. For example, a machine may normally accept deposits but its depository is full. In that situation the machine may change the documents it accesses to present messages to users through its output devices so that the deposit option is no longer offered. This can be accomplished by the applets and data loaded into the machine initially, which provide for instructions when such event is sensed. Alternatively, the machine programming may be modified by loading new applets and/or data from an HTTP server responsive to its then current status. This may be done responsive to a query to a database server which includes or is accompanied by data representative of the changed conditions or capabilities of the machine. In response the server delivers the applet(s), data and/or instructions which will operate the machine in the modified mode.

This approach eliminates the situation with conventional transaction machines where the static interface presentation on output devices offers a transaction option to a customer. Sometimes, after the customer has made the selection an indication is given that the selected transaction option is not available. The approach described herein may be used with numerous transaction options and variations of transactions. The transaction options can be readily changed from the database server on a machine by machine basis or even a customer by customer basis as previously discussed, based on the desires of the entity operating the transaction machine.

Figure 12:
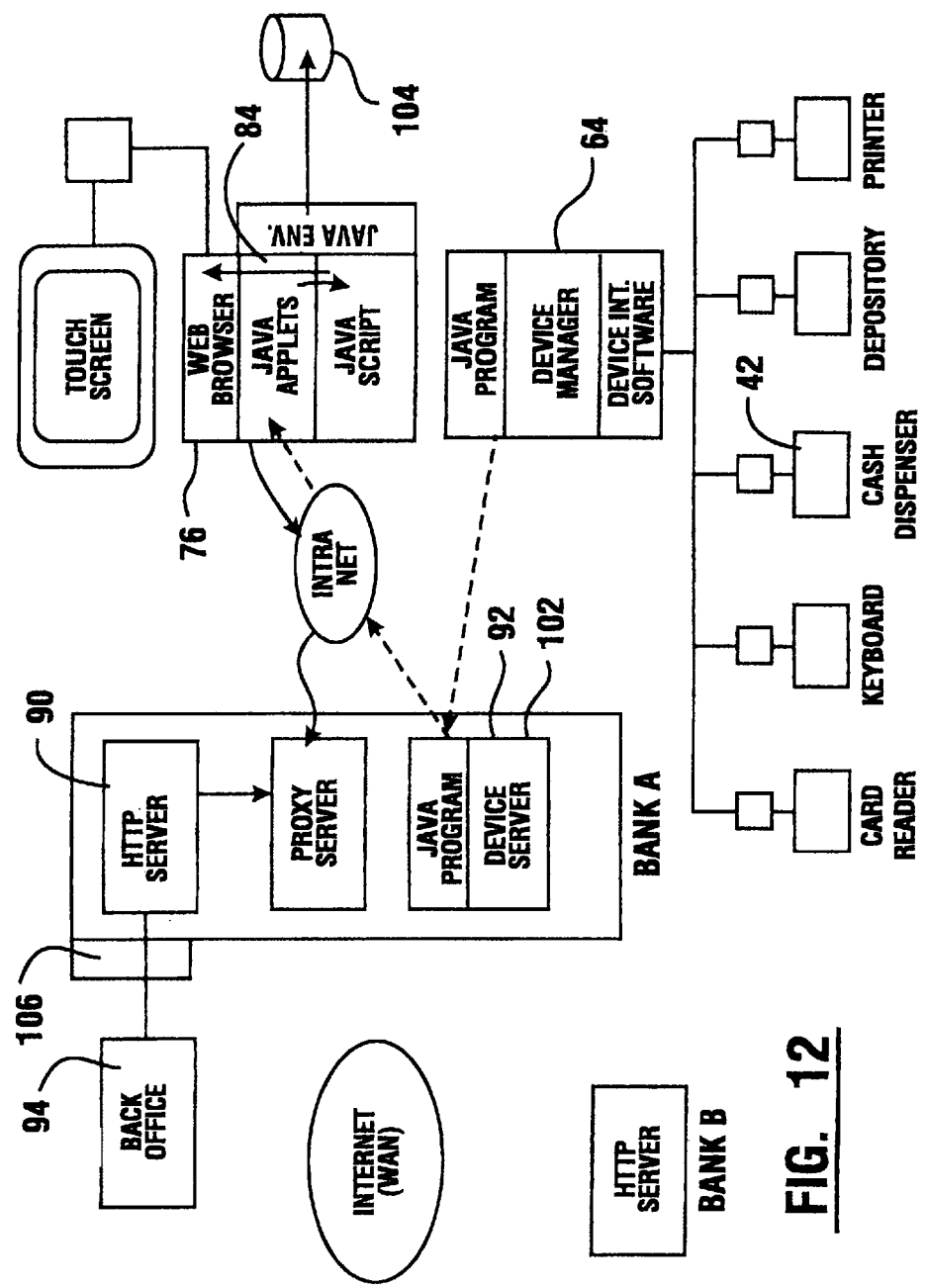
Figure 13:
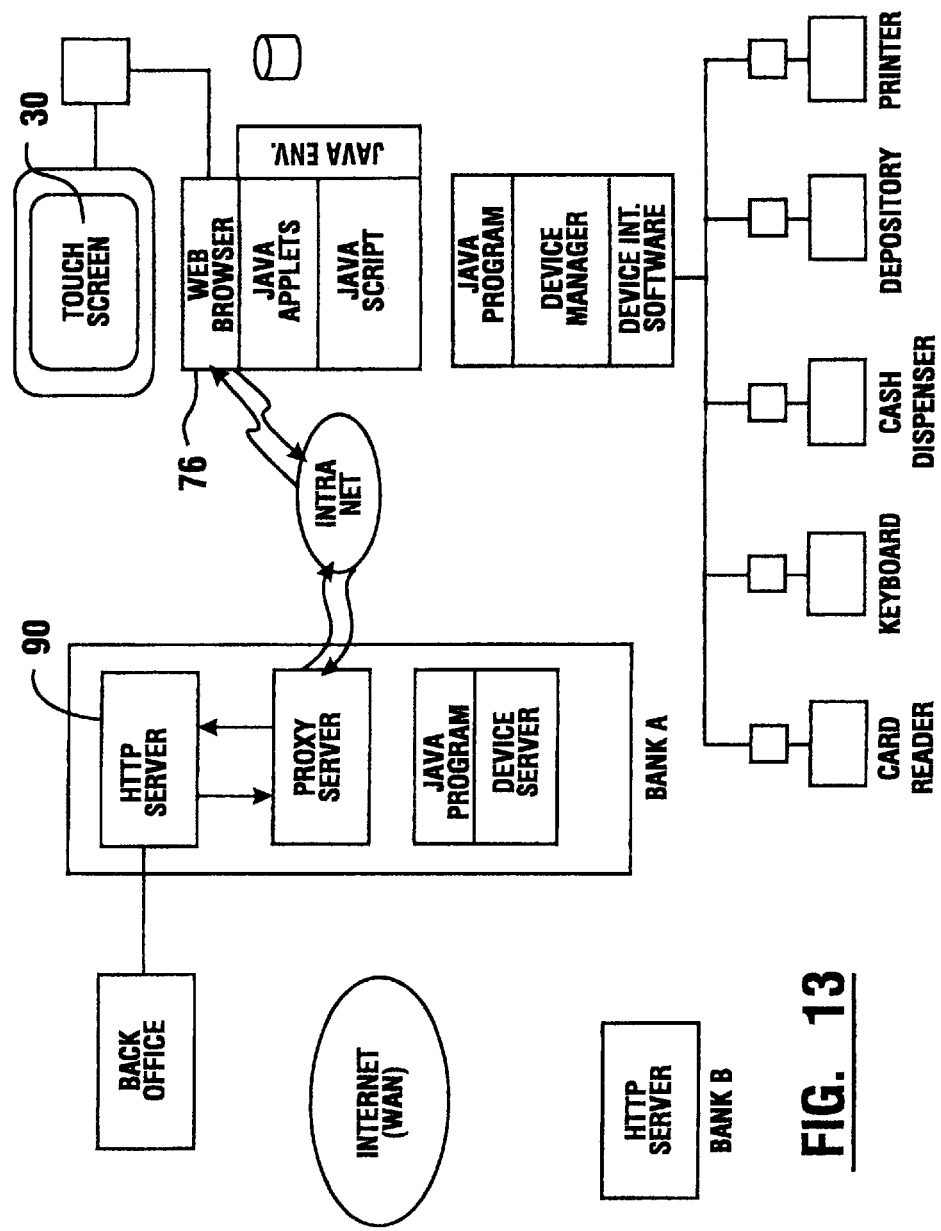

The discussion of the exemplary transaction will now be continued from the point schematically represented in FIG. 11. In response to the cash dispenser 42 dispensing the requested amount of cash, device interfacing software program 64 preferably operates to send a dispense operation message confirming the dispense back to the JAVA applet responsible for the dispense in the device application program 84. As represented in FIG. 12, the particular applet is operative to update the transaction record 104 to indicate the dispense of currency to the customer in the particular amount. The embedded JAVA script instructions which were operative to cause the dispense of currency to the customer, also preferably include instructions to send a confirming message back to the home server 90 that the dispense is complete. The receipt of the dispense operation message indicating the cash was dispensed causes the JAVA applet to configure the HTML document handling portion to send a device response message back to the home server. The home server then is preferably operated in accordance with its programming to indicate to the back office 94 that the customer received the amount of funds dispensed. This amount is deducted from the customer's account in the records maintained by the back office system.

Generally during a transaction it is common to ask the customer if they wish to have a receipt for the transaction. This may be done at various times during the transaction flow. In the present example, after the cash has been dispensed the customer operating the machine is sent such a message as reflected in FIG. 13. The home server 90 is operative to send an HTML document which when processed by the browser produces a screen asking the customer if they would like a receipt. This message is displayed as part of a page on the touch screen 30 responsive to receipt of the message through the browser 76. Alternatively the document may be generated by the machine. In response to the customer indicating that they either do or do not want a receipt, a message is returned to the home server. Again it should be understood that the screens displayed to the customer are preferably those that the customer is accustomed to from his or her home institution, and may be a part of his or her unique home page.

Figure 14:
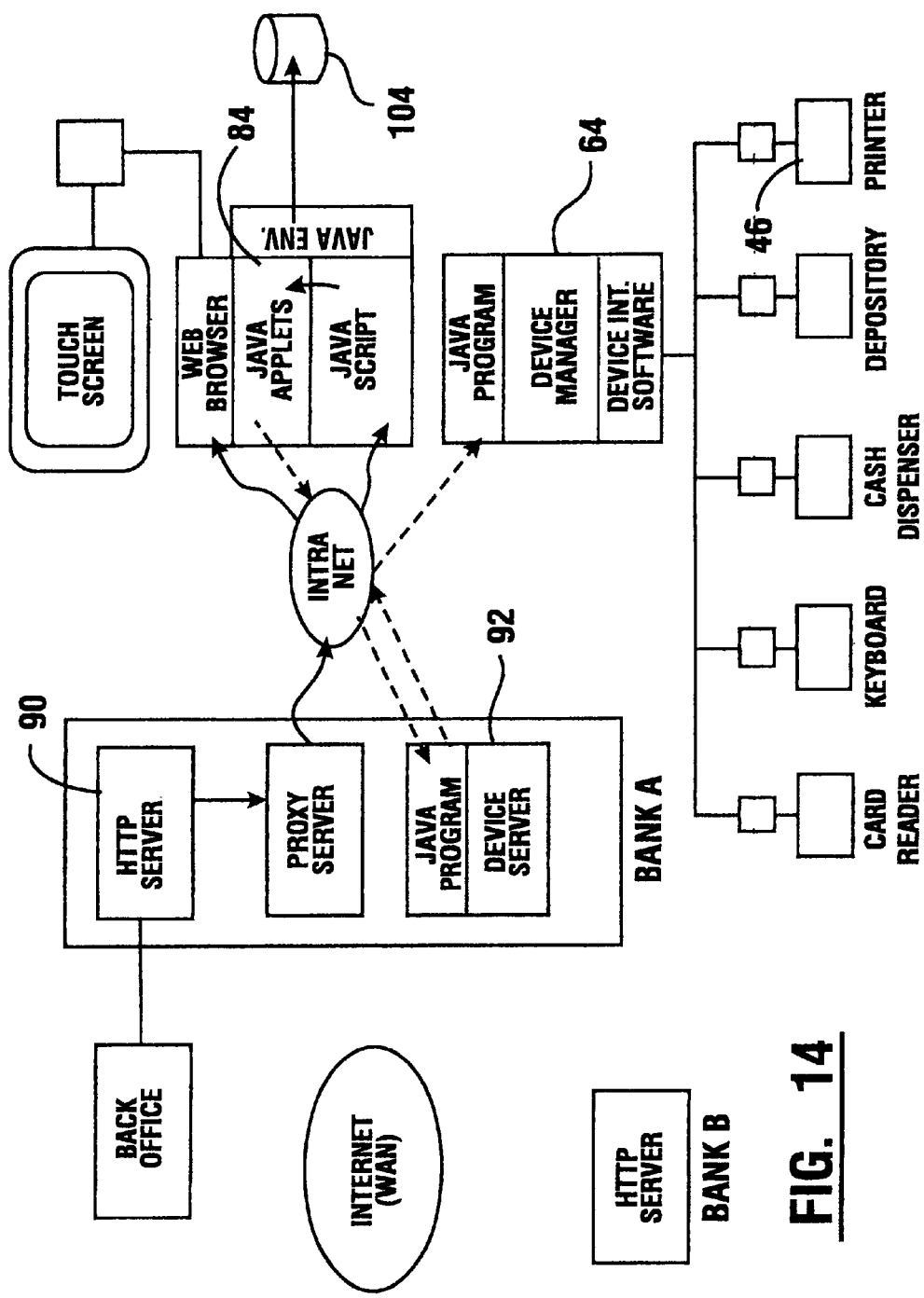

Assuming that the customer wishes to receive a transaction receipt, the home server 90 in the exemplary embodiment operates as shown in FIG. 14 to send a document back to the ATM with embedded JAVA script indicating that a transaction receipt is to be printed. These instructions in JAVA script are communicated to the device application portion 84 which sends a TCP/IP message through the intranet to the device server 92. The device server 92 in turn communicates a message with instructions to the device interfacing software portion 64 in the ATM. In response to receiving the message, software portion 64 is operative to cause the printer 46 to print the customer's transaction receipt. The JAVA applet responsible for enabling the printer is also preferably operative to update the transaction data object or record 104. As later discussed, the applet which controls the printing of the receipt may obtain the data used in printing the receipt from the transaction data object.

It should be understood that even if the customer does not wish to have a receipt it may be desirable to print a record of the transaction in hard copy through the journal printer 48. This may be accomplished in response to imbedded instructions which are part of the same document from the home server 90 which causes the transaction receipt for the customer to be printed, or may be part of a separate document which indicates that the customer has declined the option to receive a transaction receipt. Alternatively, the journal printer may be actuated responsive to other applets such as the applet which causes the dispense of cash, or in another manner chosen by the operator of the ATM. Alternatively or in addition, an electronic record of the information concerning the transaction may be stored in a data store. Such information may later be recovered remotely from the machine, from other system addresses. As will be appreciated from the foregoing description, the operation of the exemplary embodiment of the ATM is inherently flexible and programmable to meet the needs of the system operator.

Figure 15:
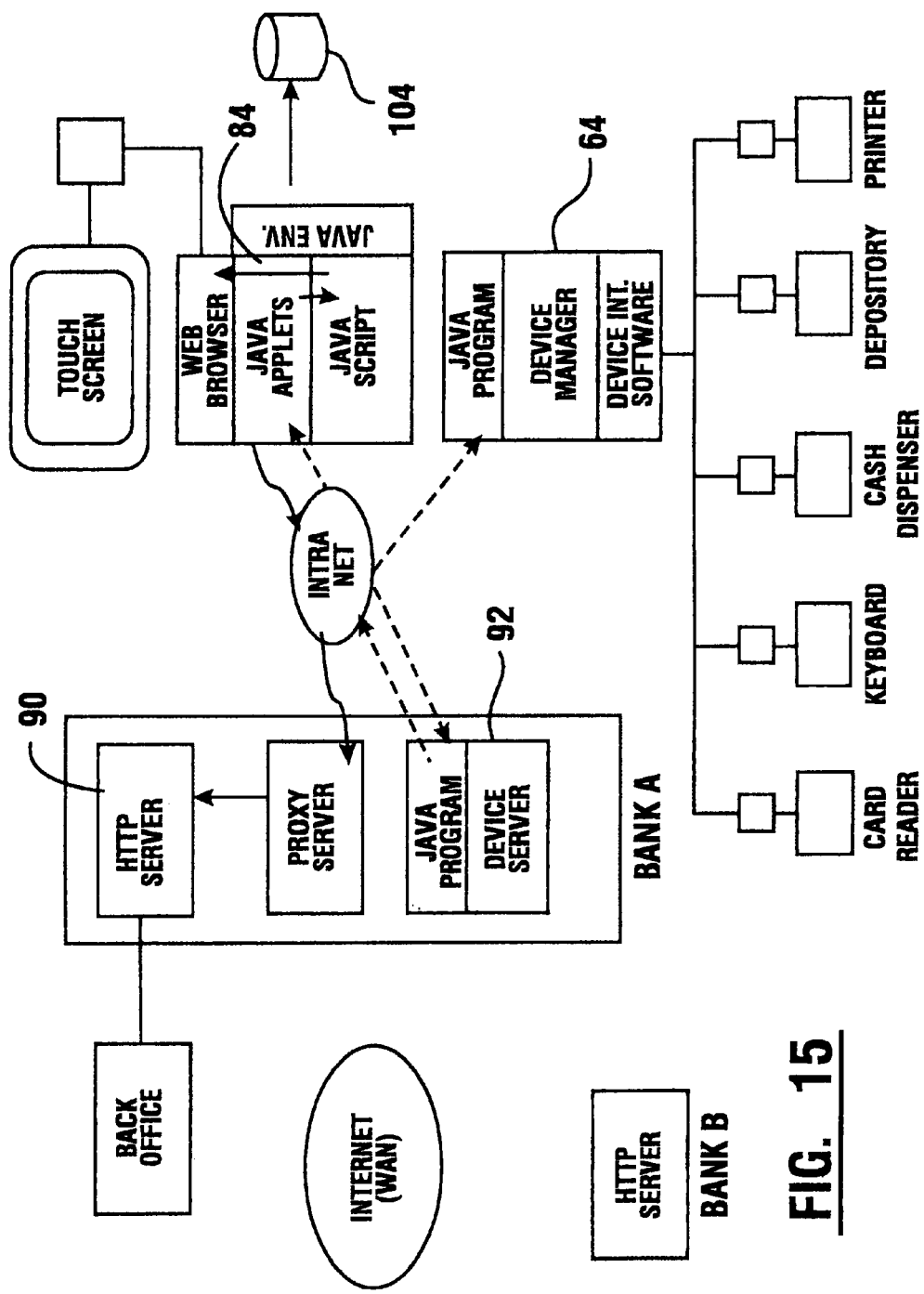
Figure 16:
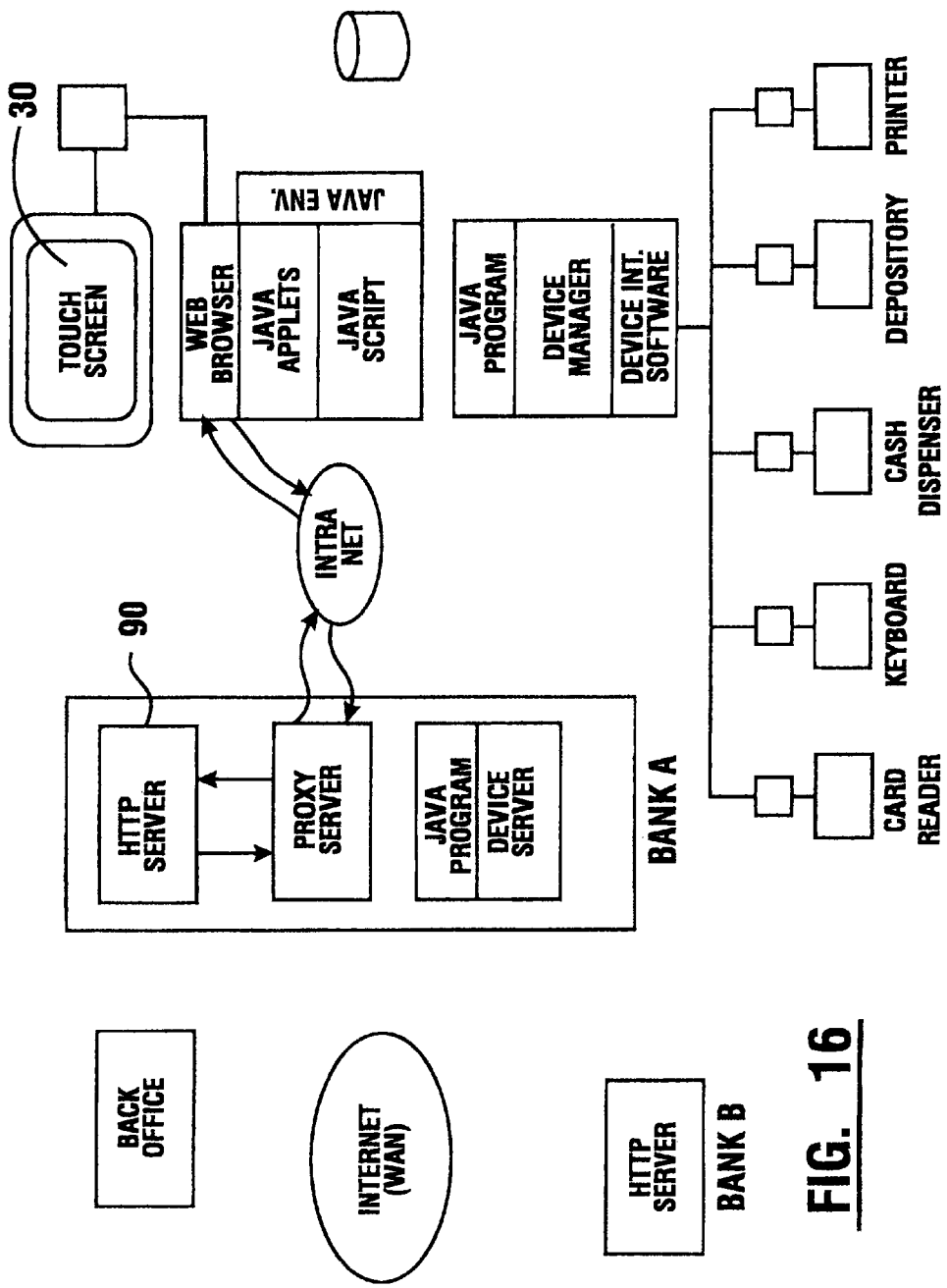

As shown in FIG. 15 upon completion of the printing of the transaction receipt, the software portion 64 is preferably operative to send a device operation message to the device server 92 which is indicative that the requested device function was carried out successfully. The device server 92 is operative to send a corresponding device operation message to the device application portion 84, and in the exemplary embodiment to the particular JAVA applet responsible for the printing of the receipt. The JAVA applet in turn configures the HTML document handling portion to generate a message back to the home server in the form of a device response message to indicate that the receipt was printed for the customer.

Having received cash and a receipt, the customer is then prompted by a display screen generated from an HTML document from the home server 90, to indicate whether they wish to conduct another transaction. The visual page or screen prompting the customer in this regard is displayed on the touch screen 30. For purposes of this example it will be assumed that the customer does not want another transaction and a message to that effect is returned through the HTML document handling portion back to the home server 90.

Figure 17:
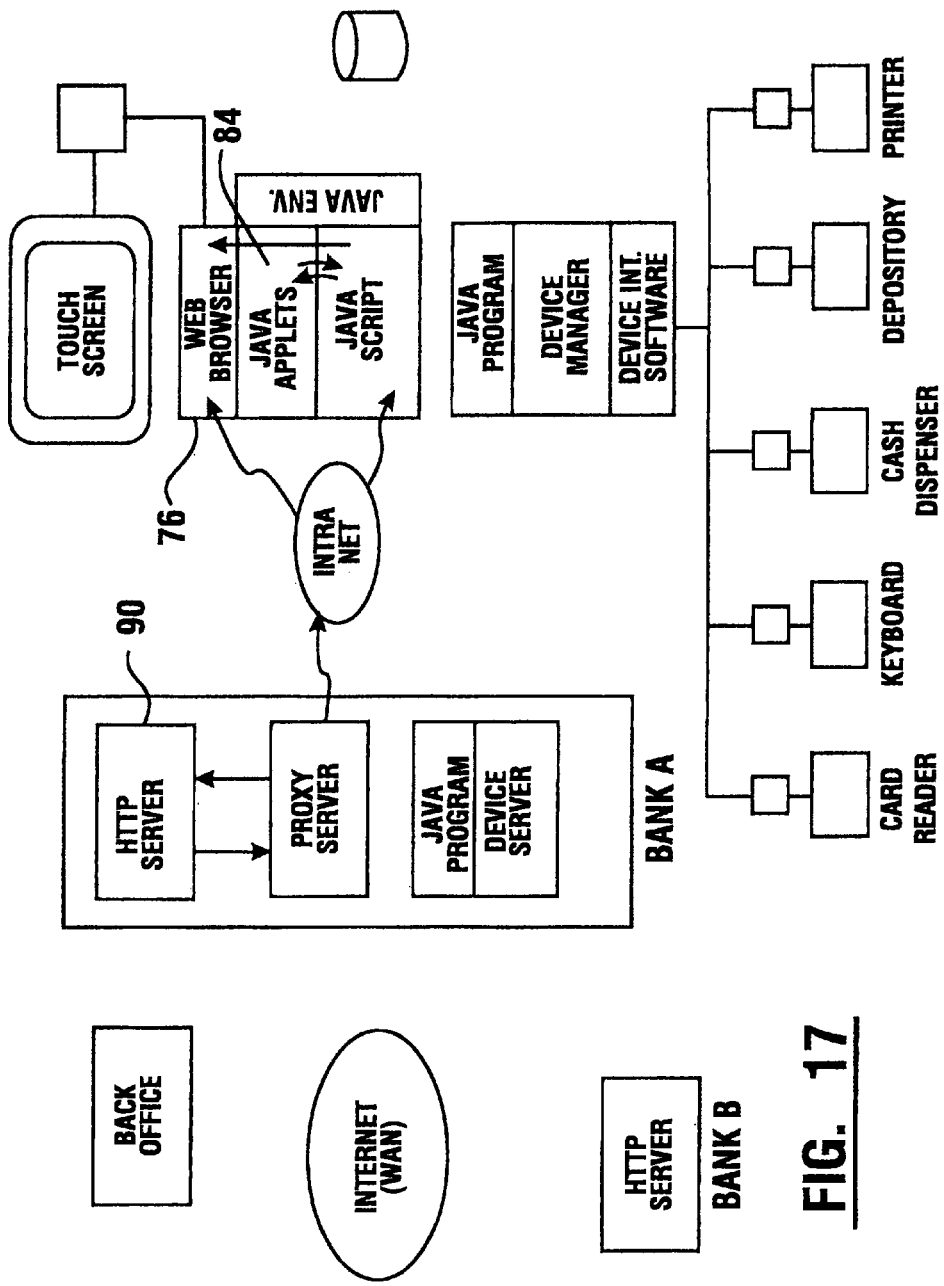

As shown schematically in FIG. 17 in response to receiving a message that the customer is done, the home server 90 is operative to send a "go home" message to the ATM. This message preferably includes an HTML document which when processed by the browser produces a screen display thanking the customer. This message also preferably includes embedded JAVA script which calls the JAVA applet which eventually returns the HTML document handling portion of the ATM back into connection with the URL address on the home server 90 or other network address which provides the documents that are used to output the messages for the so called "attract mode". It should be remembered that the script or instructions included in documents used in some embodiments may operate to cause a message to be sent from the document handling portion to an address on the home server which causes a corresponding HTTP record including the instructions comprising the desired applet to load.

Figure 18:
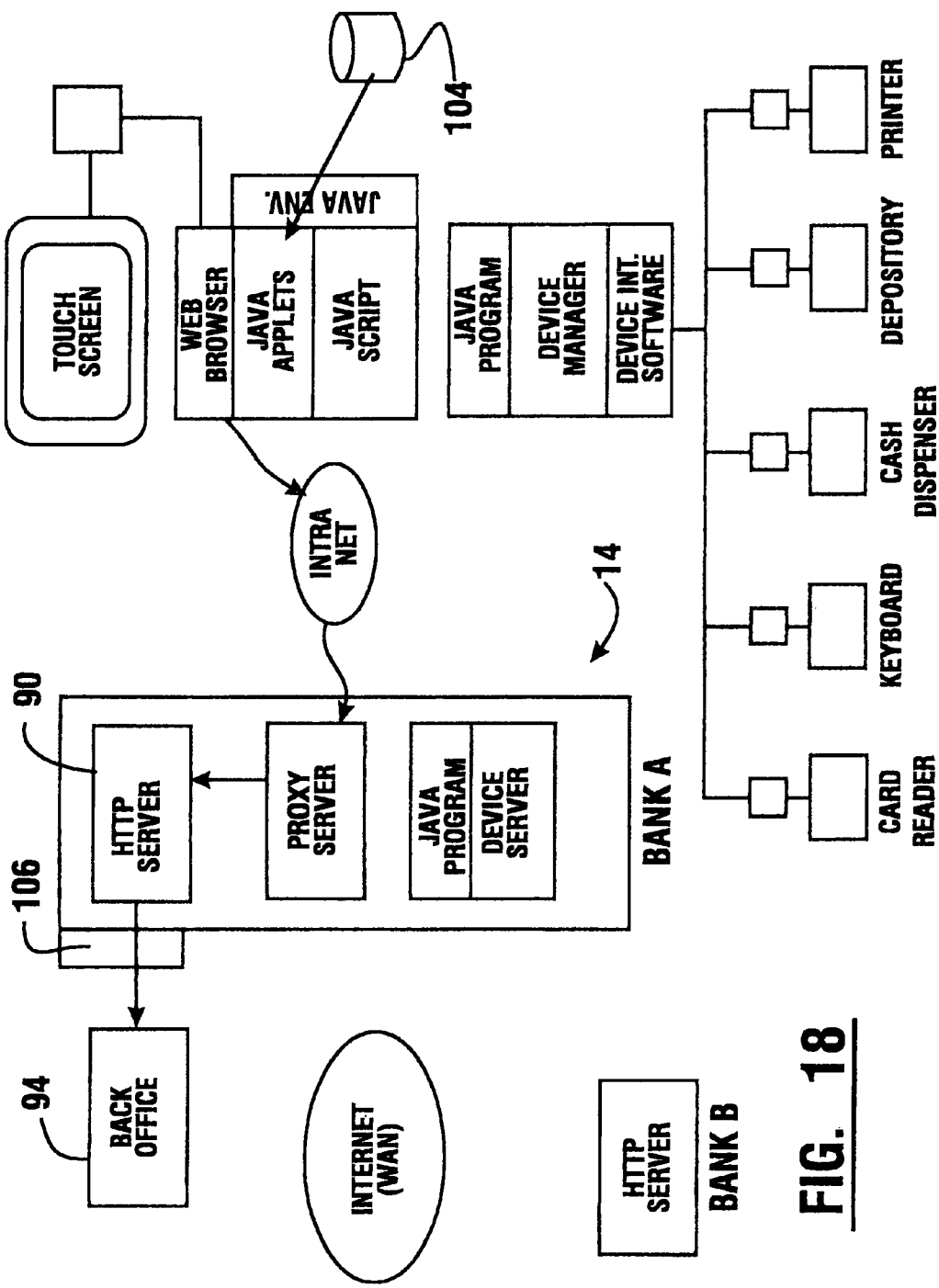
Figure 19:
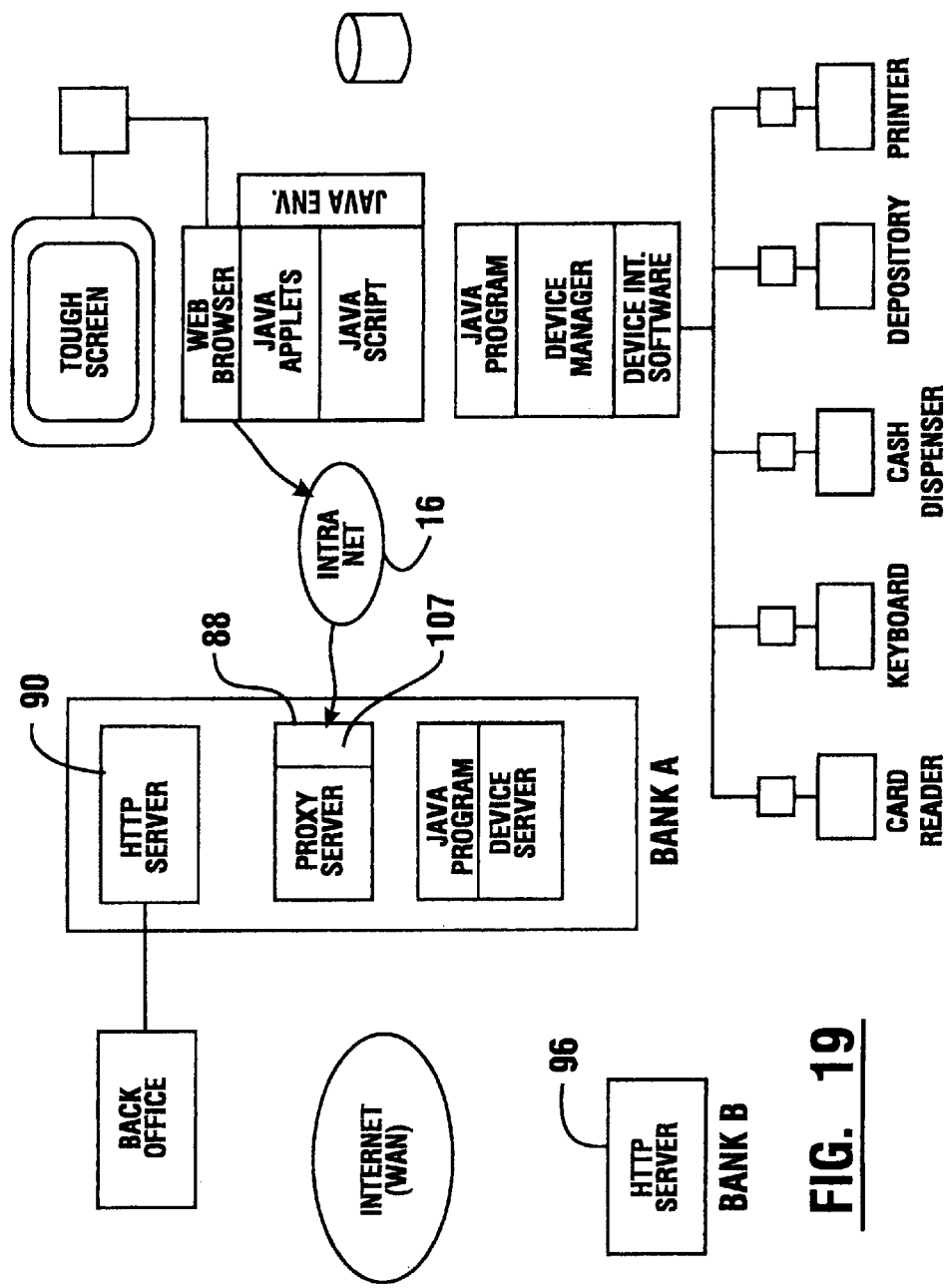

As schematically indicated in FIG. 18, the "go home" command applet is operative to configure the browser 76. After the HTML document handling portion is configured by the JAVA applet to return home, the JAVA applet may be configured to deliver to home server 90 information from the transaction record 104 concerning the transaction that was just completed. Because the exemplary transaction was with a customer of the institution that operates the computer system 14, all the data concerning that transaction should already be recorded in the back office 94. However it will be appreciated that this will not be the case if the transaction was conducted in response to messages from a server operated by a different institution. Also this may not be the case with certain types of transactions such as some credit card transactions, where an authorization is provided during the transactions, and at a later time transaction details are sent for purposes of settlement. Thus, all or a portion of the information from the transaction record 104 may be delivered in response to a "go home" command to the home server 90 and through the CGI to the back office system 94 where it can be identified as duplicate information and discarded. This may be done using remote method invocation (RMI) to pass or deliver the object to server 90 and then transmitting the data through messages from the server to the back office, or through messages or other techniques.

Of course in other embodiments transaction information may be stored in a database for extended periods rather than being returned after each transaction. Alternatively the ATM 12 of the present invention may include applets which are operable to deliver transaction record information to addresses other than that of the home server, if that is desired by the operator of system 14. The computer may be configured through an appropriate applet or other instructions to deliver the stored transaction record data to selected network addresses in the system. Such record data may be delivered in encrypted form as appropriate for the particular system. Such record data may be delivered through the document handling portion of the banking machine. In alternative embodiments such data may be delivered through a separate server component operating in a computer associated with an automated banking machine. By accessing this record data the machine operator or other settlement authority may recover record data relating to transactions. Such data may also be used for recovering data that is used for determining the number and types of transactions conducted at the machine involving other institutions and/or transaction fees associated therewith. Such information may also include information on advertising materials presented to customers. Such information may be processed and used as the basis for sharing transaction fees or receiving payment from advertising entities.

The operation of an exemplary computer system when a "foreign" user uses the ATM 12 is graphically represented with regard to FIGS. 19 through 24. A transaction with a foreign user who is not a customer of the institution that operates ATM 12 and computer system 14, will be operated under the control of the home server 90 and will proceed in the manner of the prior example through the point where the customer inputs their card. The customer inputs a card having indicia corresponding to a network address that does not correspond to the home server 90. The HTML document handling portion is operative to configure a message addressed to access a URL address that corresponds to the indicia on the customer's card or other address responsive to such indicia. For example, the network address may be based on the BIN number encoded on a customer's card. The BIN number can be correlated with an entry in a Financial Institution Table (FIT) or similar cross reference for determining network address data and/or other parameters. This message is delivered to the proxy server 88 which in turn passes the message to the wide area network 18. From the wide area network the message proceeds to the foreign server corresponding to the customer's URL address. For purposes of this example the foreign server corresponds to server 96 which is connected to the Internet.

In the exemplary embodiment of the invention proxy server 88 includes screening software graphically indicated 107. Screening software is preferably operable to check addresses to which messages are being directed by the ATM and to selectively prevent the sending of messages to particular addresses. This serves as a "fire wall" and is desirable for purposes of preventing fraud in the system.

Figure 20:
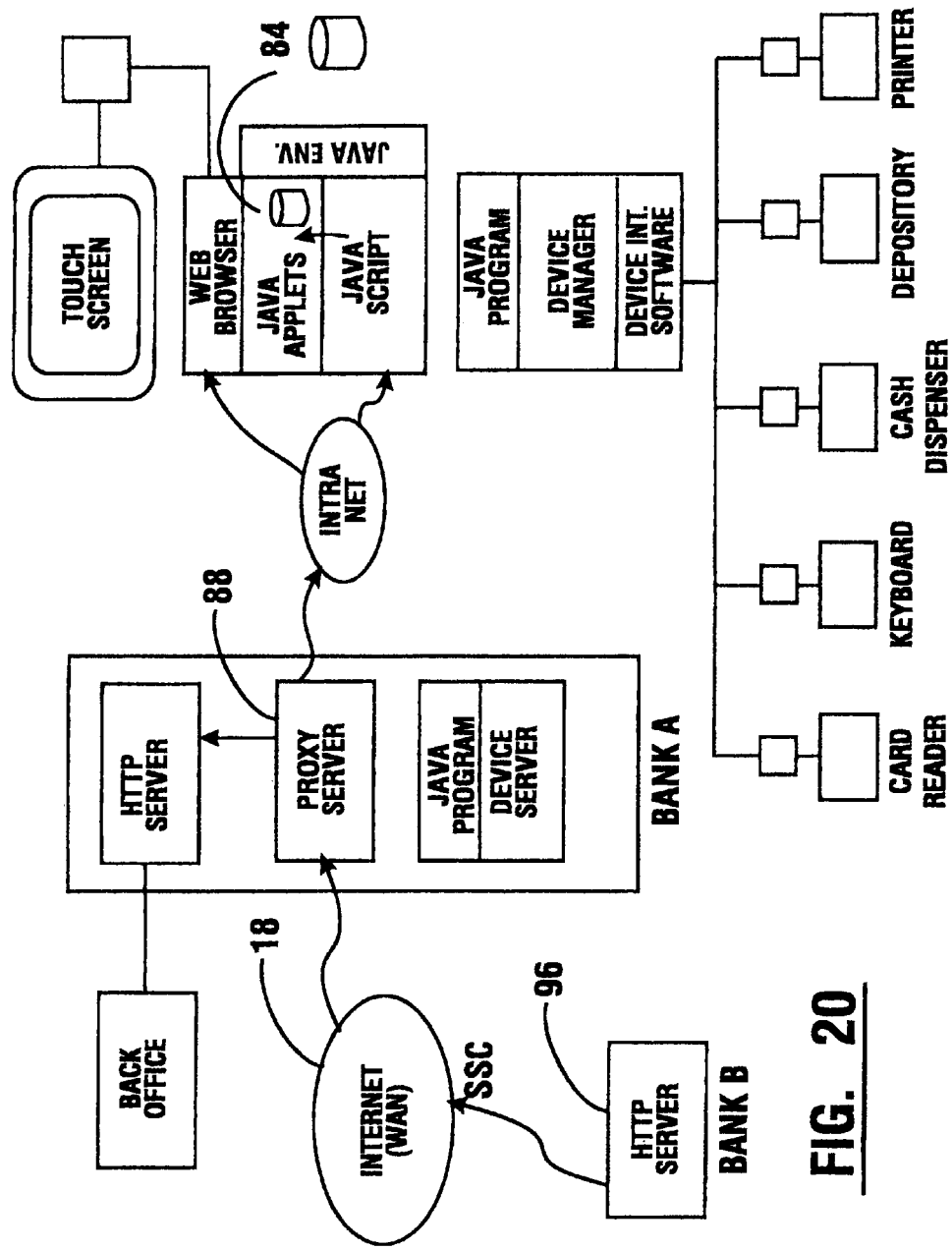

As shown in FIG. 20, the foreign server 96 is preferably operable to communicate HTTP messages, including HTML documents, to the ATM 12 back through the wide area network 18. This may be done using a secure socket connection ("SSC") so as to minimize the risk of interception of the messages. Of course other techniques, including message encryption techniques may be used to minimize the risk of interception of the messages.

As schematically represented in FIG. 20 the response document from foreign server 96 preferably includes embedded JAVA script is representative of or corresponds to a digital signature which identifies the foreign server 96. This may be accomplished by loading an HTTP record including a signed applet, as previously discussed. An applet in application portion 84 in the ATM preferably operates to verify the digital signature in the manner described in the prior example, and sends a message indicating that the transaction has been authorized. The digital identity of the foreign institution will be stored in memory in the ATM for example in the transaction record data, and eventually is recorded in the back office 94.

It should be noted that the HTML documents from the foreign server 96 include instructions so that when they are processed by the browser, the visual pages or screens of the foreign institution which the foreign customer is accustomed to seeing are output. These pages may correspond to a foreign user's "home page" which are tailored specifically to the needs of the particular user.

Figure 21:
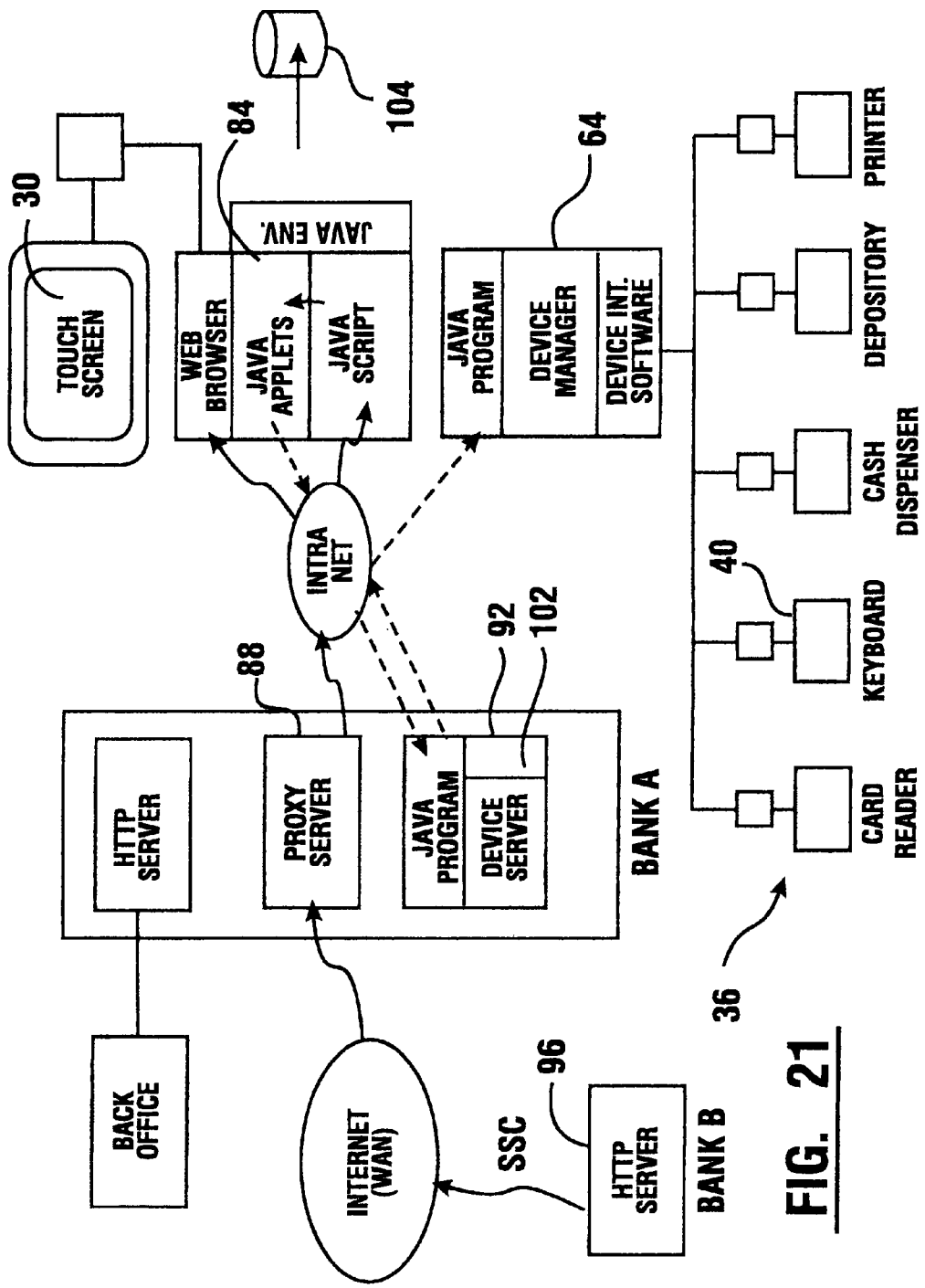

FIG. 21 shows a schematic example of a document accessed through the foreign server 96 and delivered to the ATM 12. The document from the foreign server may include embedded JAVA script which enables operation of the JAVA applets in the manner previously discussed to operate the devices 36 in the ATM. As shown in FIG. 21 the TCP/IP messages to the devices from the JAVA applets pass from the device application portion 84 to the device server 92, and the instructions therefrom are passed to the device interfacing software portion 64 in the ATM. Device operation messages take a reverse path. As these messages pass through the device server 92, monitor software 102 monitors them to minimize the risk of fraud or abuse.

As indicated in FIG. 21, the documents from the foreign server 96 may be operative to output through the touch screen 30 a request for the customer to input their PIN. The embedded JAVA script instructions would, as in the sample transaction previously discussed, include instructions that enable the keyboard 40 to accept the customer's PIN. As in the prior example, a transaction record 104 which includes a shared data object concerning this transaction would be opened by the device application software portion. As previously discussed, provisions may be made to prevent the passage of PIN data through the browser if desired.

Figure 22:
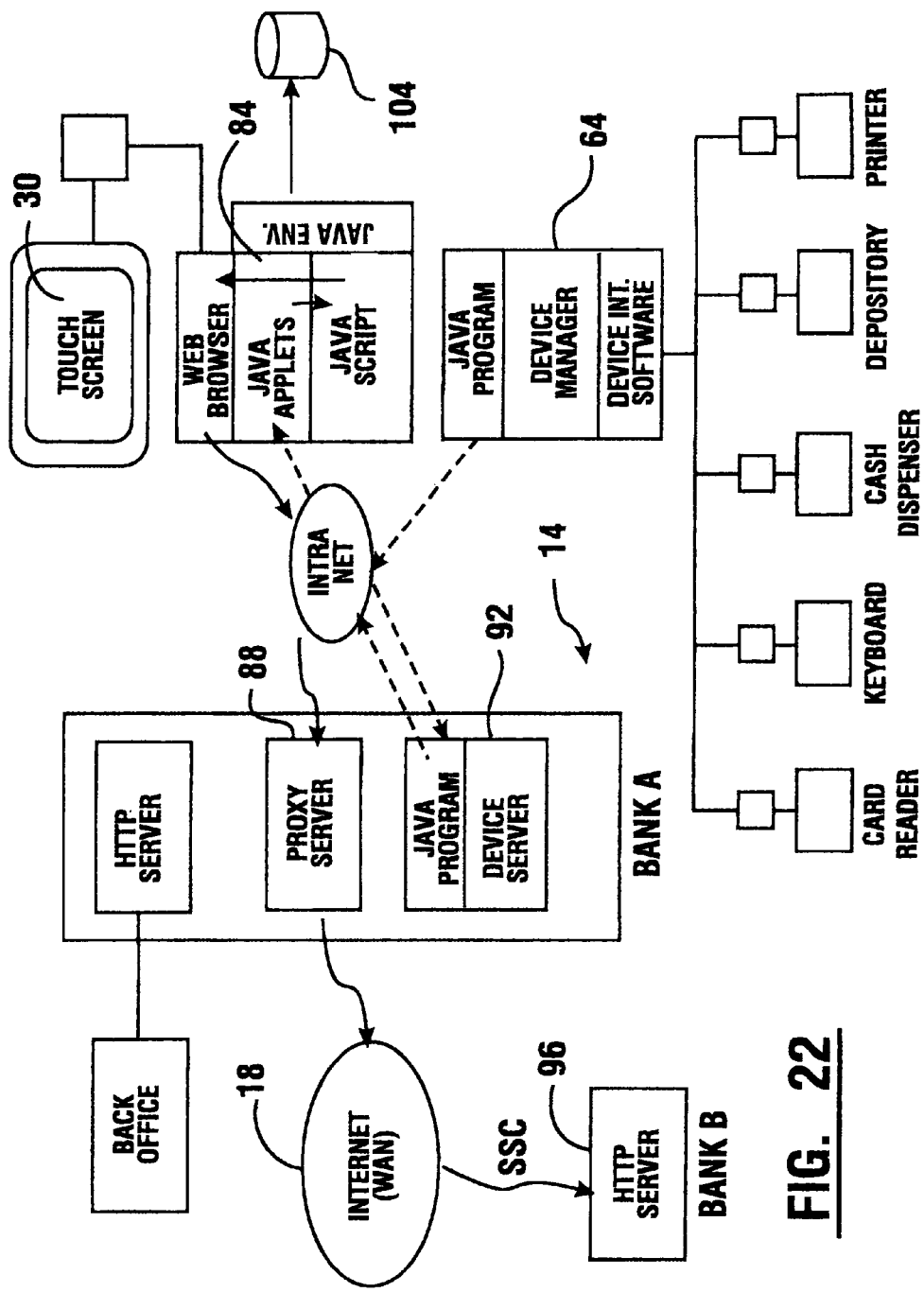

FIG. 22 indicates the return of the device operation message and PIN data to the JAVA applet, which in turn transmits the data back to the foreign server 96 through the wide area network 18 using the secure socket connection. From this point the transaction proceeds generally as previously described, except that the foreign server 96 sends the HTTP records, including HTML documents, and receives the messages from the document handling portion of the ATM. The foreign server 96 includes the JAVA application software necessary to include the embedded JAVA script in the documents that are sent to the ATM to operate the devices 36 in the machine.

As the foreign server 96 operates the machine, the monitor software 102 in the device server 92 is operative to monitor the messages in the manner previously discussed. Such monitoring would for example, operate to prevent the dispense of unduly large amounts of currency out of the machine. The monitoring software may also operate to restrict certain foreign institutions to a subset of the transaction machine devices or capabilities. This is done based on data stored in memory which limits the devices or activities that can be carried out from documents at certain addresses. This may be achieved for example through the use of code plug-ins which implement a class of the transaction objects which limits the operations that can be performed. For example, the operations which enable connection to the foreign server may instantiate the objects which provide specified limited capabilities for messages received from the foreign server. This may for example limit the amount of money dispensed, prevent operation of a check acceptance device, limit the dispense to printed documents such as tickets, prevent operation of the cash dispenser or limit use of the machine in other appropriate ways. This may be done based on the addresses or portions of addresses for documents.

If the capabilities of the machine exposed to the foreign customer are limited, the foreign customer may be provided with a visual interface from the foreign bank based on the transactions the machine can perform and that the owner of the machine will allow. As a result the documents accessed at the foreign bank server may be a variation of what the customer would be provided at a machine operated by the foreign bank. This could be based on documents specifically developed for operating foreign machines, or could be a variant of the usual foreign bank interface with visual indications that certain transactions are not available. In some instances the interface may indicate that some transactions are available with an associated service charge.

The ATM of the described embodiment may enhance security by limiting the addresses that the browser may access. This may be done by maintaining a list in the memory of the machine. This list may be maintained in HTTP record(s) (including documents) accessible through the home bank's intranet. The machine may access the record periodically and update the memory data. This record may itself require a digital signature corresponding to a signature in the terminal memory before the data will be loaded into terminal memory. This information may also include the instructions and information for the ATM to verify that the messages it receives by accessing documents on the foreign server are genuine. This may include digital signatures which when transferred using public key or private key encryption techniques verify the messages as genuine. The machine checks to be sure the signature in the records accessed from the foreign server corresponds to the digital signature for that address stored in memory, and enables operation of transaction devices, such as the cash dispenser, only when such correspondence is present. Of course various approaches to verifying and encrypting messages may be used in various embodiments. As used herein signatures or signed records encompass any indicia which is included in or is derivable from a record which is indicative that it is authorized.

As can also be appreciated from the foregoing disclosure, the foreign server 96 may communicate to the user with outputs through the touch screen in a language that is different from that normally used by the customers of the institution that operates the computer system 14. As a result the HTML documents may cause the display of requests to dispense currency of a type or in an amount which is not included in the ATM. To accommodate this situation an applet may be included in the device application portion 84 to deal with requests for foreign currency. The foreign currency applet causes the ATM to send a message back to its home server for purposes of calculating a closest amount which may be provided to the customer in the available currency in the ATM which corresponds to what the customer requested. As will be appreciated, this applet will be operative to call the particular function address within the home server 90 that is capable of providing this function. When the dispense is made the applet is also operative to indicate to server 96 that the amount dispensed differs somewhat from the amount the customer requested. Of course in other embodiments, other approaches may be used. Alternatively an applet in the machine may generate visual displays that show equivalents in local currency when foreign currency amounts are displayed or processed. This may include presenting both amounts on visual displays presented to a user. Alternatively additional browsers operating in the bank machine as later discussed may produce visual outputs that advise the user of information such as exchange rates or other information pertinent to the customer's transaction.

Figure 23:
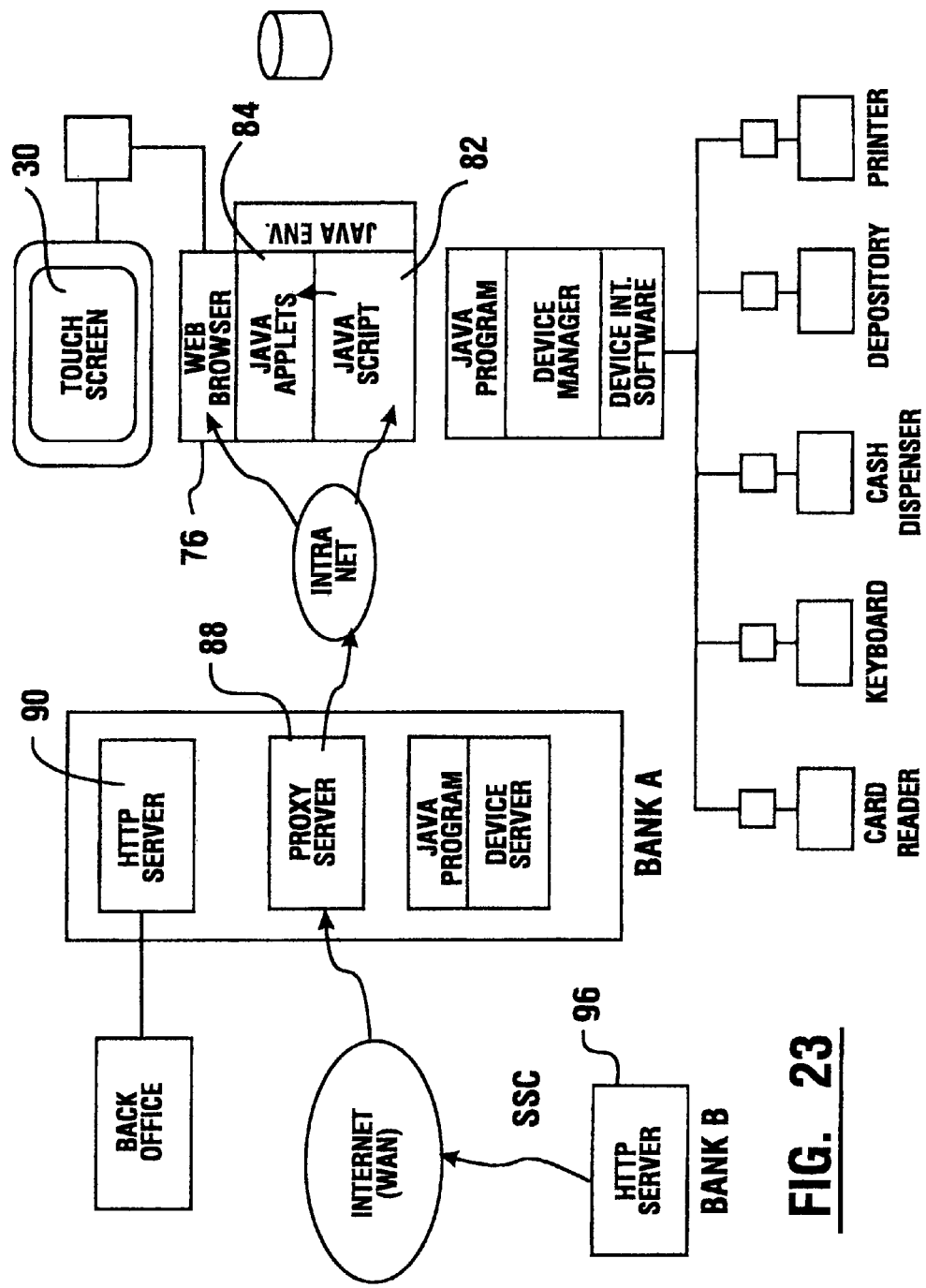

As represented in FIG. 23, when the foreign customer has completed their transactions as indicated through the touch screen 30, the foreign server 96 is operative to send the "go home" message back to the ATM. The receipt of this message is operative in the manner previously described to cause the device application portion 84 to operate responsive to the embedded JAVA script instructions to configure the HTML document handling portion to cause the browser 76 to reestablish communication with the home server 90, or other designated document address.

Figure 24:
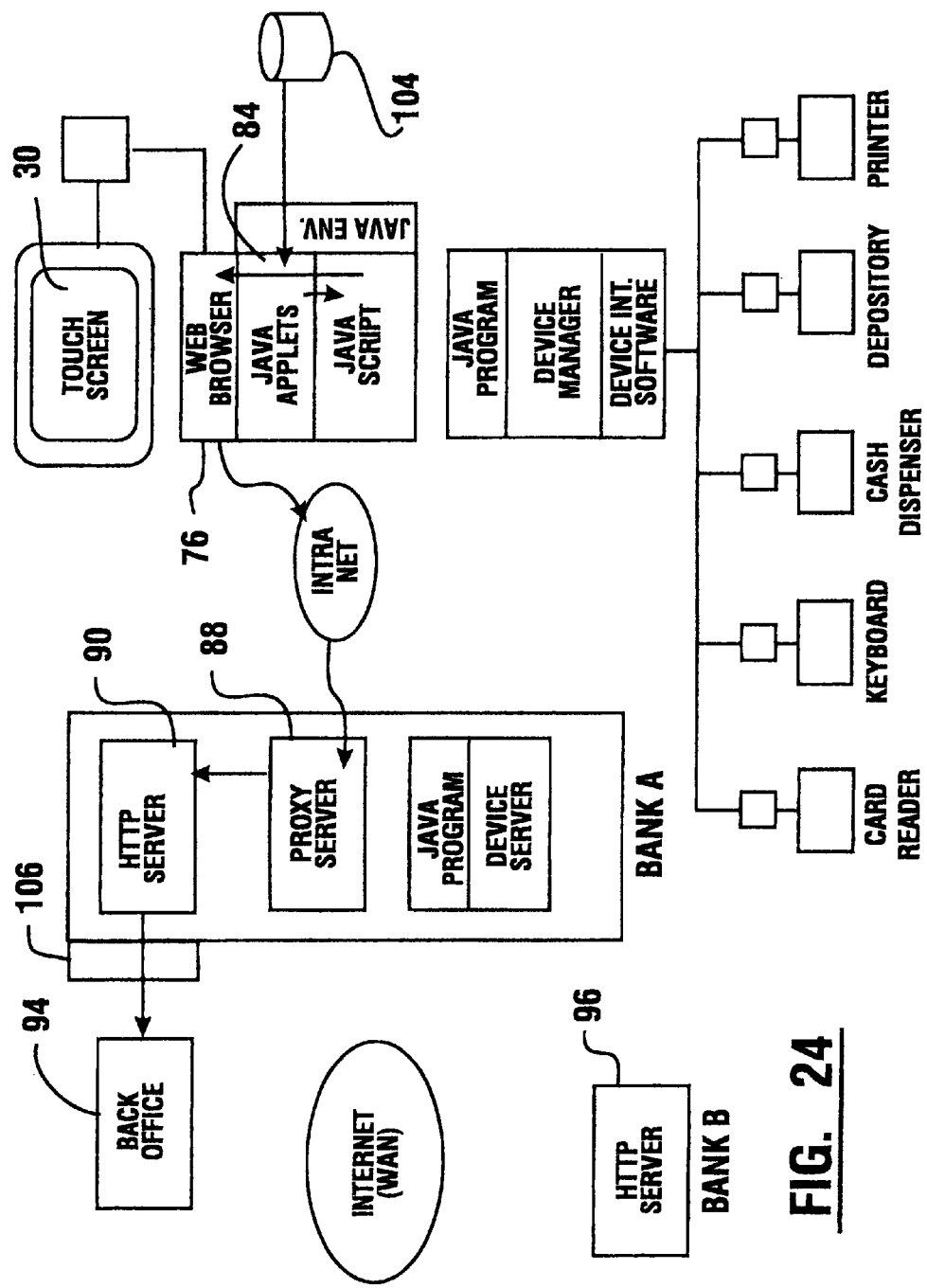

As indicated in FIG. 24 the applet in the device application portion 84 which processes the "go home" message is preferably operative to reconnect to the home server 90 as well as to send the transaction record information in record 104. This transaction record information which in an exemplary embodiment is packaged in a data object, includes the customer name, the foreign institution name, digital identifier, amount information concerning amounts dispensed, transferred or deposited, and all other pertinent transaction data. The transaction data is used by applets in performing transaction steps in which any portion of the data is required. At the completion of the customer's activity at the machine an applet provides a transaction data message which includes at least a portion of the collected data. This data is communicated from server 90 through the CGI 106 to the home bank's back office 94. This information is stored in the back office for later use for purposes of settlement with the foreign bank operating the foreign server 96. Alternatively or in addition, transaction data may be recorded in the terminal in memory such as in an electronic journal as well as in hard copy on a journal printer. Transaction data may be stored for downloading in a batch or by passing objects including data from many transactions. Objects can be instantiated from a remote server such as by remote method invocation. Batch data may be communicated at times and to addresses as may be stored in memory in the terminal configuration data.

An advantage of embodiments of the invention is that transaction data may be delivered to addresses in a local area network or in a wide area network such as the Internet. This facilitates conducting wide varieties of transactions and enables directing messages related to tracking use (such as for electronic purse type smart cards) or for settlement of various transaction types to a selected system address.

It will be appreciated that the described embodiment of the automated banking machine and system of the present invention provides the advantage that when the machine is connected to a wide area network such as the Internet, customers are able to carry out their banking transactions virtually anywhere in the world. Further, despite the broad capabilities of the system, because the machine may be monitored locally, both in terms of connection and activity, the risk of fraud is minimized.

Embodiments of the invention may include a further feature to facilitate access to documents in the network to which the machine is connected. This feature is operative to determine if an HTTP record such as an HTML document or other item is accessible at an address for downloading before the computer will attempt to access the record. This avoids transaction time outs that might otherwise occur as a result of inability to access a record due to the server through which the record is normally accessed being down. Other embodiments may consider both the size of the record and the transfer rate and determine that a transfer speed for the record is not sufficiently rapid, so that an alternative record should be transferred.

In one embodiment this feature is achieved through use of a separate program or applet which checks to see if a server that the computer will subsequently want to access is alive. The applet operates responsive to receiving an address or portion thereof; to which a connection will be made. The applet operates to make a socket connection to the address and loads a small but sufficient amount of the record or otherwise operates to determine that the server through which the record must be accessed is alive. In response to the applet verifying the operation of the remote server, or otherwise determining that conditions indicative that the record may be accessed or loaded, the computer then operates so that the browser or similar software component is enabled to navigate to the address at the appropriate time in the transaction sequence. If the applet is unable to detect that the remote server is alive, or determines that it does not appear the record may be successfully accessed or loaded, steps may be taken to access alternative addresses, generate another output or to discontinue the transaction. Alternative addresses to access may be based on data stored in the memory of the terminal or may be obtained by accessing documents either locally or remotely which include data from which alternative addresses may be obtained or derived. Alternative addresses are similarly checked to make a determination that the records can be accessed before attempts are made to access the alternative records. This approach avoids delays in carrying out transactions.

Alternative embodiments may employ other approaches to determine if desired HTTP records such as HTML documents may be successfully accessed and/or downloaded adequately before the browser providing the customer interface attempts to access the document. Such embodiments may consider in determining whether the document can be successfully accessed, the transfer speed or other conditions related to system operation or document content. For example, the applet which tests to determine that the HTTP record can be accessed, or a further applet, may determine the transfer rate at which the record can be transferred to the computer. The rate at which the data can be transferred may be compared to data stored in memory, and if the rate is slower than the data representative of the desired stored rate an alternative record is accessed. This may be for example an HTML document stored or generated locally in the machine. Other embodiments may include programs which consider the size of the HTTP record and the transfer rate in determining a transfer speed. Such programs then determine if the record can be transferred fast enough to suit the parameters established in the configuration in memory, and if not, alternative addresses are accessed. Such alternative records may be similarly tested for transfer speed before being transferred.

Programs may also consider other factors in deciding to access a particular address, such factors may include for example day and time information, or information from sensors such as sensors in a floor or video imaging systems indicating that other persons are waiting to use the machine. In this way access to documents that have extensive outputs which may tend to prolong transactions can be avoided even when records can be loaded at an adequate speed.

In alternative embodiments of the invention multiple browsers may be operated in the computer(s) of the ATM for purposes of processing instructions in documents. Some browsers may operate to process instructions and may not provide outputs that may be perceived by users of the machine. Such browsers may be operated to provide instructions that are used for operating transaction function devices. For example, a browser which does not produce an output which is visible on a display, may process documents which produce outputs that are operative to cause a printer to produce printed documents.

Other embodiments may operate multiple browsers which provide outputs which can be perceived by customers operating the machine. For example, multiple browsers which are each capable of providing visual (and/or audio) outputs may be operated in respective servers in the machine simultaneously to process documents and provide simultaneous outputs to the user. Such browsers may also process instructions for operating transaction function devices. This may provide the capability for a machine to conduct simultaneous transaction types.

Figure 32:
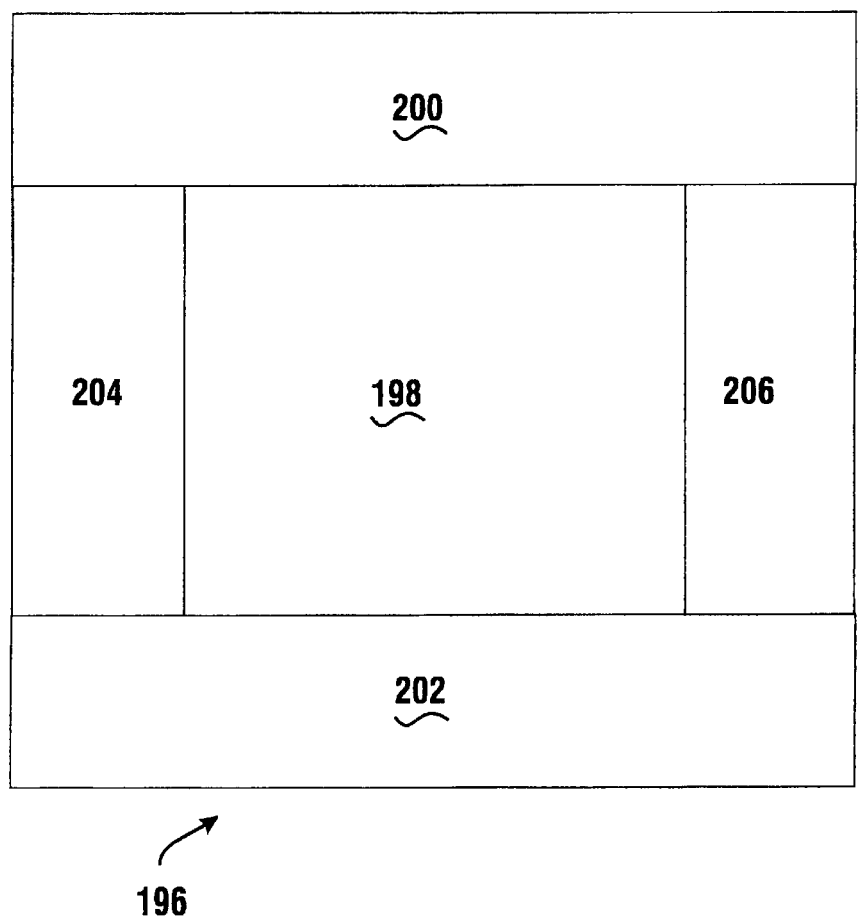
FIG. 32 is a screen output representing combined outputs from five browsers operated in an automated banking machine.

In an exemplary embodiment an ATM has operating therein five (5) visible browsers. Each of these browsers is capable of providing a visible output on the screen of the ATM. FIG. 32 shows an exemplary output screen 196 in which each of the browsers produces a visible output. The main browser output 198 is shown centered on the screen. The main browser output 198 is flanked vertically by a top browser output 200 and a bottom browser output 202. The main browser output is flanked horizontally by a left browser output 204 and a right browser output 206. Each of these browsers are capable of processing documents and communicating with network addresses in the manner previously discussed. Some or all of the browsers may also be operative to pass instructions so as to control transaction function devices in the machine. Alternatively, some browsers may be used primarily to provide outputs to the customer and may not be configured to utilize instructions in accessed documents to operate certain devices in the machine.

In the exemplary embodiment, all five (5) browsers are operated although they may not all provide visible outputs. Initially only the output 198 from the main browser is made visible. The other browsers are made visible using a "show" method which identifies the browser output size. This is done in response to show and size instructions included in documents such as HTML documents. Such instructions are preferably included in documents accessed by the main browser, but may be in documents accessed by other browsers. In the exemplary embodiment browser size is defined by a single thickness indicator. In the case of the "top" and "bottom" browsers, thickness refers to a vertical dimension from the adjacent top or bottom edge of the display, respectively. In the case of the "left" and "right" browsers, the thickness is a horizontal thickness from the respective adjacent edge of the screen. In the exemplary embodiment the output of the main browser is resited automatically to fill the remaining visible space on the screen not occupied by the outputs of the other browsers. In this embodiment the top and bottom browsers when activated occupy the entire width of the screen, while the left and right browsers occupy the space between the top and bottom browser outputs if visible. Other approaches may be used in alternative embodiments.

The use of multiple visible browsers provides the capabilities of providing multiple simultaneous visible outputs based on different documents accessed at different network addresses. This also enables the development of applications providing a series of documents that enable making outputs produced from documents visible at various selected points in a transaction sequence. Such capabilities may be particularly useful in presenting advertising or promotional materials to customers during a transaction. Such capabilities may also be useful for displaying messages in multiple languages for operating the machine. Such capabilities may also be useful in presenting exchange rate information in transactions involving a cardholder from a different country or in conducting currency exchange transactions. The outputs of multiple browsers might also be useful in displaying to the customer documents generated for the customer or documents including information of particular interest to the customer such as the current status of particular stocks or investment opportunities.

Figure 33:
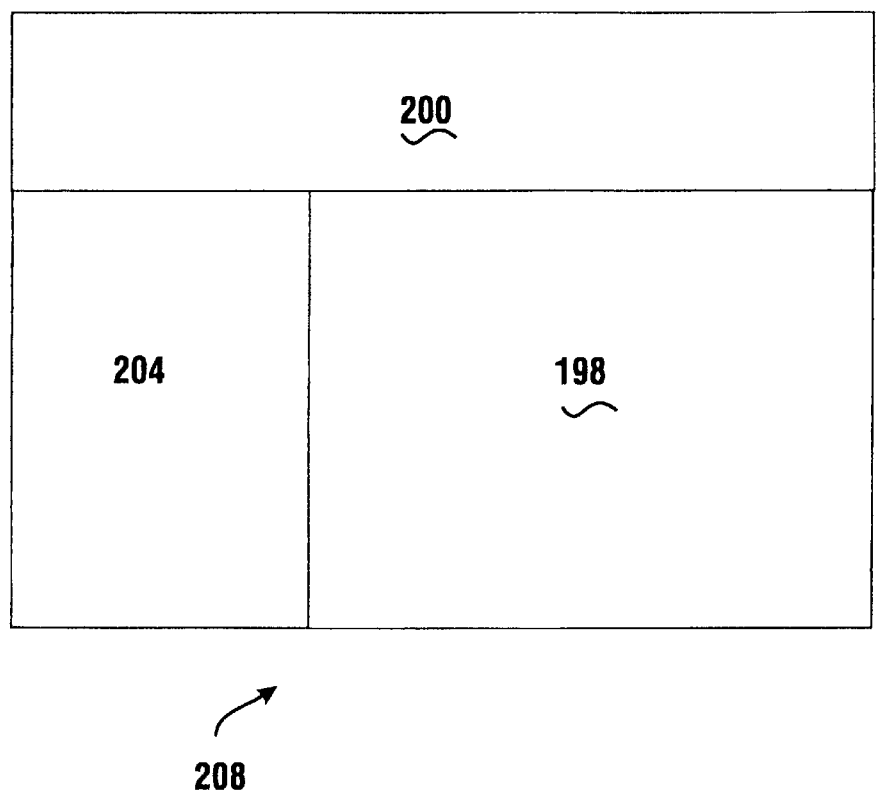
FIG. 33 is a screen output representing outputs from three browsers operating in an automated banking machine.
Figure 34:
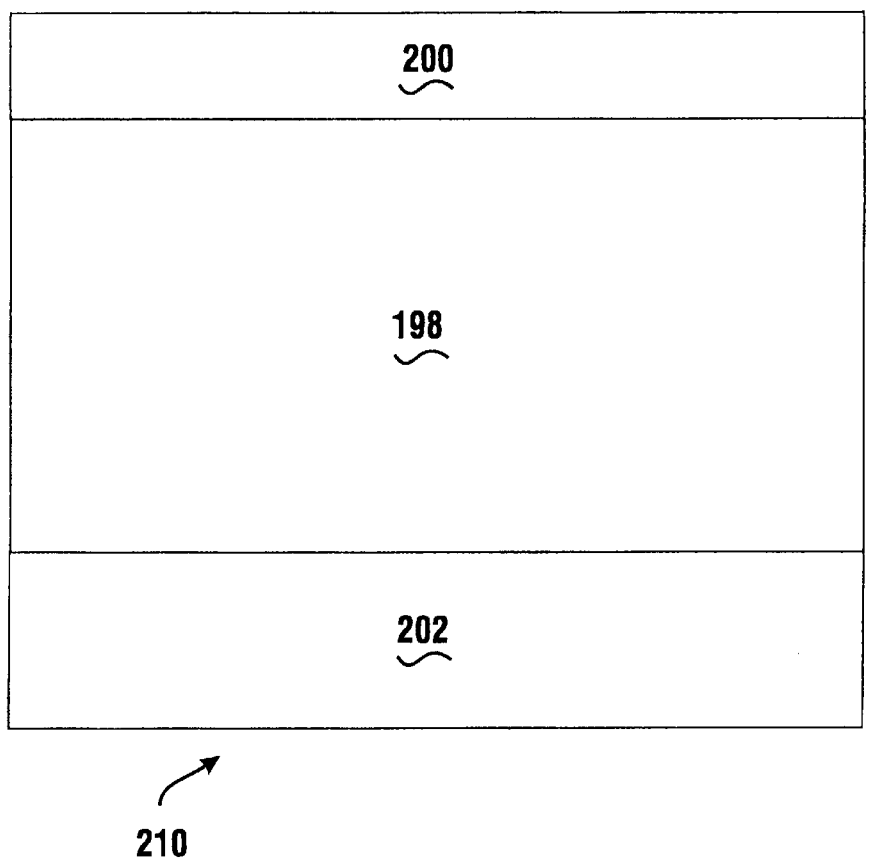
FIG. 34 is a screen output representing outputs from nine browsers operating in an automated banking machine.
Figure 35:
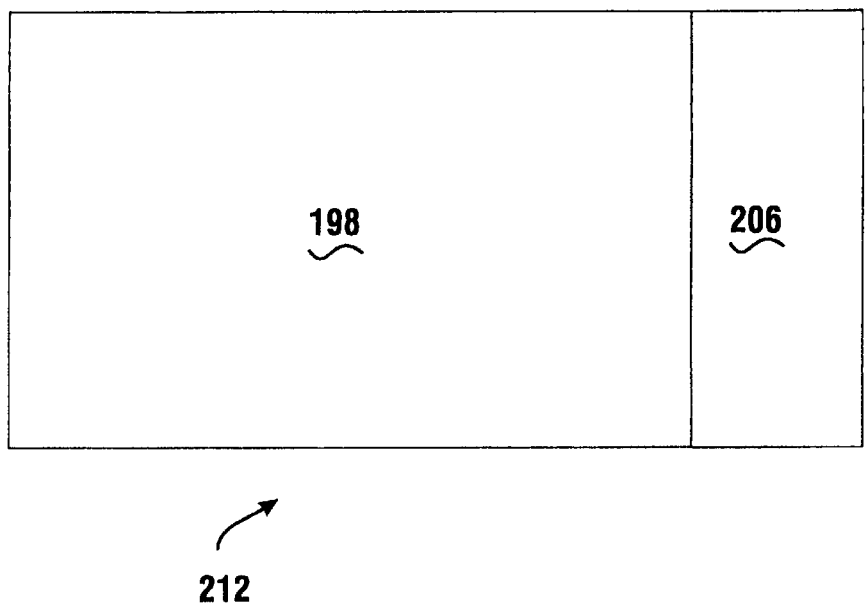
FIG. 35 is a screen output representing outputs from two browsers operating in an automated banking machine.

FIGS. 33 through 35 show examples of screens generated in the exemplary embodiment when certain different browsers are used to produce visible outputs on a screen. FIG. 33 shows a screen 208 in which the left browser output 204 and the top browser output 200 are visible with the main browser output. FIG. 34 shows a screen 210 in which the top browser output 200 and the bottom browser output 202 are visible with the main browser output 198. FIG. 35 shows a screen 212 in which the right browser output 206 and the main browser output 198 are visible. It should be understood that many variations of screens are possible and that such screens may include configurations in which the main browser output is not visible.

As can be appreciated, the operation of multiple browsers in the machine enables carrying out simultaneous transactions. For example, a user may be provided with the opportunity to acquire goods or services through documents processed by one of the browsers while a banking transaction is in progress. Such a browser may work in connection with the other components or the machine as previously discussed, to enable operation of and to receive inputs through various transaction function devices. Such inputs may include inputs accepting or declining offers to purchase goods or services. The transaction data object may also be invoked by the applications operating the other browsers to make such offers. This enables delivery of account data associated with the user which was previously obtained in connection with a banking transaction. This also enables the customer to conveniently elect to pay using the account currently involved in a transaction. Each browser may also develop its own transaction data object or records to use for purposes of accomplishing settlement, as well as for storing data concerning what occurred during a transaction.

While the exemplary embodiment of the invention has been described in connection with using multiple browsers to display information in the course of a banking transaction and to enable multiple transactions to be ongoing simultaneously, it should be understood that the use of multiple browsers providing visible and non visible outputs may be used for numerous and varied purposes that are within the scope of the present invention.

While the described embodiment of the automated banking machine and system of the present invention is shown with regard to a particular type of machine that is made specifically for connectibility to local or wide area networks, conventional automated banking machines may also be adapted to include such capability. Specifically the document handling portion and device application portion may be included with other conventional software which operates within one or more computers in operative connection with an automated banking machine. This enables such ATMs to operate either in the conventional proprietary network or as part of a wide area network. In addition, automated banking machines may be configured to operate their devices through the device interfacing software portion of the invention or through a different software interface when operating in a conventional network. Such machines may switch to requiring device messages to be passed through a device server when operating under the control of a server within the wide area network to maintain security within the system. In this way a single ATM could operate in proprietary networks in the manner of current ATMs as well as in the network configuration of the system of the invention.

Alternative embodiments of the invention operate to communicate transaction messages used in a proprietary ATM network. This may be accomplished by using an interface such as a CGI in connection with either the document handling portion of the ATM or the HTTP home server or other server. The CGI operates in connection with a message conversion program and database to cull the necessary data from the documents and response messages and generate the defined transaction request messages appropriate for the proprietary transaction network. Likewise, the message conversion program and CGI operate to receive function command messages from the proprietary network and convert them and generate appropriate documents and/or TCP/IP messages for use by the ATM. Because these proprietary network formats are defined and the data necessary to produce and interpret the messages are known, the use of the ATM 12 directly in a conventional proprietary ATM network is achieved.

Conventional ATM transaction messages are defined layout messages that do not include documents such as mark up language document or HTTP messages. An example of known conventional messages used to operate ATMs are Diebold 91X messages, NCR PAS messages and IBM 473X messages. Such messages generally involve transmission of a request message from an ATM in a defined layout including customer input data (account/pin) and an indication of the type and amount of transaction requested. The request message is received by an ATM host computer which sends back a response message with a defined layout which includes an indication whether the transaction is authorized. The ATM then returns another message to the host computer indicating whether the machine was able to carry out the transaction. The messages used in such conventional proprietary networks generally occupy relatively little bandwidth.

In connecting the ATM of the invention to such a network, a server is provided. The server is in operative connection with a memory which includes a relational database or other data store which holds the message conversion and document creation data. In one configuration, the server is connected to the document handling portion through a network, or may reside on the computer of the ATM. The server produces the documents which the browser accesses and which include the transaction device instructions. The server (or a connected server) communicates the conventional messages with the host. One server may provide an interface for several ATMs connected to it in a LAN, or alternatively, each ATM may have its own server operating therein.

The ability of ATM 12 to communicate in a proprietary network also enables operation of the ATM in a manner in which the interface is generated by a user's home institution in the manner previously described, but in which transactions are authorized through messages directed through a proprietary ATM network. This achieves the security of using the proprietary network while providing the customer with the advantages of the familiar home bank interface and/or "personal home page" interface.

In such a configuration the ATM transaction function devices may be operated in a conventional manner in response to conventional ATM transaction messages such as Diebold 91X messages, NCR PAS messages or IBM 473X messages, in the proprietary network. The customer output devices, such as the display (and speakers if provided) communicate outputs responsive to documents processed through a browser connected to a local or wide area network. The browser accesses documents to prompt a customer through operation of a transaction, but the documents do not include instructions which enable operation of devices such as the cash dispenser absent authorization from the proprietary network.

In one configuration the browser may be operated by the computer in response to the status of devices in the machine, as the devices are operated in response to conventional ATM messages. In this manner the browser may be navigated to selected addresses, including addresses which are associated with the customer based on customer input data. However, as the documents received by the browser will not independently operate the transaction function devices, there is less need for security measures in accessing documents. As a result, the customer may still operate the machine in response to a familiar and unique interface, and marketing information such as advertising or other material may be presented in the transaction sequence using the techniques previously discussed.

In other embodiments machines may perform some device functions based on conventional messages, while others may be performed in response to instructions in HTML documents or other HTTP messages. For example HTML documents may provide considerable data for use by printers or other output devices. Some embodiments may access documents with instructions, but may ignore some and act in response to others. The approach may be selected by the systems operator by configuring the software based on their requirements.

It should be understood that embodiments of the invention may also provide for the generation of the appropriate documents which are processed by the document handling software. Such documents may be dynamically generated responsive to information delivered through messages from the ATM that include instructions and data which are indicative of customer or transaction related information. This enables messages to and from the ATM to be communicated with a much more limited number of network addresses. The dynamic generation of various documents such as XML documents may be accomplished by one or more computers based on data stored in one or more data stores. A plurality of documents may be generated corresponding to a number of entities from a single server. Such documents may be tailored to the transaction options or promotional information provided by each such entity. The documents may include the graphics, icons, prompts, trademarks and other visible features and/or embedded instructions corresponding to non-visible outputs as appropriate for the corresponding entity. In this way documents corresponding to a plurality of banks, service providers, advertisers and other entities may be generated by one or more computers and delivered through one or more servers as appropriate responsive to the information in messages form the ATM and information stored in one or more data stores operatively connected to the computers.

A further advantage of a system configuration of the exemplary embodiment is that it has enhanced flexibility for communicating messages associated with the ATM. The device manager 68 preferably generates status messages associated with the status of devices 36. These status messages may commonly represent information about conditions which exist at the devices. Such messages may indicate that supplies of paper for printers or currency, are low or are depleted. Other messages may indicate that devices are not functioning properly. Often such messages indicate that the ATM requires servicing. All such types of messages are referred to herein interchangeably as either status or fault messages.

The device interfacing software portion 64 in the exemplary embodiment communicates through the intranet 16 using TCP/IP messages. While the messages associated with exemplary transactions previously described are directed to the device server 92, the software portion 64 may include a server and be configured to address fault and status messages to other addresses in the intranet or the Internet. For example, such fault or status messages may be directed to a software application which delivers messages to a service provider. Further, fault messages may be selectively directed based on the nature of the fault indicated. For example, fault messages indicative of a need to replenish currency or supplies may be directed to an address in the intranet associated with an entity who has responsibility for replenishing supplies. Alternatively, fault messages which indicate a need for other types of servicing may be directed to an address associated with an entity who can provide the type of servicing required.

Alternatively, the selective dispatching of fault messages to addresses in the intranet 16 may be accomplished by appropriately configuring device server 92. In addition, either software portion 64 or device server 92 may direct fault messages from the ATMs to a fault handling system such as to a computer operating Event Management System™ software available from Diebold, Incorporated. Such software is operative to resolve the nature of the fault condition and to notify appropriate personnel of the corrective action to be taken. Examples of fault handling system approaches are described in U.S. Pat. No. 5,984,178 the disclosure of which is incorporated herein by reference.

The ATM 12 may further include a software function to assist in diagnosing problems and providing remedial service. As graphically represented in FIG. 2, alternative embodiments of the ATM 12 may include a mini-HTTP server 109 which is in communication with the device interfacing software portion 64. Server 109 is configured to receive device status messages and to produce HTTP records including documents in response thereto, which provide data representative of device status to a diagnostic device 110 such as a hand-held computer terminal. Server 109 includes a CGI for interfacing with the device software so that a technician may access the information in the records accessible at the HTTP addresses related to status messages, and input test and corrective instructions through diagnostic device 110. The HTTP records and/or documents generated by server 109 may preferably include graphic and/or audio instructions indicative of conditions such as problems, as well as corrective action data and repair instructions.

In alternative versions of the invention the functions of the mini-HTTP server 109 may reside in device server 92. This may be particularly appropriate where the function of the device server resides on the computer in the ATM. Regardless of where the function resides the use of the visual and audio output components generated from processing documents associated with maintenance and diagnostic messages, facilitates servicing of the ATM.

The records or documents delivered through the mini-HTTP server may include instructions that correspond to the status or fault conditions. Such records or documents may be accessed locally as previously discussed, or may be accessed remotely. A technician using a hand-held computer which includes a browser or other software operative to access the HTTP records may access the documents locally for purposes of maintenance, diagnosis and servicing. In some situations the customer interface and browser associated therewith may be used to access the mini-HTTP server, or a separate browser, display and input devices on the machine and intended for use servicing activity may be used. Alternatively, the fault and status messages may be monitored from terminals at locations anywhere that are connected in the network. The mini-HTTP server handling status and fault messages may also be configured to send an e-mail or other message to a selected network address or a group of addresses whenever a particular condition or group of conditions exist.

A further useful aspect of the exemplary embodiment is that HTTP messages may also be sent to the mini-HTTP server to attempt to correct problems. Such messages may include instructions that are operative to cause the running of diagnostic tests and the delivery of messages indicating results. It may also include messages which cause devices to operate to test or attempt to clear jams and other malfunctions. This can often be done from remote locations. Of course, when there is a significant risk of unauthorized access to the server handling fault or status messages, appropriate security measures such as the type previously discussed, should be taken.

The HTTP records which indicate the status of the transaction function devices may have different forms depending on the software configuration and the needs of the system operator. In some embodiments the device status information for one or more devices may be represented by indicia contained within a data object. The data object may be transferred to other connected computers to provide the status data. The transfer of the data object may be accomplished by remote method invocation (RMI) for example. The data in the transferred data object may then be used to generate message and/or outputs desired by the system operator. This technique may be particularly useful when the operator wishes to connect the machine to an existing monitoring system and indicia included in the data object can be used to generate outputs or messages indicative of device status that can be processed by the existing system. Plug-ins may further be used to achieve communication between existing monitoring systems and transaction machines which have different types of status conditions or different types of message formats. This includes machines which have different types of transaction function devices and capabilities.

The technique of transferring a data object may also be used to conduct testing or modification of transaction function devices. For example, indicia in the data object may be modified by a servicer and the object passed back to the machine. The software in the machine may cause the transaction function devices to operate or change conditions or programming in response to the modified data object. This may include for example clearing a fault indication or causing a device to operate to clear a jam or to conduct a test. The results of such activity may be reflected in modified indicia in the data object which may then be transferred to the computer in the diagnostic terminal. Of course, the approaches discussed herein are exemplary and other approaches will be apparent to those skilled in the art from the description herein.

Figure 25:
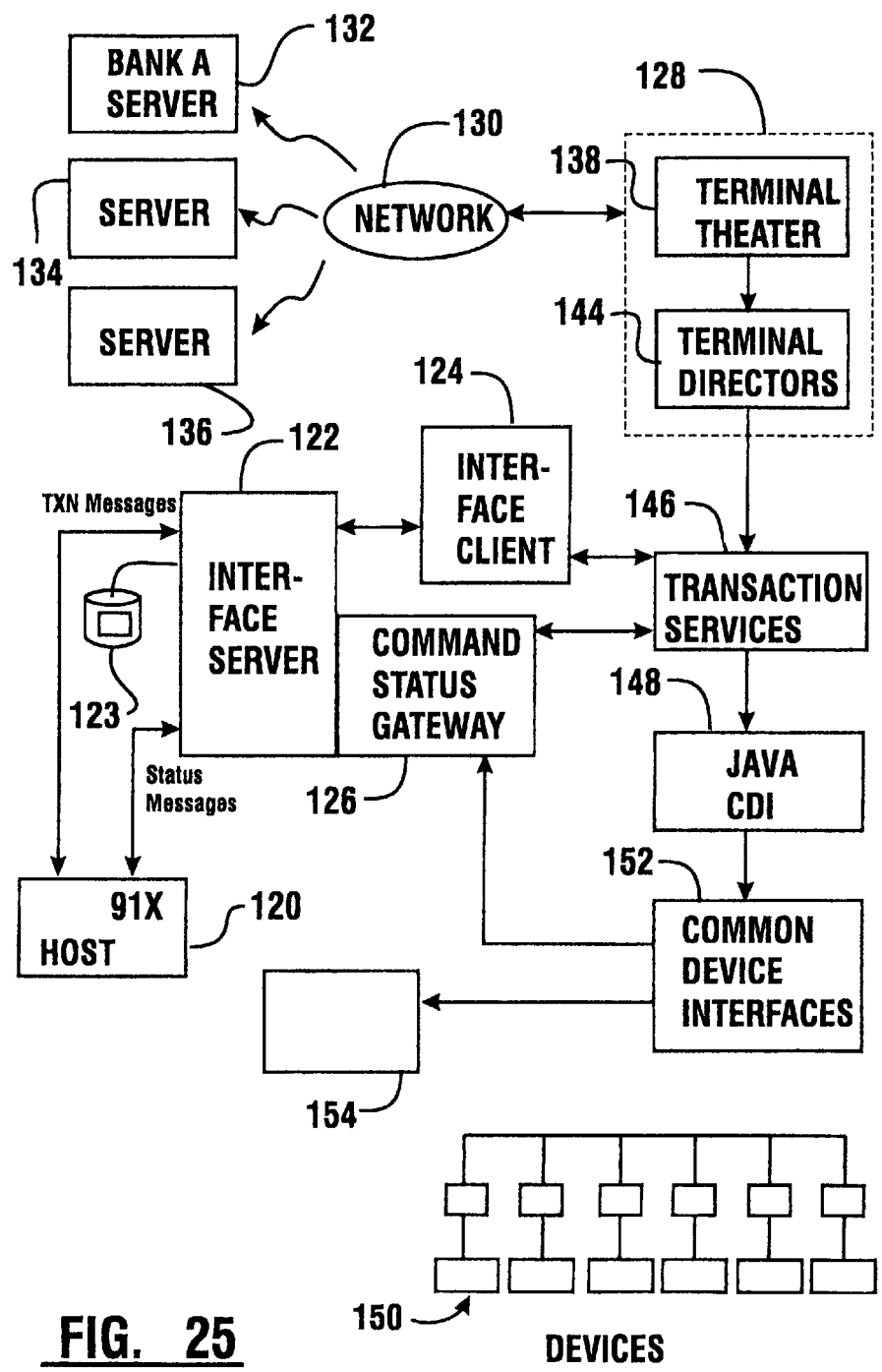
FIG. 25 is a schematic view of a network configuration including an alternative embodiment of the automated banking machine of the present invention.

FIG. 25 shows a schematic view of a network configuration for an alternative embodiment of the automated banking machine of the present invention. The embodiment shown in FIG. 25 includes an automated banking machine specifically adapted for operating in connection with conventional automated banking machine systems such as systems which operate using Diebold 91X ATM message formats or other non-HTTP conventional format. A host computer 120 in this exemplary embodiment is a conventional ATM host which communicates using such messages. The host communicates with an interface server schematically indicated 122. Interface server 122 operates in the manner previously discussed and is in operative connection with a memory that includes the information necessary to convert HTTP messages that pertain to a transaction request to a 91X request message or other conventional message, which can be handled by host computer 120. Likewise interface server 122 and the instructions and data stored in memory are operative to convert a conventional 91X command message or other conventional command message from the host 120 into HTTP messages which can be used by the automated banking machine to carry out the command. Similarly interface server 122 is operative to receive the HTTP messages which correspond to the response of the automated banking machine to the commands and to produce a 91X response message or other conventional response message to the host.

In accomplishing these functions the interface server communicates with an interface client 124 which in the preferred embodiment is a COMM plug-in which operates on the banking machine terminal under a Windows NT® operating environment. Interface server 122 also includes a command/status gateway 126. The command/status gateway is operative to receive command and status messages from the software portions handling the functional devices within the machine. The messages concerning the devices are used in producing transaction messages to send back to host 120. In addition, the command status gateway portion also produces status messages indicative of the status of devices which may also be communicated to the host.

The interface server 122, command status gateway portion 126 and interface client 124 may reside in software on the automated banking machine terminal. In this configuration the terminal appears to the host computer to be a conventional machine. Alternatively interface server 122 and command status gateway portion 126 may reside on a separate server, while the interface client portion 124 may reside on the terminal. This enables the interface server 122 to handle a number of automated banking machines by connecting the machines to the interface server through a network.

The alternative configuration of the automated banking machine system shown in FIG. 25 is particularly adapted for use in connection with existing ATM system. The machine includes a computer with a document handling portion 128 which includes one or more visible or non-visible browsers which operate in the manner of the embodiments previously described. The document handling portion is alternatively referred to as a browser herein for purposes of simplicity. The document handling portion operates in connection with a network 130 to access HTTP records in the form of documents through servers 132, 134 and 136. For purposes of this example server 132 will be considered the server of the home bank which operates the automated banking machine. The browser portion 128 is enabled to access documents of its home bank for purposes of obtaining content and instructions for purposes of outputting information to customers as well as for operating devices on the machine. Servers 134 and 136 are representative of other servers which the automated banking machine may be instructed to access for purposes of downloading documents which include information or instructions. Often such documents from non-home bank servers will include information which is to be presented to customers such as advertising, promotional material, stock quotations or other types of information. It should be understood that the servers 134 and 136 may be directly connected to network 130 or may be accessed through other networks and servers. In some embodiments such servers may be accessed through the Internet for purposes of providing documents to the automated banking machine.

Figure 26:
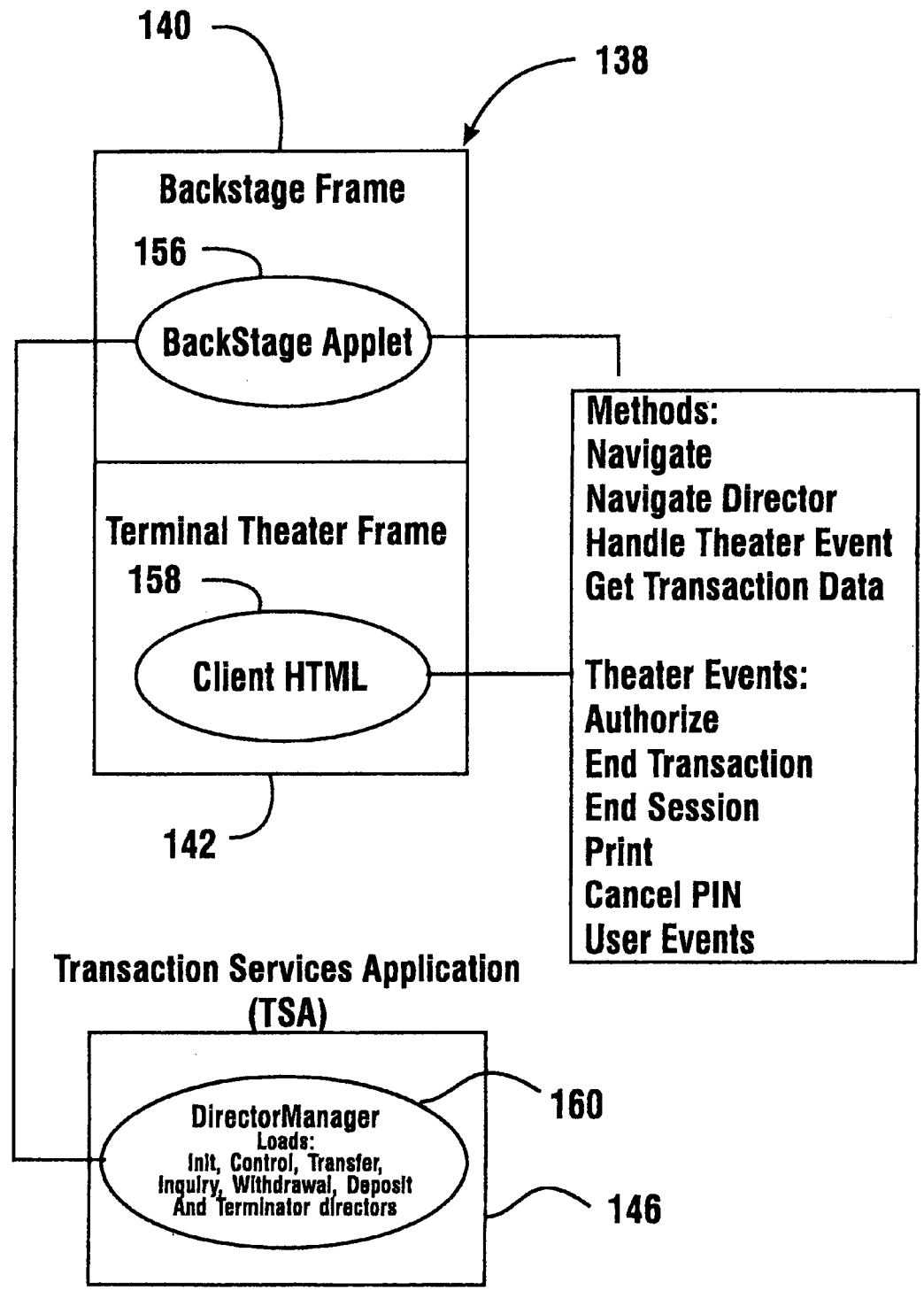
FIG. 26 is a schematic view of frames in the HTML document handling portion of the alternative embodiment of the automated banking machine shown in FIG. 25.

Document handling portion 128 in this exemplary embodiment includes a terminal theater software portion schematically indicated 138. Terminal theater portion 138 is schematically shown in greater detail in FIG. 26. Terminal theater portion 138 includes a back stage frame 140 and a theater frame 142. The back stage frame 140 although it resides in the browser, is not visible on the screen of the automated banking machine. The theater frame 142 is a visible frame and controls what is shown to the customer.

As schematically represented in FIG. 25 the HTML document handling portion also includes a terminal director portion 144. The terminal director portion includes directors which are related instances of applets which are used in carrying out particular types of transactions. The terminal directors generally correspond to the operation of the JAVA applets in the previously described embodiment.

The automated banking machine of the exemplary alternative embodiment further includes a transaction services application (TSA) schematically indicated 146. The transaction services application provides security, terminal condition, terminal authorization and key management services within the automated banking machine. The transaction services application includes a function for communicating HTTP messages with the interface server 122. The transaction services application may also communicate through a network such as network 130 in a manner later explained. The transaction services application also provides a server function which enables the transaction services application to carry out the functions of the device server 92 in the previously described embodiment.

The automated banking machine of the alternative embodiment further includes JAVA common device interfaces schematically indicated 148. The JAVA common device interfaces in the exemplary embodiment are related instances of applets which control and coordinate the operation of the functional devices 150 of the machines which perform transaction functions. The functional devices may include devices of the types described in connection with the previous embodiment or other types of devices which operate to carry out a function related to a transaction. The JAVA common device interfaces 148 communicate with the functional devices through common device interfaces schematically represented 152. The common device interfaces (CDIs) provide an interface that controls the electromechanical modules in the functional devices included in the automated banking machine. The common device interfaces are schematically shown in connection with a diagnostic server 154. The diagnostic server operates in a manner similar to server 109 of the previously described embodiment. The diagnostic server 154 is useful in diagnosing status and in correcting problems with the devices in the automated banking machine.

Referring again to FIG. 26 the backstage frame 140 within the terminal theater portion 138 is a component called the backstage applet 156. The backstage applet 156 is preferably a relatively thin component. Instructions referred to as script included in documents accessed by the browser selectively cause the backstage applet to notify a terminal director when an action is to take place in response to the instructions included in the accessed document. The backstage applet also operates to request that a new document be accessed. The backstage applet also provides access to the shared transaction data object previously discussed which holds transaction data.

The theater frame 142 controls the user interface as seen by the user of the automated banking machine terminal. Client HTML schematically represented 158 in the theater frame 142 defines the identifying indicia associated with events sent to a director manager through the backstage applet and provides an interface to the director manager's public methods. The director manager schematically indicated 160 in FIG. 26, has a class which resides in the transaction services application (TSA) 146 as shown. The director manager class residing in the TSA process is operative to load the terminal directors 144 to the document handling portion. The director manager also includes a backstage applet class that resides in the backstage frame 140. The backstage applet class of the director manager provides an interface for the client HTML to make requests on the director manager. Instructions in documents can pass events through the backstage applet 156 to the director manager. Such events include a request to authorize a transaction. Such requests may also include indications that the customer has completed a transaction or that a document loaded by the browser includes instructions requesting that the session be terminated. Other events which can be passed through the director manager include print events. Other events in this exemplary embodiment which can be passed through the backstage applet to the director manager include an indication that an entry was canceled, or other defined user events.

In response to receiving events the director manager of the embodiment shown responds to instructions in documents accessed by the browser to perform functions which include changing the content of the theater frame 142. The director manager responsive to such instructions, also changes the active terminal director class. The director manager also caches terminal director classes for later use or loads terminal director classes and documents from a list of available servers. The director manager also provides access to the shared transaction data object holding transaction data for a particular transaction. The director manager also sends terminal theater events to the backstage control class of the current terminal director and provides a screen timeout timer. Of course in other embodiments the terminal director may carry out other functions.

In operation of the alternative embodiment shown in FIG. 25 the terminal directors 144 in the transaction services application 146 enables selectively accessing documents with the document handling portion 128. The documents accessed may include instructions which are used to operate the automated banking machine and the functional devices thereon. The transaction services application 146 is further operative to communicate the HTTP messages which are passed to the interface server 122 and which are used to generate conventional ATM messages which can be handled by the host 120. The dispensing of currency and other transfers of value are carried out in response to approval from the host 120, while the interface and other functions are controlled through instructions in documents accessed through the browser.

In an exemplary embodiment the ATM or other transaction machine communicates with the conventional ATM host by passing the transaction data object between the computer in the ATM and the interface server. This transfer is preferably accomplished by the remote message invocation (RMI) feature of software such as JAVA. Of course other methods for transferring the data object file using HTTP may be used.

As previously discussed, the transaction data object holds transaction data and perhaps other data pertinent to the customer or the transaction. The machine acquires data pertinent to the transaction such as account data from a card, a customer's PIN number, requested transaction(s) and amount(s), and includes this data among the transaction data.

Once the data needed to generate a conventional ATM transaction message is represented in the transaction data, the data object is transferred to the interface server. The interface server is in operative connection with a database 123 or other item holding conversion data as schematically indicated. The conversion data is used by the software associated with the server to generate a conventional ATM transaction request message to the host 120. The conventional message may be formatted as a conventional 91X message or other type of conventional non-HTTP transaction message.

After processing the host 120 responds with a conventional response message. The components of the response message are received at the server and processed responsive to the conversion data to produce modified transaction data in the data object. This modified transaction data preferably includes data indicative of whether the requested transaction is authorized or denied, as well as other data. For example, if the transaction is denied it may include data which is indicative of the reason for the denial.

The transaction data object with the modified transaction data is then transferred to the computer operating the ATM by RMI or other transfer method. The transaction services application 146 operating in software receives the data object and operates the transaction function devices responsive to the modified transaction data. The transaction data object has the transaction data therein further modified by the inclusion of information concerning operation of the devices. After the devices have operated, the transaction data object with the further modified transaction data is passed back to the interface server 122. The modified transaction data is then used to generate a message to the ATM host. The message to the host includes data corresponding to the modified transaction data. Usually this message is a conventional non-HTTP completion message indicating whether the transaction was successfully carried out by the transaction function devices.

The format of the non-HTTP conventional transaction messages may be readily changed in the described embodiment. This can be achieved through the use of plug-ins. The plug-ins are operative to put data into, and to extract data from, the transaction data object. The plug-ins achieve conversion between the transaction data and desired conventional non-HTTP messages. The use of plug-ins enables more readily using the ATM of the described embodiment in connection with varied types of conventional transaction networks.

Transaction data in the transaction data object is also preferably operative to have the computer operate the browser or multiple browsers, to access selected documents. This may be done to indicate that the transaction is authorized or denied, as well as to access specific documents responsive to components of the message. For example, customers of banks other than the one operating the ATM may be given certain promotions not presented to the bank's existing customers. The transaction data indicative of why a transaction is denied can be used to access documents which provide an explanation, or can encourage the customer to take other action, such as to take a cash advance on a credit card or to apply for a loan.

The system schematically shown in FIG. 25 is an example of an automated banking machine system that achieves the wide variety of interface options available through the use of an HTML interface while preserving compatibility with existing banking machine systems and the security techniques associated therewith. Of course in other embodiments alternative approaches and configurations may be used.

A further advantage incorporated into the system schematically represented in FIG. 25 is the ability to operate the software components of the described embodiment of the present invention in existing automated banking machines. As will be appreciated, the handling of HTML or other types of documents in conventional computers requires inputs through a QWERTY type keyboard as well as mouse clicks in locations corresponding to icons or other features on documents to successfully navigate and use such documents. Conventional automated banking machines generally do not include a mouse or full keyboard. Rather, conventional automated banking machines generally include an alphanumeric keypad similar to that used on telephones, as well as function keys. Embodiments of the present invention enable the operation of the system with terminals which have such interfaces operate in a manner which attains benefits of the invention.

Figure 27:
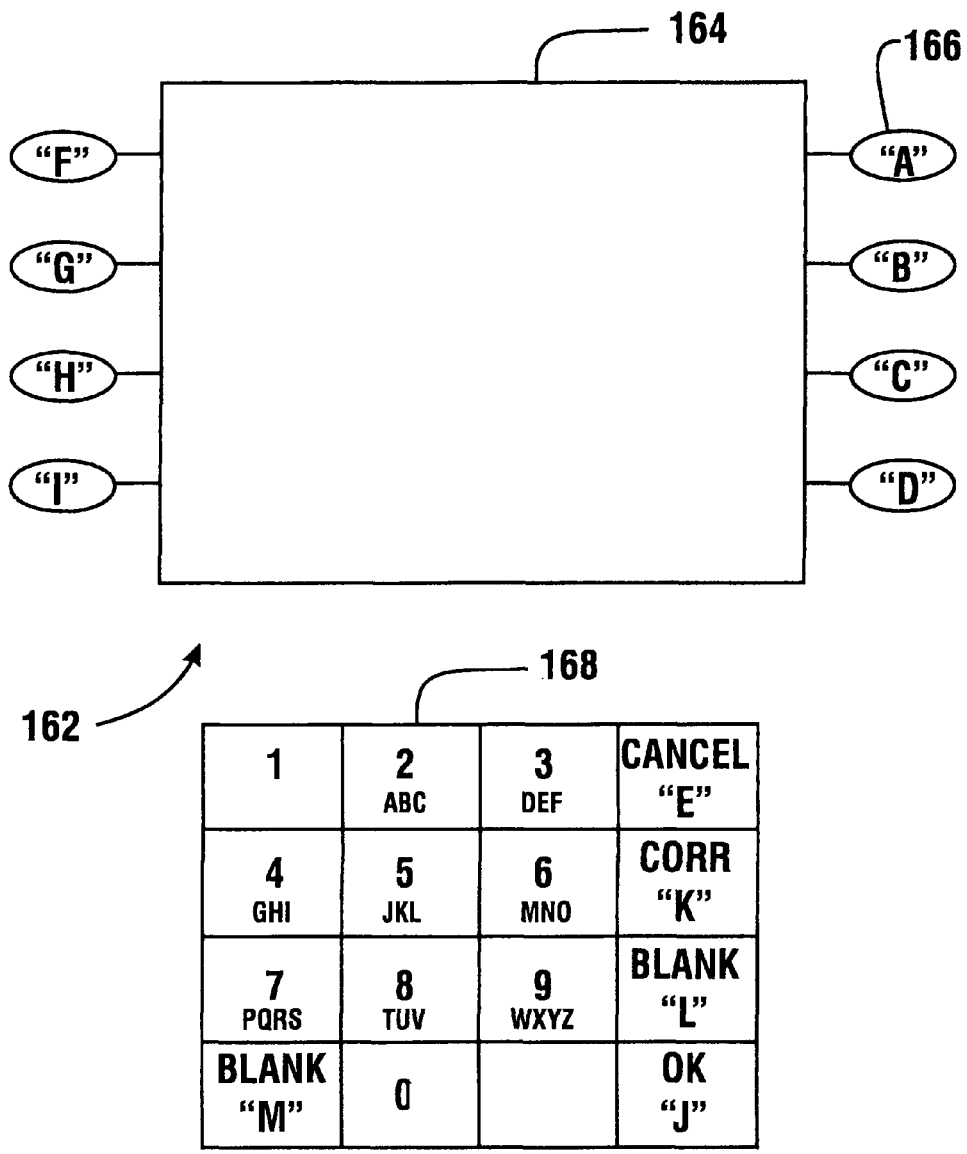
FIG. 27 is a schematic view of a customer interface of an automated banking machine and the function keys and keypad keys included in the interface.

FIG. 27 shows an example of a conventional automated banking machine interface 162. Interface 162 includes an output device which includes a screen 164. Screen 164 may be a CRT, LCD or other conventional display screen. In the embodiment shown screen 164 is not a touch screen as in the previously described embodiment. A plurality of function keys 166 are disposed at locations adjacent to the screen 164. A keypad 168 is also included in the interface 162. Keypad 168 includes alphanumeric keys as well as certain other dedicated keys such as "cancel", "correct" and "ok". Other keys on the keypad are generally blank but in some instances may be used.

In the operation of a conventional automated banking machine, screen data which is generated from information stored in the terminal memory produces defined transaction screens which are presented graphically on the screen 164. The screens appear in a sequence in response to the transaction function selected by the customer. Conventional screens also generally include text or graphics representative of selections that can be made by a customer. These text or graphic options generally include lines or other indicia which extend to the edges of the screen adjacent to one of the function keys 166. A user is enabled to select the options by pressing the function key which is pointed to by the selection. Likewise in the operation of the automated banking machine a user is enabled to input the alphanumeric characters which comprise the PIN number as well as numeric amount information and other instructions by pressing the keys in the keypad 168.

Figure 28:
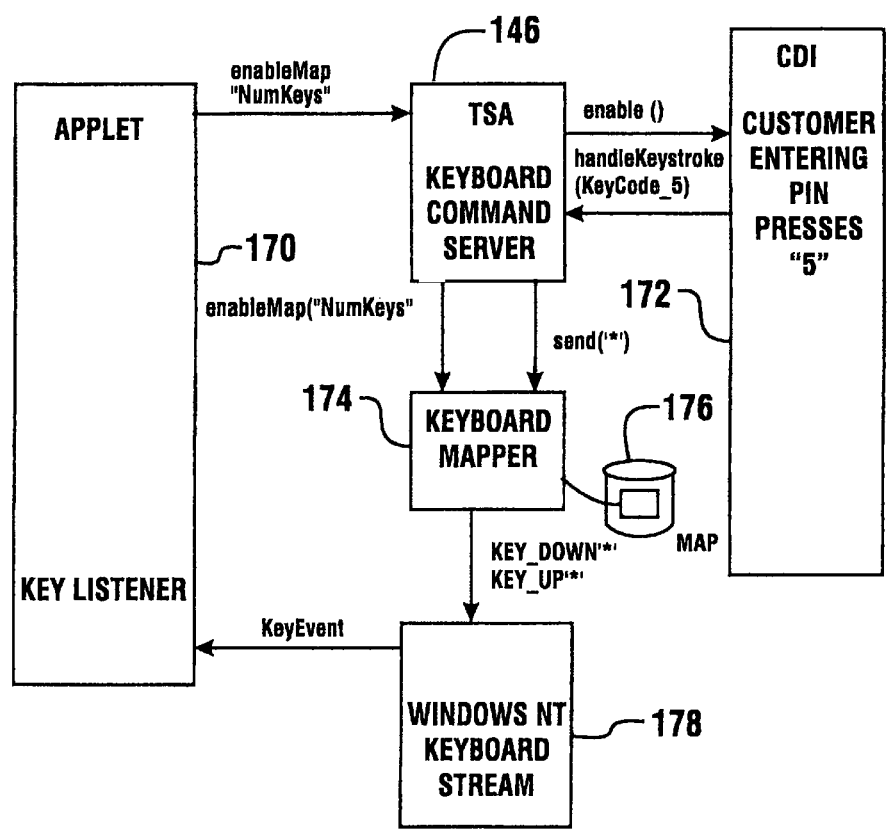
FIGS. 28-30 schematically represent exemplary steps in converting function key and keypad key inputs to keyboard stream and mouse stream inputs.
Figure 29:
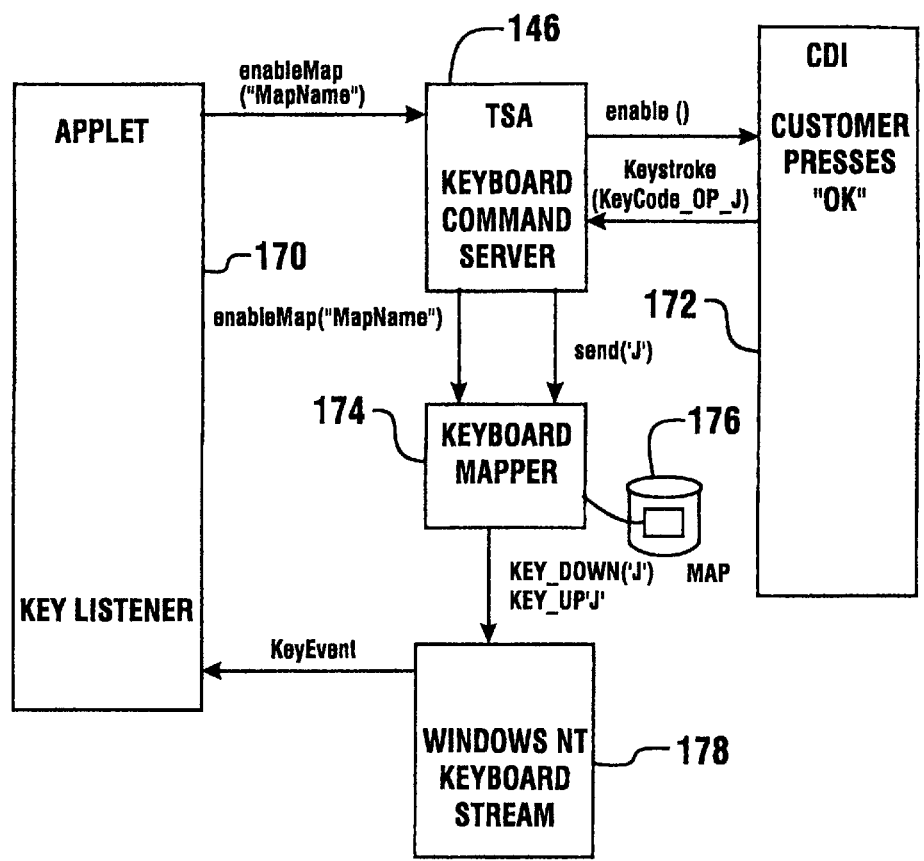
Figure 30:
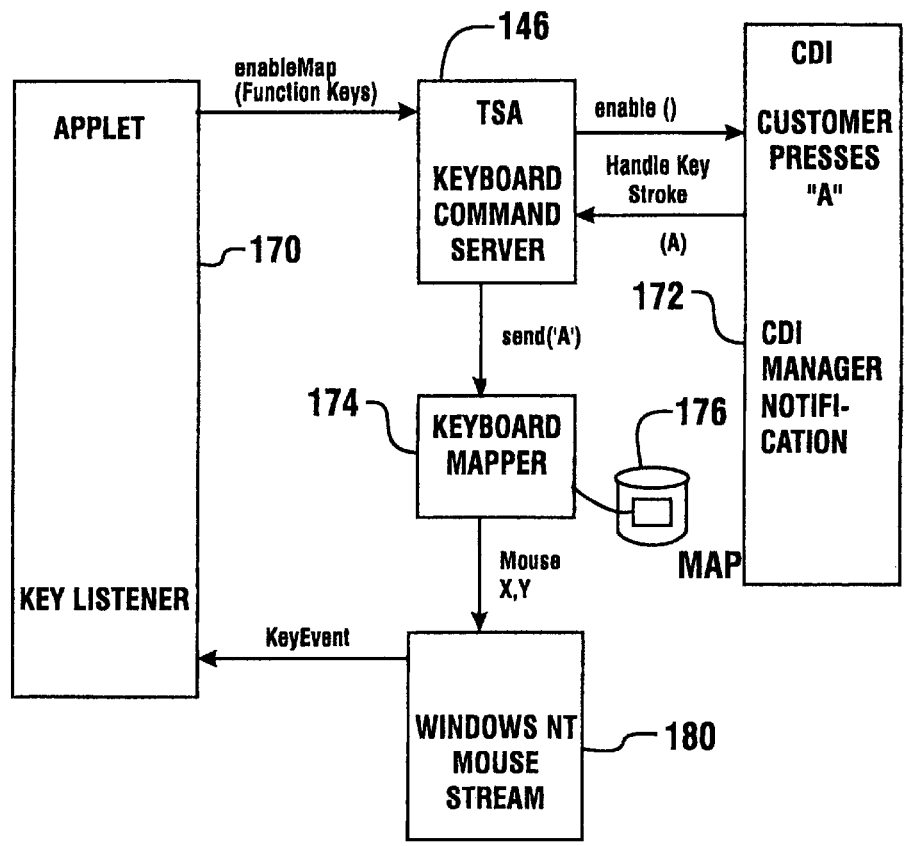

In an exemplary embodiment of the present invention the software operated in the automated banking machine operates to convert standard ATM key inputs to operating system events such as a mouse click in a desired location or an input from a QWERTY type keyboard. The software components which enable carrying out this function are shown in FIGS. 28-30. These functions include a keypad applet 170. The keypad applet 170 in the described embodiment is included among the applets in the terminal directors 144. The keypad applet 170 supports a subset of the keyboard common device interface (CDI) functionality.

The keypad applet 170 coordinates with a keyboard command server which operates in the transaction services application 146. The server in the transaction services application communicates with the common device interface for the keypad and function keys, schematically indicated 172. The key CDI in the preferred embodiment is a JAVA program which is referred to as a wrapper for the common device interface associated with the function keys and the keypad.

The software further includes a keyboard mapper program schematically indicated 174. The keyboard mapper in the exemplary embodiment is in connection with a database 176 which stores a plurality of map sets. In the exemplary embodiment the keyboard mapper is an extension of the keyboard class of objects used for operating the keyboard. The keyboard mapper operates to store sets of keymaps in the database 176. This is accomplished by reading information in a configuration database for the ATM to obtain the keymaps that are operated in the particular machine. During operation, the keyboard mapper selects one of the keymaps as the current set. This is done in response to the keypad applet and is based on instructions in HTTP records which are selectively accessed. The keyboard mapper may select keymaps responsive to instructions in documents processed through the browser. The keyboard mapper is also operative to enable the keypad and function keys appropriate for the particular mapset selected. The keyboard mapper is further operative responsive to the selected mapset to translate a keypad input signal or a function key input signal into a respective keyboard or mouse input signal which is then delivered to the keyboard input stream or the mouse input stream of the operating system of the computer in which the software operates.

In the exemplary embodiment the mapsets are each comprised of hash tables. Keymap objects are stored as values in the hash tables such that each object includes the values and operations necessary to convert any appropriate ATM key event to an operating system input event.

As can be appreciated in the case of function keys adjacent to the ATM screen it may be desirable to provide a mouse input to the mouse input stream that corresponds to a particular coordinate location for the mouse input. This is provided by the keyboard mapper using the selected keymap set. The various keymap sets enable the different function keys to provide different types of inputs to the computer operating system responsive to the document processed by the browser to produce the output displayed to the user. Further the keyboard mapper causes the pressing of a selected key to produce an input corresponding to a mouse click at a selected x,y coordinate position on the screen. It should be understood that either keypad keys or function keys can be used to produce mouse inputs. Likewise function key inputs may be converted to keyboard inputs. In some embodiments however it will be desirable to disable the mouse indicator on the screen such that the user does not notice a usual mouse icon. Such disabling may include in some embodiments reducing the size of the mouse icon such that it is so small that it cannot be readily seen by a user of the machine.

During portions of some transactions it may be unnecessary for the user to press any keys. In such situations some preferred embodiments of the invention operate to disable the keypad keys and/or function keys. Because resources of the computer are used in polling such keys for inputs, the cessation of such polling during appropriate times enables the computer resources to be devoted to carrying out other functions. This will increase the speed at which other activities may be carried out. This may be accomplished in some embodiments by the keypad applet operating to remove the key devices from a poll list.

FIGS. 28-30 include schematic depictions of examples of the operation of the keyboard mapper and the keypad applet. FIG. 29 shows an example of an input to the keypad 168. In this example the keypad applet 170 generally in response to instructions in an HTTP record such as an HTML document or other events, transmits and enables events to the transaction services application 146. In response a mapset is selected from the database 176 corresponding to the particular map name. The keyboard command server is further operative to enable the appropriate keys of the ATM.

In this example, in response the customer pressing the "OK" key on the keypad the CDI generates an appropriate signal to the transaction services application. As will be noted from FIG. 27 a "OK" key is referred to by convention as the "J" key of the ATM interface. The transaction services application transmits the signal generated from the pressing of the "J" key by the customer to the keyboard mapper 174. In response to receiving the signal, the keyboard mapper operates to resolve the object in the mapset corresponding to the map name which will convert the function key input signal to a keyboard input signal which is recognized by the operating system. By calling the selected object from the mapset, a keyboard input signal is produced and delivered into the keyboard stream of the computer. This is represented by keyboard stream 178. In the embodiment shown the keyboard stream is an input to the Windows NT® operating system. The keypad applet 170 operates to sense the input through its corresponding key listener. Applet 170 is also operative to receive the event and may operate to display an icon or other graphic corresponding to what the customer has input.

FIG. 28 shows operation of the keyboard mapper in situations where the transaction services application operates to prevent transmitting the data input by the customer to the applet 170. This may be desirable for example, in situations where the input by the customer is the customer's PIN or other data which is not to be displayed. In these circumstances the transaction services application 146 operates to hold the data input by the customer and to send only a signal representative of a holding character, in this case a "*" symbol back to the browser. This is done selectively in response to the instructions contained in documents accessed by the browser or in other HTTP records accessed by the computer which indicates that the input by the customer corresponds to their PIN or other data which is not to be sent to the browser. In the example shown in FIG. 28 only the holding character is passed through the keyboard mapper to the browser. In situations where the HTTP record accessed invokes methods in which numerical values are to be sent to the browser and/or displayed on the screen (such as the amount of a withdrawal transaction) the signal sent by the transaction services application to the browser is indicative of the numerical value associated with the key pressed.

FIG. 30 is a further example of the operation of the keyboard mapper in this case the input corresponds to a function key 166. In this case the input is caused by pressing the function key "A" which is shown adjacent to the upper right hand corner of the screen as shown in FIG. 27. The signal generated in response to pressing the function key is passed to the keyboard mapper which in response to the data obtained from the data store 176 outputs a mouse input corresponding to a mouse click. The mouse input includes data representative of the x and y coordinates on the screen where the mouse click is to be provided. This mouse input signal is passed to the mouse stream input schematically represented 180.

As will be appreciated, to enable the automated banking machine which processes documents to operate using a conventional ATM interface the mouse input will generally include coordinate locations which correspond to a location on the screen adjacent to the particular function key. This is because the icon, line, text or other indicia which the customer is selecting by pressing the key will preferably appear or extend on the screen adjacent to the key. In this way the customer is aware through the visual presentation what key to press to make a corresponding selection. A number of function keys adjacent to the screen may be operative at any one time. The customer may make selections by pressing a function key at one location and then a function key at another location disposed from the first location. This will result in signals being sent to the mouse stream corresponding to mouse clicks at coordinates on the screen adjacent to the function buttons pressed by the customer. During transactions various combinations of function and keypad keys may be operative and mapped to various keyboard and mouse inputs as determined by the selected mapsets. In addition developers may develop special mapsets corresponding to the particular graphics in documents which are displayed.

In the foregoing manner keypad inputs to a conventional ATM or other automated banking machine keypad can be translated into conventional keyboard or mouse inputs which can be identified and processed in a conventional keyboard input stream or mouse input stream to a computer. Likewise function keys may be translated into mouse inputs at selected locations and delivered into the mouse input stream for processing by the computer or may be converted into keyboard inputs and delivered to the keyboard input stream. A further advantage of the described terminal configuration is that keys may be selectively disabled except when they are needed. This may reduce instances of attempts to improperly access the machine by pressing keys on the keyboard. Further as previously discussed steps may also be taken to disable keys when they are not needed to increase transaction processing speeds.

A further advantage of embodiments of the present invention is the ability of the automated banking machine to provide printed documents based on instructions in HTML or other types of documents. Such printed items may include tickets, travelers checks, money orders, bank checks, scrip or other types of documents. The ability of embodiments to access and process documents enables the printing of graphics and other indicia which can produce printed documents having selected appearance features and selected ornamental designs. This can reduce the need to utilize preprinted forms and also enables the printing of a greater variety of printed formats. Further the configuration of some embodiments of the machine enable printing only selected portions of transaction information for record keeping purposes within the machine while providing versions including enhanced graphics or other attractive features to customers.

Figure 31:
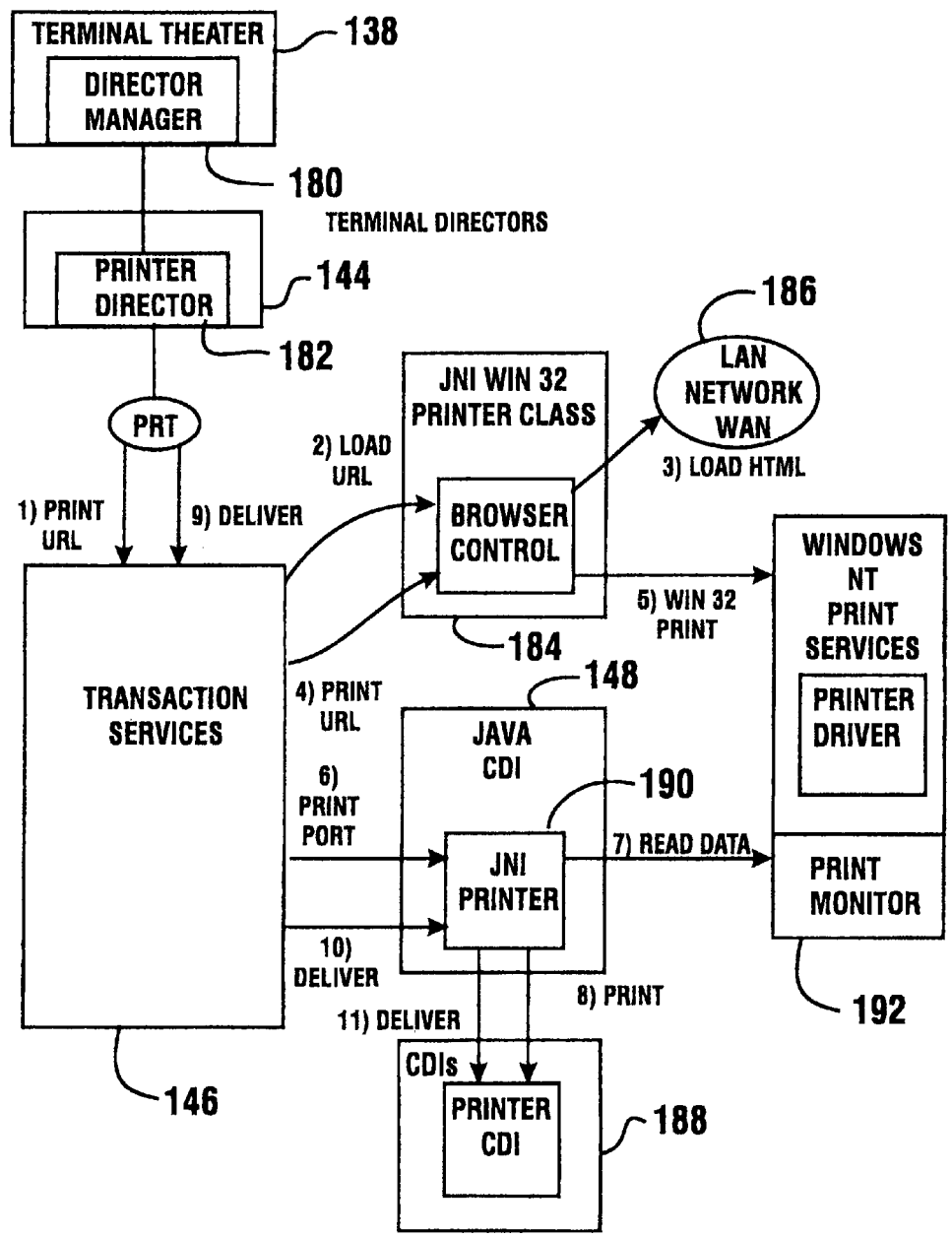
FIG. 31 schematically represents exemplary steps in printing documents with the automated banking machine.

FIG. 31 is a schematic representation of the operation of the system in printing forms using a printer in an automated transaction machine. The exemplary form of the invention uses the WIN32 printer services which operate under Windows NT® 4.0. In the exemplary transaction shown, the director manager class 180 operating in the terminal theater portion 138 initiates a print receipt transaction by requesting a printer director 182 to print a receipt. The printer director in the exemplary embodiment is a collection of instances of related JAVA beans which operate to carry out printing activities, and is one of the directors among the terminal directors 144. The printer director includes a print class which is schematically shown separately which is operative to invoke a print URL method. The printer class in the exemplary embodiment includes access to the shared transaction data object which includes the customer specific information concerning the transaction that includes indicia representative of information to be printed. In the case of an automated banking machine this may include for example indicia representative information which is read from a customer's card input to the machine and read by a card reader. This would include for example the customer's name and account number. The other transaction information may include the types of transactions conducted such as a deposit, withdrawal or inquiry as well as the amount involved in each respective transaction.

The transaction services application 146 receives the print request and passes the URL string to the WIN printer object 184 by the print URL method. The URL address in an exemplary embodiment is the address of an HTTP record such as an HTML document that will be used to format the document to be printed, in this case a receipt. This HTML document contains the embedded JAVA script that processes transaction data from the transaction data object. The URL address of the document may be on a local machine or may be retrieved from another server such as through a network schematically indicated 186. Network 186 may be a local area network or a wide area network depending on the configuration of the machine.

The WIN printer object 184 next navigates to the address of the document to be accessed. This is done in one preferred embodiment using Microsoft's C Web Browser2 ActiveX control. When the HTML document has been loaded the ActiveX control automatically begins processing the content of the accessed document. The transaction services application 146 invokes the print URL method of the WIN printer object 184. The WIN printer object uses the ActiveX control to print the current HTML document. This printing is processed by the Windows NT® print spool and graphics components.

The JAVA CDI receives an event from the print monitor component 192 that indicates the completion of print spooling. This indicates that a file is now available to be read and sent to the common device interface (CDI) 188 of the receipt printer.

Next a printer object 190 invokes a read data function in the print monitor 192 to determine the location and size of the print data file. The print object 190 sends the data or the path name of the data file to the printer CDI 188. The printer CDI 188 then passes the print data to the printer hardware. This results in printing of the receipt.

Once the receipt is printed the applet from the printer director 182 issues a request to deliver the printed receipt. The delivery request is passed through the transaction services application 146 to the printer object 190. The printer object 190 invokes the delivery method on the printer CDI 188 to cause the receipt to be delivered to the user of the machine. The operation of the software components enables selectively accessing document formats as well as using instructions contained in the documents to include transaction data within the printed documents. This enables producing documents of varied types. In addition it enables providing printing different types of documents for different customers. This may be desirable when providing marketing information, coupons or similar indicia on transaction receipts. This approach further simplifies providing printed formats in various languages by developing HTML documents which provide printed forms in different languages. As can be appreciated numerous types of form documents may be established which include instructions which instantiate and/or process certain data in the transaction data object to produce printed forms. In addition the methods of the present invention may be used for providing marketing to customers by profile or types of customer categories, as well as on a segment of one basis.

While the printing method previously described is discussed in connection with delivering transaction receipts, similar methods may be invoked for the printing of statements for customers as well as for printing a transaction journal within the automated banking machine. Further by accessing selected documents controlling the format of printing the information, journal records may be provided with consolidated information in a manner which enables conserving journal paper within the machine by not printing promotional or other types of information that is provided on customer documents.

The printing method of the exemplary form of the present invention also enables printing various types of optical indicia such as bar code or other types of machine readable indicia which can be used for printing coupons, checks or similar articles. Such coding may facilitate tracking the use of such items by customers for purposes of evaluating the effectiveness of various marketing efforts. In addition machine readable indicia may be used for printing on items such as deposit envelopes and/or in transaction journals. Such printing may facilitate reading such items by machine to verify the contents of deposits.

The printing capabilities achieved through the methods of the present invention also enables the printing of selected graphical materials. This may include for example materials which include imbedded digital signatures which can be used to verify the genuineness of the items printed. This may be particularly useful for example in situations where the transaction machine is used to print scrip, travelers checks, betting slips or other items having independent value. In addition printed documents in full color may be produced by including a color printer in the transaction machine.

The principles associated with printing forms from the automated banking machine are also applicable to the development of other electronic and hard copy forms. As previously discussed, in embodiments of the invention the transaction data may be delivered to the home bank as an HTML document or other HTTP message. Such documents may include instructions which when processed by a browser, operate to extract or manipulate the data therein so it may be further processed and/or stored in a different format. Such processing may include for example, the conversion of the data in the document to a non-HTTP format such as a Diebold 91X, NCR PAS or IBM 473X format.

In some circumstances customers at the automated banking machine may be presented with promotional offers or offers to purchase goods or services. These offers may come from vendor entities not associated with the institution with which the customer has their account. Such offers to be accepted may require the customer to provide information to the vendor. Such information may commonly include data accumulated in the transaction record or transaction data object. For example, the vendor of the goods or services will often need the customer name and account number data for charging for the goods or services. As previously discussed, the transaction data object may also hold personal data about the customer that is stored on the customer's card or other article and read by a reader in the machine. In exemplary embodiments, the vendors of such goods or services may have applications accessible on a server. These applications may include documents which have instructions therein for instantiating and/or processing the information in the transaction data object to provide the information the vendor needs to consummate the transaction. This may be accomplished by navigating one of the visible or non-visible browsers in the banking machine to the network address at which the vendor document(s) are accessible in response to input of instructions by the customer that they wish to accept an offer or conduct such a transaction.

In exemplary embodiments, a vendor form may be viewed on the display and printed by the customer at the automated banking machine. If there is a need for further information from the customer or for the customer to make selections, the vendor application comprised of HTML, other type mark up language or other documents may elicit such information through the customer interface of the banking machine. The vendor application may also have the customer acknowledge limitations of disclaimers related to the goods or services being offered. The printing capabilities of the exemplary embodiment further enables providing a customer with a printed version of a computer generated form or contract reflecting information concerning the transaction and terms associated therewith. Further any special provisions such as a printed notice that the customer has a right to rescind the transaction for a period of time and the steps the customer must take to rescind may be provided in printed hard copy format.

In alternative embodiments the offers or transactions provided through the automated banking machine by vendors of goods or services may utilize the same or at least some of the documents comprising an application which is used to conduct transactions electronically when the customer is not operating an automated banking machine. For example, similar form type documents may have data therein populated through a user's home computer when the transaction is conducted away from an automated banking machine. When the transaction is conducted at a banking machine the information in the transaction data object or other transaction record is used to provide the necessary data.

This capability provides opportunities for vendors to develop applications that can be used over the Internet for home PCs as well as for customers who use automated banking machines. Such capabilities further enable vendors and banking institutions to develop applications such as home banking applications, applications for making purchases and bill payment applications that can be utilized from both home PCs and automated banking machines. Because automated banking machines have access to data which is stored in a bank office, database personal data stored on a card or accessible from another data store, the system of the invention may be configured so that additional information may be included in the transaction data object without the need for input by a customer at the banking machine. This enables processing transactions at the banking machine more quickly than may be possible on the customer's home PC. Further utilizing the banking machine for conducting transactions enables the customer to conduct the transactions utilizing the security associated with the banking machine system.

The use of automated banking machines to conduct transactions that could be carried out through a home PC has an advantage in that it includes the capability of providing the customer with hard copy receipt forms documenting transactions conducted. The use of the banking machine may also provide customers with greater confidence that transactions have been recorded as the bank may also maintain information which documents the transaction even through the transaction is between the customer and a third party. Banking machines may also provide receipt forms that are deliberately made more difficult to counterfeit or which have capabilities of being verified as genuine. The use of image recording systems in connection with banking machines also may be used to verify that a transaction was conducted by an authorized person. Such features also enable the institution having the customer's account to offer promotions such as premiums, extended warranties or prizes for conducting transactions with the involvement of the institution. Numerous advantages within the scope of the present invention may also be achieved.

Terminal directors as discussed previously are software components that are comprised of a collection of objects such as Java applets or Java beans. Java beans are Java classes that adhere to the Java beans specification. These objects are operative to sequence ATM transactions. In the exemplary embodiment there is typically one terminal director per transaction. For example two common terminal directors are the withdrawal director and the deposit director which are operative to control the functionality of an ATM for withdrawing and depositing respectfully. Other terminal directors are responsible for other types of transactions such as a transferring value between accounts, and performing an inquiry of an available balance for an account.

The exemplary embodiment of the present invention includes methods for creating terminal directors in a visual programming environment by linking a plurality of visual icons that are representative of instances of related Java beans. Although the exemplary embodiment uses Java beans, the present invention encompasses any type of object or class that is operative to group related programming logic, events, properties, and methods. Other examples include C++ classes, CORBA objects, Active X objects, and COMM objects. Previous examples of these objects include the backstage applet 156 and the keypad applet 170.

The present invention includes a plurality of these specialized applets, classes, or objects which are designed to encapsulate specific functionality for automated transaction machines such as ATMs, and other types of self service terminals. These objects are referred to hereafter as ATM objects and are designed to be the basic building blocks for creating terminal directors. For example some ATM objects are operative to control the various devices of an ATM, such as a card reader, a presenter, a dispenser, a printer, and a keypad. Other ATM objects are operative to control the functionality of a transaction such as authorization and customer profile management. Further, other ATM objects are operative to manage transaction data and PIN processing.

Figure 36:
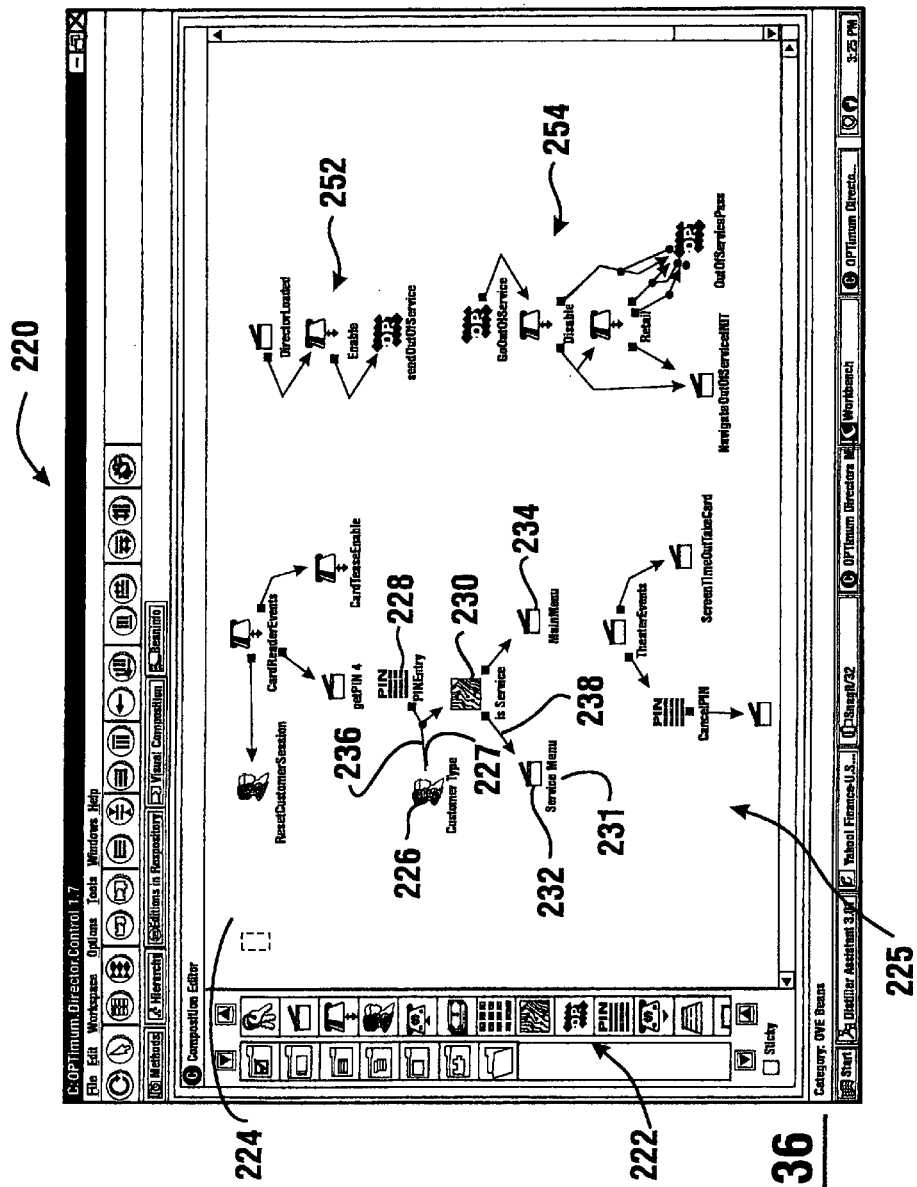
FIG. 36 is a screen output representing a visual programming environment for creating terminal directors.

In the exemplary embodiment, theater directors are created by visually configuring instances of these ATM objects. FIG. 36 schematically represents a visual programming environment 220 that enables a programmer to visually construct a terminal director 225. In the exemplary embodiment the visual programming environment is achieved using IBM's Visual Age for Java™. However, the present invention encompasses any visual programming environment that is operative to allow a user to visually associate groupings of individual ATM objects, to instantiate ATM objects, to specify characteristics of the objects, and to make connections between the objects.

The visual programming environment 220 includes a palette 222 including icons which are visual representations of these ATM objects. A programmer is enabled to usually create a terminal director 225 by selecting individual ATM objects as needed and place them in a visual work space 224. Placing ATM objects in the work space 224 is operative to instantiate the object. Instantiated ATM objects are represented in the work space by labeled icons such as the ATM objects 230 and 232. A developer is also enabled to link ATM objects together to create associations or pathways which the programming logic of the terminal director 225 will follow. These pathways are represented by a solid line 238 between the ATM objects.

Once an ATM object has been placed on the work space, it can be customized to specify how it will interact with other ATM objects. This is accomplished by modifying one or more properties of the ATM object and by creating visually indicated pathways or connections between ATM objects.

For example the ATM object 232 is representative of a specific type of ATM object called a backstage control that uses the services of the director manager to control such properties as the URL of the browser. In this described terminal director 225, ATM object 232 has been labeled "service menu" 231 because it has been configured to have the browser open an HTML page for servicing the ATM.

ATM objects typically include one or more events. Such ATM object events are signals or messages that indicate something has happened. For example when a banking card is inserted into a card reader device, a card reader event will be triggered in an ATM object designed to monitor and control a card reader.

ATM objects also include methods. ATM object methods are operations or functions that an ATM object can perform. For example an ATM object for a card reader will include an eject method which is operative to have a card reader device eject a banking card.

FIG. 39 is a chart of exemplary types of ATM objects 256 and their associated icons 258. These ATM objects include the authorize object 260, a backstage control object 262, a card reader object 264, a customer profile object 266, a depositor object 268, a dispenser object 270, a keypad object 272, a logic object 274, an OCS object 276, a presenter object 278, a PIN entry object 280, a printer object 282, a sync object 284, and a transaction data object 286.

The exemplary authorization object 260 includes functionality for managing communication with an authorization agent such as a host banking system. In the exemplary embodiment such communication includes requests to authorize, commit, and reverse a transaction. The authorization object interacts with an authorization plug-in to send and receive status messages from the authorization host.

The exemplary backstage control object 262 includes functionality for using the services of the director manager to control the URL property of the browser, to load directors, and to receive events from the browser. The backstage control object comprises the functionality of the backstage applet 156 previously discussed. Every terminal director requires at least one backstage control object 262 which provides a communication link between the director manager and the terminal director. For example the backstage control object's navigate method is used to change the HTML page being displayed. In addition theater events that are associated with inputs such as button presses in an HTML page are triggered from the backstage control object 262.

The exemplary card reader object 264 is one of a number of ATM objects designed to control an ATM device. In this case the card reader object 264 includes functionality for controlling a card reader device.

The exemplary customer profile object 266 includes functionality for capturing and retrieving information about a customer. The profile object may include an indication if the user of the machine is a customer who is to conduct a banking transaction, or a servicer of the machine who is authorized to conduct one or several types of service activities. The profile object may also include the functionality of the profile applet discussed previously. The customer profile object 266 preferably interacts with one or more customer profile plug-ins to retrieve and update customer profile information stored in a plurality of different locations such as a local data store, an external data store, an application server, or any other location that is operative to store information related to the user of the ATM.

The exemplary depositor object 268, dispenser object 270, and keypad object 272 include functionality for controlling a depositor device, a dispenser device, and a keypad device respectively. The keypad object 272 includes the functionality of the keypad applet 170 discussed previously.

The exemplary logic object 274 is a special ATM object that does not monitor or control external ATM devices, but rather controls the flow of logic between ATM objects. The logic object 274 includes functionality for determining the truth value of a comparison between two operands and calls different methods of one or more ATM objects depending on the result of the comparison.

The exemplary OCS object 276 includes functionality for managing the processing of host commands and host command responses. The OCS object 276 interacts with an OCS server and a command/status plug-in to communicate with a host.

The exemplary presenter object 278 includes functionality for controlling a presenter device such as a device for presenting dispensed sheets. The exemplary PIN entry object 280 interacts with a PIN entry event server to manage the PIN entry mode. The exemplary printer object 282, includes functionality for controlling a printer device.

The exemplary sync object 284 includes functionality for synchronizing multiple processing paths. The sync object 284 also provides a timer for one or more processing paths. For example in a terminal director designed to withdrawal cash a sync object can be used to manage the synchronous dispensing of the cash and preparation of the receipt.

The exemplary transaction data object 286 as discussed previously includes functionality for providing a repository of transaction data that can be shared among terminal directors, the browser, and the authorization agent. Examples of data managed by the transaction data object 286 include the withdrawal amount, account number, and account type. When the request method of the authorization object 260 is called, a copy of the transaction data from the transaction data object 286 may be passed to an authorization host to authorize the transaction.

These described ATM objects are used in an exemplary embodiment of the present invention. However, the present invention also embodies other types of ATM objects that encapsulate functionality of an ATM terminal. Other types of ATM objects may control devices such as a fingerprint reader, iris scanner, smart card reader, sound system, passbook printer, check scanner, statement printer, ticket printer, coupon printer, phone card encoder or any other type of device that can be operatively connected to an ATM. In addition other ATM objects are operative to interact with databases, servers, and other types of computing systems for retrieving and sending data to and from the ATM terminal.

Figure 37:
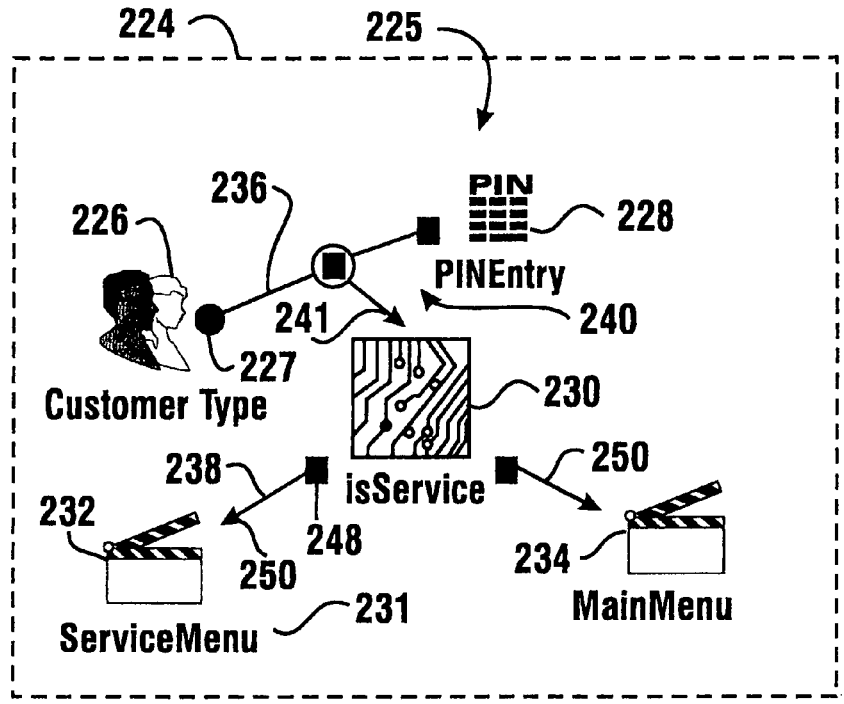
FIG. 37 is a portion of the visual workspace representing event to method connections and parameter connections between ATM objects.

FIG. 37 is representative of a portion of the visual workspace 224 that includes the exemplary pathway or association 238. The exemplary association 238 corresponds to an event to method connection between the two ATM objects 230 and 232. The exemplary visually programming environment uses event to method connections between ATM objects to control the functionality and flow of an ATM transaction. The flow of a transaction progresses from one ATM object to another by associating an event of one ATM object with a method of another ATM object. The visual programming environment in the exemplary embodiment includes visual clues for indicating the direction of flow of the program. For example, square 248 on one end of the connection 238 indicates the source ATM object. An arrowhead 250 on the opposite end of the connection 238 indicates the target ATM object. When an event in the source ATM object 230 is triggered the flow of the program will transfer to a method of the target ATM object 232. Of course in other embodiments other types of visual indications of association between objects may be used.

For this exemplary terminal director 225, ATM object 230 is a logic object 274 labeled "is Service" that has been configured to trigger either a true event or a false event if the user does or does not have permission to service the ATM. ATM object 232 is a backstage control object 262 that as discussed previously is labeled "Service Menu" and includes a navigate method that is operative to open a service menu HTML page in the browser.

Figure 38:
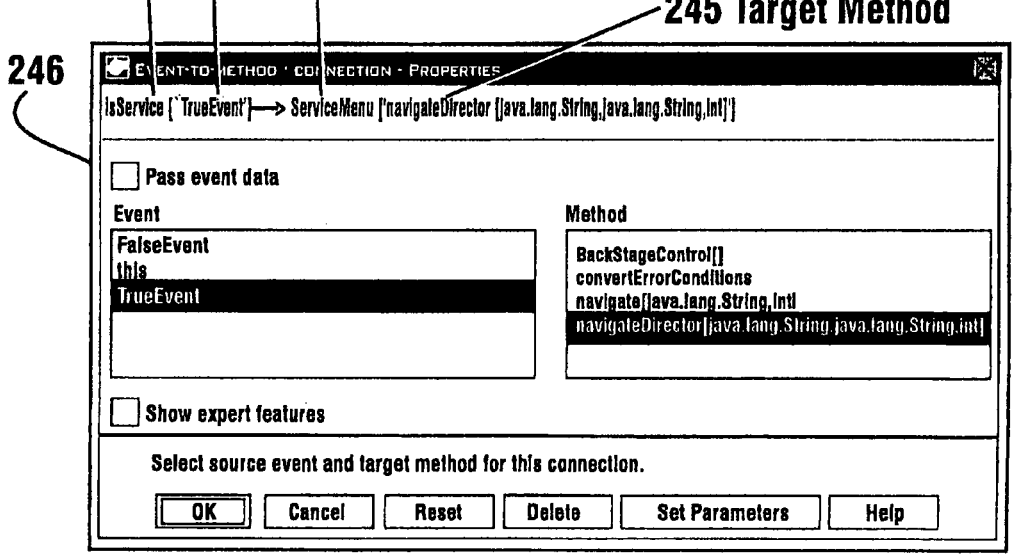
FIG. 38 is a screen output representing a window for creating, viewing or modifying an event to method connection.
Figure 40:
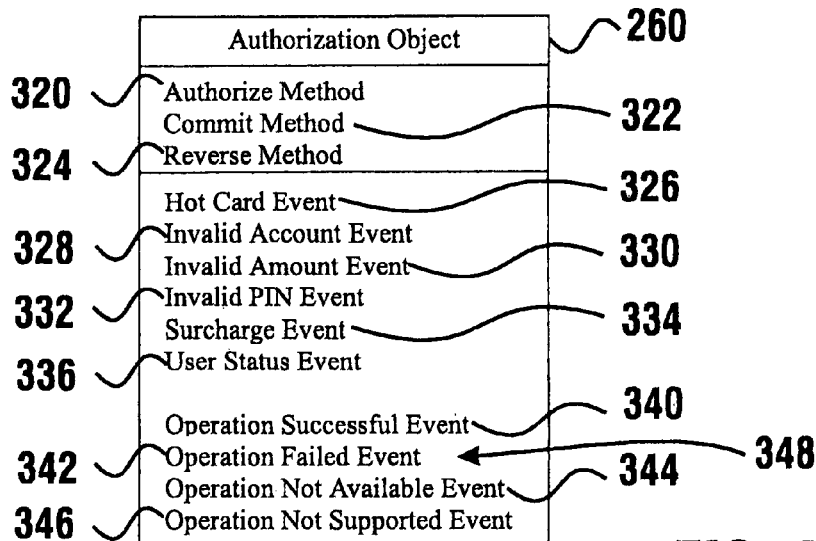
FIGS. 40-53 schematically represent exemplary ATM objects with associated methods, events and properties.

FIG. 38 is representative of a window 246 in the visual programming environment for creating, editing, and modifying an event to method connection. Here the window 246 displays the parameters for the event to method connection 238 which specify that when the source event 243 is triggered in the source object 242, the target method 245 will be called in the target object 244.

As is shown in FIG. 36, not all groupings of ATM objects are interconnected. For example ATM object groups 252 and 254 are not connected. This reflects the characteristic of terminal directors to be event driven. Each of these groupings is representative of a specific terminal director function or subroutine that is initiated by the triggering of an ATM object event or a call to an ATM object method.

ATM object methods often require arguments. In the exemplary embodiment of the present invention, these arguments can be supplied by parameters of the ATM object or other ATM objects by visually creating parameter connections or associations.

FIG. 37 includes an exemplary visual parameter connection 236. The visual parameter connection is operative to supply a value for an argument of a method. The visual parameter connection 236 includes a solid circle at one end which serves as a visual clue that the customer type of object 226 supplies the argument. The opposite end of the visual parameter connection 236 connects with the event to method connection 240. The arrowhead 241 associated with the event to method connection is the visual clue that indicates that the is Service logic object 230 includes a method that is the target of both the event to method connection and the parameter connection.

For this exemplary terminal director, ATM object 228 is a PIN entry object 280 that includes a PIN entry event. The event to method connection 240 has been configured so that when the PIN entry event is triggered a compare method of the isService logic object 230 is called. The parameter connection 236 indicates that the compare method is called with an argument supplied by the customer type customer profile object 226. The compare method of the isService logic object 230 has been configured so that if the customer type data value of the customer profile object 226 equals a value representative of a servicer type customer, a true event will be triggered. Correspondingly if the customer type data value is not representative of a servicer, a false event will be triggered. Triggering of the true event as specified by the event to method connection 238 results in the navigate method of the service menu backstage control object 231 being called. Triggering of the false event as specified in the event to method connection 250 results in the navigate method of a main menu backstage control object 234 being called.

Figure 54:
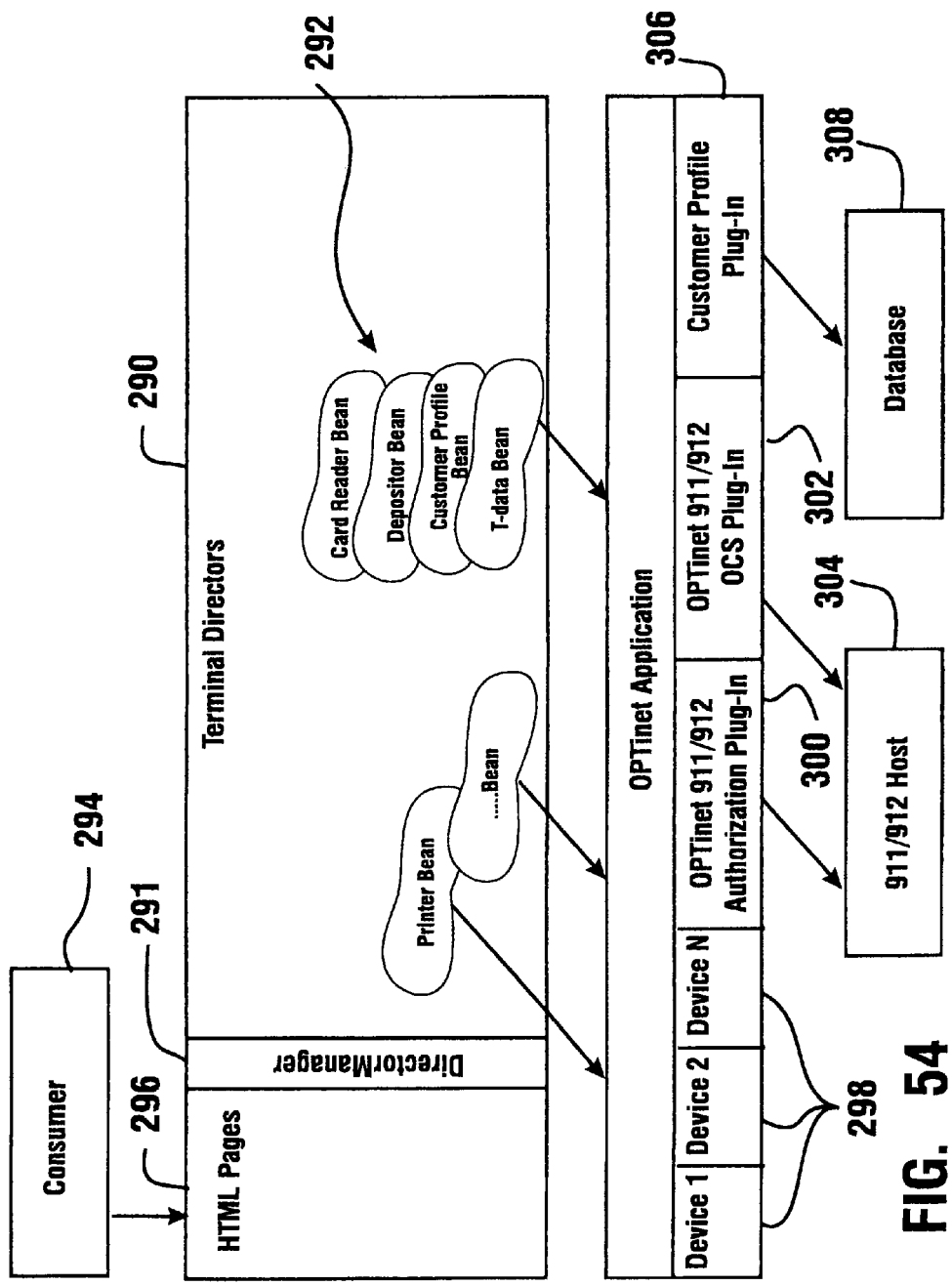
FIG. 54 schematically represents the interaction between a consumer, a terminal director, a database, a host, and a plurality of ATM devices.

FIG. 54 schematically represents the programming architecture of a terminal director that comprises ATM objects. As discussed previously a terminal director 290 is an applet that comprises a plurality of ATM objects 292 for sequencing ATM transactions. Each ATM device 298, such as a card reader or printer, has a corresponding ATM object 292 that is operative to monitor and control the operation of each ATM device 298.

The director manager 291 is operative to load and unload terminal directors 290 and helps to provide the programming path from the HTML pages 246 to terminal directors 290.

For communicating with external hosts 304 the interface browser plug-ins provide an interface between ATM objects 292 in the terminal director 290 and an external host 304. In the exemplary embodiment, these plug-ins support Diebold 91X format messages, including configuration, transaction, status, and command type messages.

Examples of these plug-ins include the OCS (Command Status) plug-in 302 and the authorization plug-in 300. As discussed previously the OCS ATM object 276 interacts with the OCS plug-in to provide "in service" and "out of service" events, which originate from a host 304. The OCS plug-in 302 also provides methods for sending command status and user events to the host 304.

The authorization plug-in 300 is also operative to communicate with a host 304 that is operative as an authorization agent. The authorization object 300 interacts with the authorization plug-in 260 to manage transaction messages including authorization, commit, and reverse requests with the authorization agent host 304.

As discussed previously the customer profile plug-in 306 is operative to retrieve user profile information from a local or remote database 308. This information can be used to personalize the ATM terminal for each consumer 294 that uses the ATM terminal. The customer profile object 266 interacts with the customer profile plug-in 306 to retrieve and update customer information in the database 308.

Once a terminal director is created in the work space 224, the visual programming environment is operative to save the terminal director as an applet, Java class or other object. Such applets are operatively stored as programming instructions responsive to the ATM objects and associations visually created in the work space 224. For example the terminal director may be stored as one or more source files. Also the terminal director may be compiled and stored in a form that is operative for use with the automated transaction machine of the present invention such as applets, EJBs, COMM objects, CORBA objects, DLLs, or any other type of software container. The visually created terminal director may then be integrated with other terminal directors to control the functionality of an ATM terminal of the present invention. In the exemplary embodiment the terminal directors may reside in an accessible memory such as a hard disk or RAM of either a local computer or a remotely networked computer. In the exemplary embodiment the terminal directors may be retrieved by the ATM from a locally or remote file system. Also terminal directors may be retrieved from a local or remote database or web server. In other exemplary embodiments the terminal directors may be integrated into an application server.

During a typical customer session, the ATM terminal will use at least three directors: a control director, a transaction director, and the terminate director. The control director typically is responsible for card entry, PIN entry, and transaction selection. The transaction directors are responsible for authorization and device control in the course of the selected transaction. The terminate director is typically responsible for closing the transaction including the return of the card to the customer.

The visual programming environment used in the exemplary embodiment of the present invention enables a user to create new terminal directors or to customize existing terminal directors to suit the requirements of a particular banking institution and the needs of customers using the ATM terminal. The visual programming environment provides a flexible and intuitive programming environment that allows a developer to visually connect a plurality of specialized ATM objects together to create an interactive ATM application.

Figure 41:
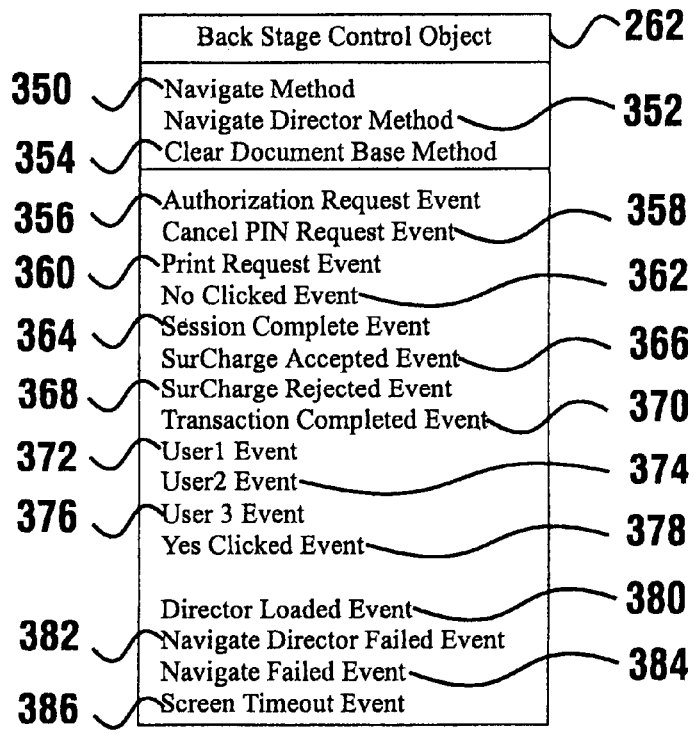

FIGS. 40-53 schematically represent the properties, events, and methods associated with the ATM objects of the exemplary embodiment. Many of these ATM objects produce synchronous events. When methods or functions of the ATM objects are called to perform an action, the ATM object waits for the action to complete, then fires an event that indicates the result of the operation. In the exemplary embodiment there are four operation events that are common to most ATM objects. As shown in FIG. 41 with respect to the authorization object 260, these operation events 348 comprise an operation successful event 344, an operation failed event 342, an operation not available event 344, and an operation not supported event 346. The operation not available event 244 indicates that a device is temporarily unavailable because for example, it has been put in maintenance mode. The operation not supported event 346 indicates that a device is not supported on the ATM.

The exemplary authorization object 260 also includes a number of specialized events and methods. Examples of authorization object methods include an authorize method 320, a commit method 322, and a reverse method 324. When these methods are invoked the authorization object 360 is operative to interact with the authorization plug-in to communicate messages with an authorization host to either authorize, commit, or reverse a transaction. The authorization plug-in converts the authorization methods into messages appropriate for the chosen host protocol, such as 91x messages. For example, terminal directors that are operative to perform a withdrawal transaction will typically include an authorization object 260. Before cash is delivered to a consumer, an authorization request is sent to an authorization host by invoking the authorize object's authorize method 320.

The exemplary authorization object also includes a plurality of events such as a hot card event 326, an invalid account event 328, an invalid amount event 330, an invalid PIN event 332, and a surcharge event 334. These events are triggered responsive to receipt of a status code from the authorization host. This exemplary embodiment of the authorization object 260 also includes the ability to extend the base set of events through a user status event 336. The authorization plug-in can be configured to fire the user status event when a status message from an authorization host includes a unique status code. This code is placed into a user status field of the transaction object. When the user status event fires, the authorization object of a terminal director can be configured to call a method of a logic object which is operative to compare the value in the user status field to a known set of possible user codes.

FIG. 41 is representative of the method and events for the backstage control object 262 of the exemplary embodiment. As discussed previously the backstage control object 262 interacts with the director manager 291 to set the URL in the browser, to load a new terminal director, and to set a new document base for the browser. In the exemplary embodiment the backstage control object 262 includes methods such as the navigate method 350, the navigate director method 352, and the clear document base method 354.

The navigate method 350 is operative to set a new URL in the browser. The URL is passed as an argument to the navigate method. The URL can be an absolute address that includes the complete URL specification starting with "http:\\" or the URL can be a relative address that begins with a "\" and is relative to the fixed or current HTML document page. The navigate director method 352 is operative to load a new terminal director in addition to setting a new URL.

Both the navigate method 350 and navigate director method 352 include a timeout argument that specifies the number of seconds before a timeout is triggered and a timeout page is shown to the user. The timer is a means to prevent the ATM terminal from hanging indefinitely on a page should the customer stop making selections. The navigate timer argument can be set to zero for those cases when an event or timer for another ATM object is guaranteed to be triggered independent of the user.

The backstage control object 262 includes events such as an authorization request event 356, a cancel PIN request event 358, a print request event 360, a no clicked event 362, a session complete event 364, a surcharge accepted event 366, a surcharge rejected event 368, a transaction completed event 370, user events 372, 374, 376, and a yes clicked event 378. These events are triggered by the director manager responsive to the consumer's use of the current HTML page. In the browser, for example, a button on an HTML page can be configured to trigger one of these backstage control events responsive to the button being clicked.

The backstage control object 262 also includes a number of events that are only triggered responsive to the director manager itself. These events include a director loaded event 380, a navigate director failed event 382, a navigate failed event 284, and a screen timeout event 386. The director loaded event 380 is triggered when a terminal director is loaded. The navigate director failed event 382 is triggered when the HTML or a script in the browser invoked the director manager to navigate to a new URL and to change terminal directors and one of those actions failed. Similarly, the navigate failed event 384 is fired when the HTML or a script invoked the director manager to navigate to a new URL and the navigation failed. The screen timeout event 386 is triggered after the specified number of seconds has elapsed without an action from the user.

Figure 42:
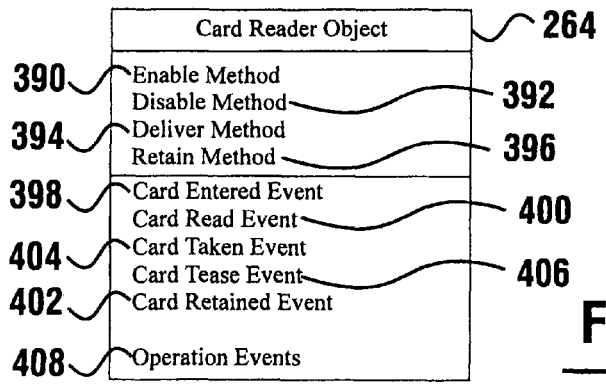

FIG. 42 schematically represents the methods and events for the exemplary embodiment of the card reader object 264. The card reader object enables a developer to create transaction directors that use and control the card reader device of an ATM. The card reader object 264 includes methods such as an enable method 390, a disable method 392, a deliver method 394, and a retain method 396. The enable and disable methods 390 and 392 enable and disable the card reader device respectively. The deliver method 394 is operative to eject the card for delivery back to the customer. The retain method 396 is operative to internally retain the card and is typically used in situations where the card is to be retained, such as when the card is expired, indicated as stolen or when the customer leaves the ATM without taking the card.

The card reader object 264 includes the following asynchronous events: card entered event 398, card read event 400, card retained event 402, card taken event 404, and card tease event 406. Each of these events are triggered responsive to the action described in the name of the event. For example when the card is read, the card read event 400 will be fired. The card reader object 264 also includes the same set of synchronous operation events 408 as the operation events 348 described for the authorization object 260. when a card is enabled data is read from the card and placed into a card reader server where the data can be transmitted to the host or used in customer profiling.

Figure 43:
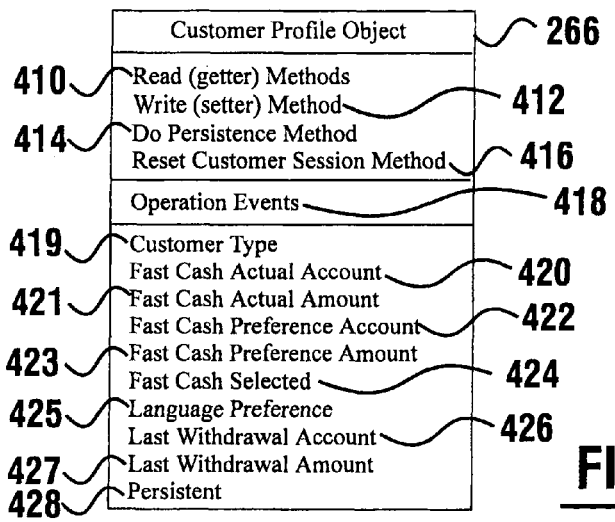

FIG. 43 schematically represents an exemplary embodiment of the customer profile object 266. The customer profile object 266 reads and writes information unique to a particular customer. The customer profile object 266 includes a plurality of properties such as a customer type 419, a fast cash actual account 420, a fast cash actual amount 421, a fast cash preference account 422, a fast cash preference amount 423, a fast cash selected 424, a language preference 425, a last withdrawal account 426, a last withdrawal amount 427, and a persistent property 428.

These properties can be used as arguments for other ATM object methods. In addition the read and write methods can be called by HTML pages to get or set these properties. The customer type property 419 differentiates between different classes of customers such as a servicer or consumer. The fast cash actual account 420 and the fast cash actual amount 421 identify the banking account withdrawal amount that was shown to the customer in HTML for the fast cash transaction. The fast cash preference account 422 and the fast cash preference amount 423 identify the banking account withdrawal amount that was selected by the customer from a preferences setup page to use for fast cash transactions. The fast cash selected property 424 specifies whether a withdrawal transaction is fast cash or not. A typical withdrawal director can use this property to determine if it needs to set up fast cash selection values. The language preference property 425 identifies the customer's preferred language. The last withdrawal account property 426 and the last withdrawal amount property 427 identifies the last account and amount that was used by the customer in a withdrawal transaction. The persistent property 428 identifies an instance of the customer profile bean as persistent. Any value set into a persistent object results in the value being written to the database or other data repository. Values set into a non-persistent instance of a customer object are lost at the end of a customer session.

A terminal director can be operatively programmed to display an HTML page in the browser that includes information and options to perform transaction responsive to the customer profile properties. As discussed previously options for maintaining the ATM can be presented to a user of type "servicer", whereas a user of type "consumer" would only be presented with options for performing transaction with the ATM. Also different levels of transaction functions may be correlated to the customer type. For example consumers who have a banking account with the financial institution that owns the ATM could be assigned a customer type that grants the consumer permission to advanced transactions such as bill paying and check printing. However, customers of other banks may be assigned a customer type that only allows them access to simple transactions such as withdrawing cash.

The customer profile object may also be used to update customer profile information in the data store responsive to user interaction with the ATM. Such user interaction may result in a modification to the preferred language of the user, the fast cash actual properties, the fast cash preference properties, the fast cash selected property and the last withdrawal properties. For example by using the customer profile object to save the last withdrawal properties each time a dispense of cash is made, the terminal director is operative to present a HTML document to the user with an option for withdrawing the same amount of money the next time the user accesses the ATM.

Customer profile values are retrieved and updated from the data store responsive to user or customer identification information such as an account number or other unique value associated with the user. Such an account number is typically read from a card by a card reader device. However, in alternative embodiments, the ATM may enable the user to input the identifying value with an input device, such as a keypad, a biometric device, or any other device that is operative to receive information that identifies the user of the ATM.

In addition the customer profile object may be used to retrieve and save other types of information in the data store. Such information may include marketing information associated with the consumer which can be used by a terminal director to display targeted advertisements with the ATM through a browser for example. Also the customer profile values may be used by a terminal director to generate customized transaction options, or other selectable options for interacting with the ATM. Such information may be obtained from various sources as previously discussed. Some of such information may also be provided by the user. This may be done through an in person or automated data acquiring apparatus. Alternatively such information may be provided by the user through an online connection from a remote terminal such as a personal computer. Examples of such data acquisition approaches are described in U.S. Pat. No. 6,023,288 the disclosure of which is incorporated herein by reference.

The customer profile object 266 includes the following methods: the read or getter methods 410, the write or setter methods 412, the do persistence method 414, the reset customer session method 416, and the operation events 418. The read methods 410 and write methods 412 are operative to retrieve and update the customer profile information. The do persistence method 414 is operative to force the customer profile server to flush all the persistent profile properties accumulated during the consumer session to the data repositories. The ATM terminal uses the do persistence method 414 to accumulate all the writes efficiently so as not to slow down a customer transaction. A typical terminal director will have the card taken event connected to the do persistence method, so that the updating of the data repositories occurs immediately following a customer session.

The reset customer session method 416 resets all profile properties to the uninitialized (null) state. This method is typically invoked between customer sessions in order to reset values accumulated for the previous customer. For example the card entered event can be connected to the reset customer session method 416 so that the customer profile data will be set to null for each new session.

Figure 55:
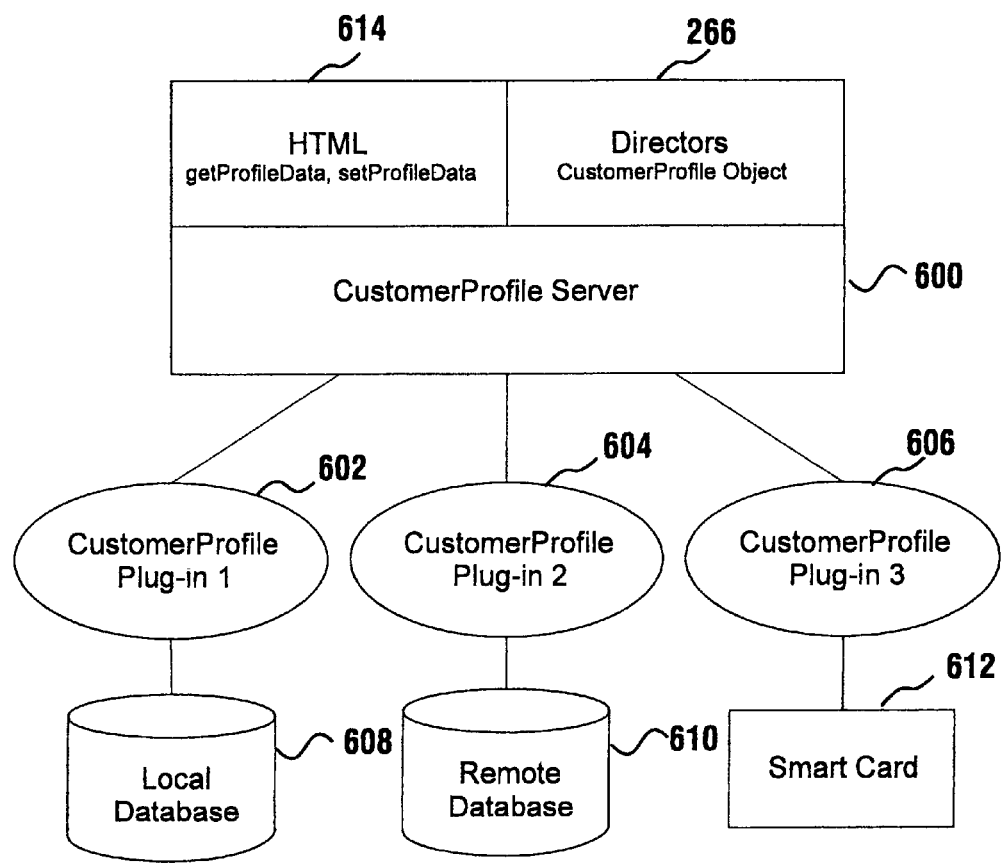
FIG. 55 is a schematic view representative of the interaction between the customer profile object and a plurality of data stores.

FIG. 55 schematically represents the architecture for using the customer profile object 266 to incorporating customer specific information with an ATM terminal. HTML pages 614 may include scripts which are instructions operative to get and set customer specific information through the customer profile object 266. The customer profile object 266 is isolated by the customer profile server 600 and so does not have programming requirements to identify the data repository for the profile data. This architecture simplifies the task of personalizing the ATM terminal for each consumer. An institution can integrate its database logic into the ATM terminal by implementing a simple customer profile server.

The customer profile properties are read from a data repository such as a local database 608, remote database 610, magnetic or smart cards 612, or any other type of data store. One or more registered plug-in classes 602, 604 and 606 are configured to manage the reading and writing of profile data to the specific data store. In the exemplary embodiment there are two types of profile plug-in classes. The first is a FITProfile plug-in which manages customer type and other properties used internally by the ATM terminal. The second is a user preferences plug-in which manages user preferences such as those shown in FIG. 43 for language and fast cash transactions. These preferences are typically read and written to a local database. In alternative embodiments of the customer profile architecture, other plug-ins can be implemented for connecting to any type of data store that contains useful information correlated to a customer. A developer of terminal directors can include an instance of a customer profile object 266 that is operative to interact with other data stores through these new plug-ins.

Figure 44:
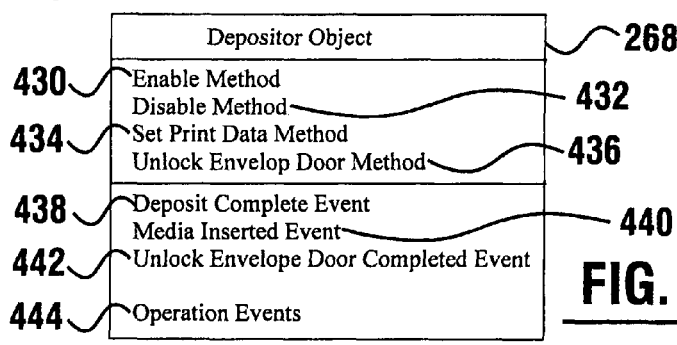

An exemplary embodiment of the depositor object 268 is schematically shown in FIG. 44. The depositor object 268 allows a developer of a terminal director to use and control the depositor device of an ATM. The depositor object includes an enable method 430, a disable method 432, and an unlock envelope door method 436. These methods are operative to enable and disable the depositor and unlock the door of an envelope holder respectfully. The depositor object 268 also includes a set print data method 434 which specifies the transaction information that is to be printed on a deposited envelope.

In addition to the synchronous operation events 444, the depositor object 268 includes the following asynchronous events: a deposit complete event 438, a media inserted event 440, and an unlock envelope door complete event 442. Each of these events is triggered responsive to the action that is described by the name of the event.

Figure 45:
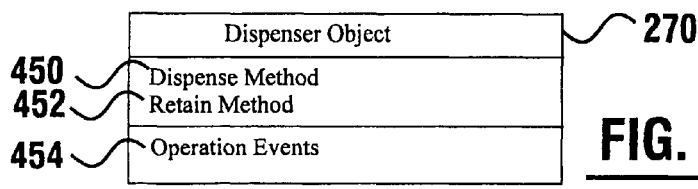

FIG. 45 schematically represents an exemplary embodiment of the dispenser object 270. The dispenser object 270 provides an interface to the dispenser device and includes a dispense method 450 and a retain method 452. The dispense method takes one or more of the following arguments: amount, family, and type. The amount argument is normally the transaction amount that has been validated for dispensing by the authorization agent. This value is obtained from the transaction data object 286. The family and type arguments are descriptions of the kind of media that is to be dispensed. The retain method is operative to retrieve media such as bills that have been picked and moved to a presenter or other escrow device. In addition the dispenser object includes the operation events 454.

Figure 46:
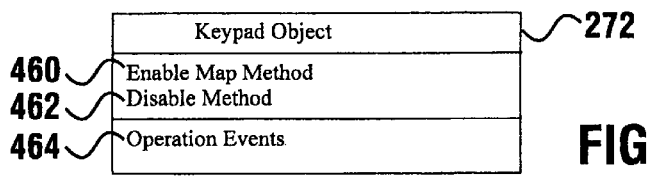

An exemplary embodiment of the keypad object 272 is shown in FIG. 46. The keypad object includes an enable map method 460 which accepts an argument for specifying which key or keys are enabled and for mapping key inputs to mouse click type inputs. The disable method 462 selectively disables keys. The keypad object 272 also includes the operation events 464.

Figure 47:
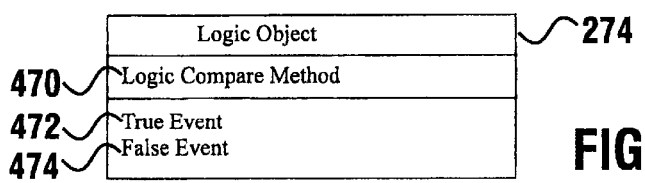

FIG. 47 schematically represents the exemplary logic object 274. The logic object is operative to perform logical comparisons of the data items. Terminal directors use the comparison results to alter transaction flow. The logic object is typically used to compare a known value or a range of values with a current value contained somewhere in the transaction data object 286 or the customer profile object 266. The logic object 274 includes a logic compare method which accepts two arguments that are the object of the compare. Depending on the result of the compare, the logic object 274 triggers either a true event 472 or a false event 474.

Figure 48:
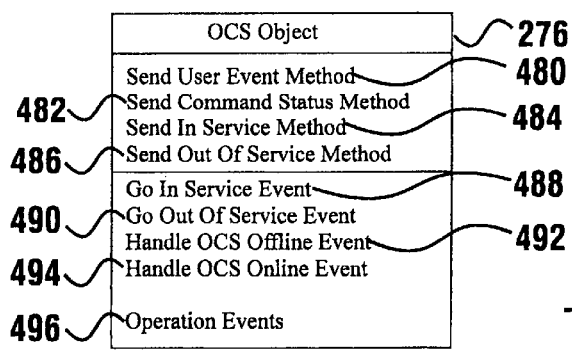

FIG. 48 schematically represents the exemplary OCS object 276. This object interacts through the OCS server to the command/status plug-in and ultimately the host. The OCS object 276 includes the following methods: a send user event method 480, a send command status method 482, a send in service method 484, and a send out of service method 486. The send user event method 480 is operative to send an event to the command/status plug-in. The command/status plug-in can then use this information in combination with any subsequent reverse or commit to build the appropriate message for the authorization host. The send user event method 480 is typically used when the customer cancels a transaction or fails to take dispensed cash. This method can then be used to inform the host that the transaction was canceled, cash was retained, or there was a timeout.

The send in service method 484 and the send out of service method 486 are operative to enable the host to place the terminal in or out of service. In addition the OCS object 276 includes the following events: go in service event 488, go out of service event 490, handle OCS offline event 492, and handle OCS online event 494.

The command/status plug-in triggers the go in service event 488 and the go out of service event 490 upon receiving go in service and go out of service commands from the host. Terminal directors are normally configured to respond to these events by enabling or disabling devices such as the card reader or keypad. The command/status plug-in triggers the handle OCS online event 494 and the handle OCS offline event 492 when communication is started and stopped with the host.

Figure 49:
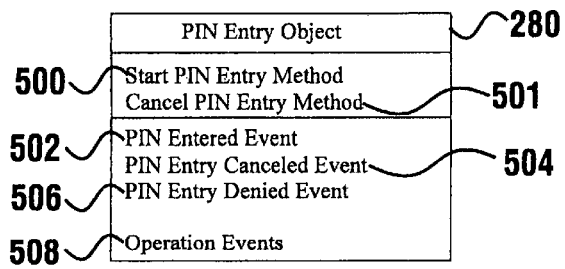

An exemplary embodiment of the PIN entry object 280 is shown in FIG. 49. The PIN entry object 280 is operative to set the state of the PIN mode property in the PIN entry event server. The start PIN entry method 500 is operative to turn on the in PIN mode state. Responsive to the in PIN mode being turned on, the PIN server determines the correct number of PIN retries that the customer is permitted, and then enters a secure mode for precessing keypad input.

When the customer enters an acceptable PIN or when the customer presses the cancel button, the PIN entry event server sets the in PIN mode property to false. The cancel PIN entry method 501 is also operative to turn off the in PIN mode property and is typically called by a terminal director when a screen timeout event occurs.

The PIN entry object 280 includes events such as a PIN entered event 502, a PIN entry canceled event 504, a PIN entry denied event 506, and operation events 508. The PIN entered event 502 is triggered when the PIN entry event server determines that a PIN is either valid (local verification) or the PIN can be validated later by an authorization host. The PIN entry canceled event 504 is triggered responsive to a customer pressing the cancel button of the ATM terminal. The PIN entry denied event 506 is fired when local PIN verification is used and the customer exceeds the maximum number of PIN entry attempts.

Figure 50:
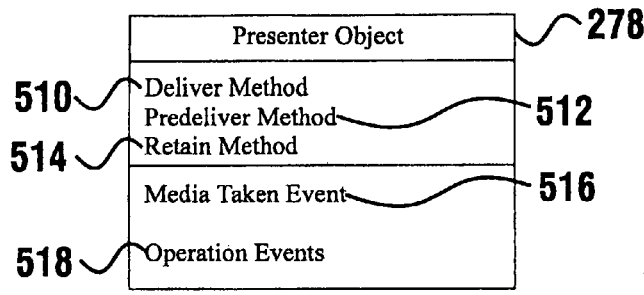

An exemplary embodiment of the presenter object 278 is shown in FIG. 50. The presenter object 278 provides an interface to the presenter device and includes a deliver method 510, a pre-deliver method 512, and a retain method 514. As the names of the methods suggest, the deliver method 510 delivers media to the customer, the retain method 514 retains media that has not been picked up by the customer, and the pre-deliver method 512 performs pre-delivery by moving media to just inside the gate of the presenter so that the media is ready to be made accessible to a customer.

The presenter object 278 includes an asynchronous media taken event 516 and the synchronous operation events 518. The media taken event is fired when the customer takes the media from the presenter.

Figure 51:
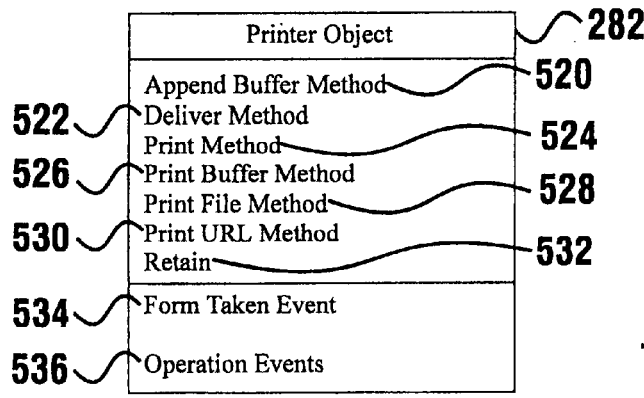

FIG. 51 schematically represents the methods and events of the exemplary printer object 282. The printer object 282 provides an interface to a receipt printer and includes the following methods: an append buffer method 520, a deliver method 522, a print method 424, a print buffer method 526, a print file method 528, a print URL method 530, and a retain method 532. These print methods provide a number of ways to print information on a receipt. For example the append buffer method 528 is operative to append characters to the printer device buffer. The print buffer 526 method is then called to have the printer device print the contents of the buffer. The print method 524, the print file method 528, and the print URL method 530 are operative to print the contents of a specified string, file, or HTML page respectfully.

In addition to the operation events 518, the exemplary print object 282 includes an asynchronous form taken event 534. This event is triggered when a customer takes the printed form from the printer device.

Figure 52:
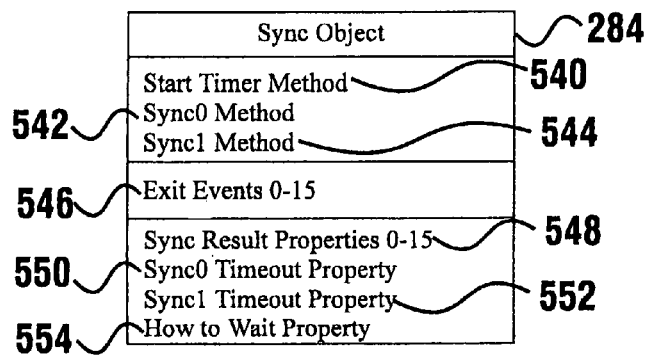

An exemplary embodiment of the sync object 284 is shown in FIG. 52. The sync object provides synchronization between tasks. For example, the developer of a terminal director may want to dispense cash and print a receipt at the same time. However, the developer may want to wait for both tasks to complete before continuing. This is accomplished by connecting the operation events of the dispenser object 270 and the printer object 282 to the methods in the sync object. In this case the operation events of the dispenser object 270 and the printer object 282 are connected to sync0 method 542 and sync1 method 544, respectively. The sync object 284 is operative to fire one or more of fifteen exit events depending on when and how the sync methods are called. Both the sync0 method 542 and the sync1 method 544 accept arguments representative of an event that is successful, that failed, that is not available, or that is not supported.

The sync object 284 also includes two sync timers that are started by a start time method 540. These sync timers will time out in the number of seconds specified in the sync0 timeout property 550 and the sync1 timeout property 552. If a sync timer timeouts, the sync timer is operative to trigger the corresponding sync method with an argument that the event failed. If a sync method is called prior to the corresponding sync timer timing out, the sync timer is canceled.

The exemplary sync object 284 includes a how to wait property which specifies the combination of sync methods that the sync object waits to occur. Examples include having the sync object 284 wait for the sycn0 method call, wait for the sync1 method call, wait for both the sync0 and the sync1 method calls, and wait for either the sync0 or the sync1 method calls.

In the exemplary embodiment there are 16 sync result properties 548 which control how the calls to the sync methods 542 and 544 are logically connected to produce exit events. Each of the 16 sync properties corresponds to one of the 16 exit events 546. The developer can connect these exit events to methods of various other ATM objects depending on the desired flow of transaction logic. The exit events 546 are triggered responsive to the corresponding sync result properties 548. For example the developer can set a sync result01 property to a value that is representative of an occurrence of a successful argument being used in calls to both the sync0 and sync1 methods. If both the sync0 and sync1 methods are called with successful arguments then the sync object will trigger an exit1 event. If one or both of the sync0 and sync1 methods are called with a failure argument then the exit1 event will not be called.

In the exemplary embodiment, the result properties can be set to a plurality of different values representative of sync1 and sycn0 being called with different combinations of arguments. In this way a plurality of exit events can be configured to fire for different combinations of the success or failure of calls to the sync0 and sync1 methods.

Figure 53:
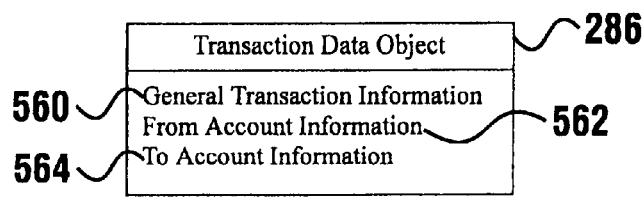

FIG. 53 schematically represents an exemplary embodiment of the transaction data object 286. The transaction object 286 provides a container for transaction specific data such as customer specific account information. Other ATM objects can access or set values in the transaction data object 286 by connection to or from the transaction data object's property values. The transaction data object 286 is typically used by the authorization object 260. For example an instance of the transaction data object 286 is supplied as an argument for the authorization method 320 of the authorization object 260.

The exemplary transaction data object 286 includes two account objects to support transactions that require more than one account, such as a transfer transaction. One of these account objects is operative to store source account information. The second of these account objects is operative to store target account information. In the exemplary embodiment these account objects are called the from account object 562 and the to account object 564 respectively. Each of these account objects stores information about the account, such as the account number, the financial institutional ID and address, the card holder's name and address, the available balance, the type of account, the date of last update and any other information that is useful for identifying an account.

In an exemplary embodiment which is operative to communicate with a host computer through 91X format messages, the 91x interface uses the transaction data object 286 in processing authorization requests. The 91x interface gets properties when building a request to the host and sets properties when processing the host's response. In the exemplary embodiment the transaction data object also includes general transaction properties 560 that are accessed by the 91x interface. Examples of these properties include the human language of the account holder, the account type, the current transaction type, status message associated with errors, the status and user codes of the transaction, the status severity, the available balance amount, the bank ID, and whether there is a surcharge.

The objects described herein and the methods and events associated therewith are exemplary. Other embodiments of the invention may include other or different objects in achieving the desirable properties of the invention.

Many ATMs include transaction function devices with the ability to perform similar functions. For example, an ATM may include both a statement printer and a receipt printer. The statement printer is typically used to print an itemized listing of financial transactions for a period of time. The receipt printer is typically used to print a record of the most current transactions. Both devices are operative to generate and dispense printed material to a consumer. When one of the devices becomes inoperative, the ATM may disable one or more transaction operations that correspond to the device. For example, if the statement printer runs out of paper, an ATM can detect the problem and deactivate the operation of printing statements for consumers. If the receipt printer becomes jammed, the ATM may deactivate the entire ATM until the receipt printer can be repaired. Unfortunately in either of these cases, consumers will be aggravated by these problems, and the owner of the ATM may lose revenue associated with transaction fees.

An alternative exemplary embodiment of the present invention is operative to reduce the occurrences of ATMs being taken out of service due to inoperative devices, by taking advantage of any overlapping functionality between similar transaction function devices in the ATM. For example, if the receipt printer becomes jammed or runs out of paper, the exemplary embodiment of the ATM is operatively programmed to use the statement printer to generate and dispense both statements and receipts for the consumer. Thus the receipt printer may be used as a fallback device for the statement printer and the statement printer may be used as a fallback device for the receipt printer. Although the statement printer and the receipt printer may use different sizes of paper, the exemplary ATM is operatively programmed to use different formats for printing information depending on the characteristics of the printer.

Other devices with overlapping functionality may be used in the same way. For example an ATM may include both a cash dispenser and a coin dispenser. If the cash dispenser becomes inoperative after running out of ten dollar bills, the coin dispenser may be used to dispense dollar coins until the ten dollar bills are replenished.

Figure 56:
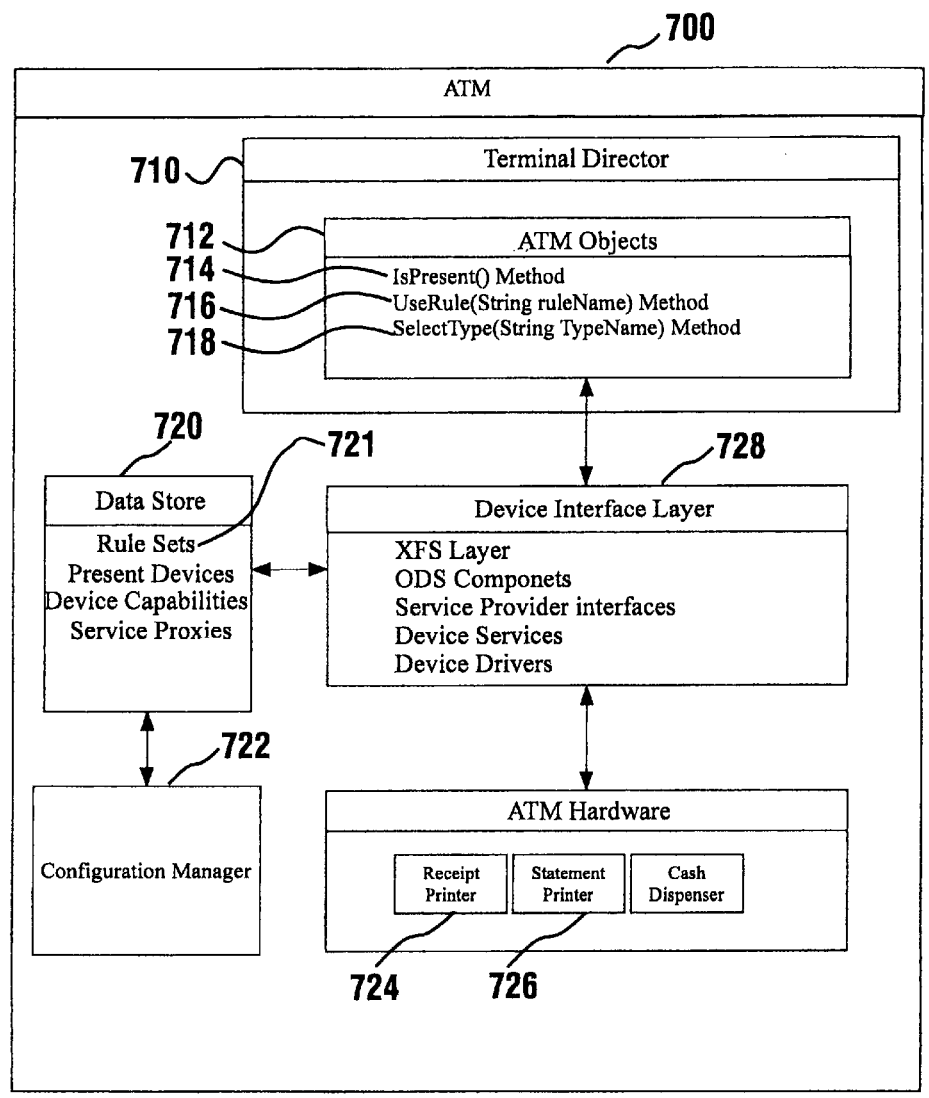
FIG. 56 is a schematic view representative of an exemplary ATM that enables ATM objects to determine the capabilities of devices and to specify rules for using fallback devices when an original device becomes inoperative.

FIG. 56 shows a schematic diagram of a programming architecture that is operative to achieve this exemplary fallback functionality. Here the ATM 700 includes a terminal director 710 comprised of a plurality of ATM objects 712 such as those discussed previously. In the exemplary embodiment the ATM objects 712 correspond to Java beans; however, in alternative exemplary embodiments other types of objects and classes may be used that are appropriate for the hardware and application software platform of the ATM including Active X and COMM objects.

In addition to the methods of the ATM objects discussed previously, each ATM object further includes a plurality of methods or functions related to the capabilities of the underlying devices 724 and 726. These methods include an is-present method 714, a use rule method 716, and a select type method 718. The select type method 718 is operative to specify which type of device the ATM object is associated therewith. For example, a printer object is operative to communicate with both a receipt printer 724 and a statement printer 726. The select type method 718 can be used to specify that a particular instance of the print ATM object corresponds to a receipt printer.

The is-present method 714 is operative to determine if the desired type of device is present in the ATM. This method enables a terminal application to be self configuring with respect to different types of transactions. For example, if an is-present method 714 returns a negative value for a statement printer, the terminal functionality that corresponds to printing statements can be hidden from the consumer. In this manner, the exemplary ATM objects are operative to determine the capabilities of the ATM objects and configure the operation of the ATM responsive to the determined capabilities.

In alternative embodiments of the present invention, methods may be used which include arguments for different types of features of the desired device or service. For example the is-present method or another capabilities method of a printer object could be passed an argument that corresponds to color printing. If colored inks are present, the printer object can be configured to print multicolored indicia. These exemplary methods enable a single generic type of ATM object such as a printer object, to support a plurality of specialized devices, such as a receipt printer, statement printer, thermal receipt printer, color printer, or any other printer device.

The use rule method 716 is operative to specify a set of rules for determining which device an ATM object will initially use, and which device will be used when the current or default device is inoperative. The exemplary embodiment of the present invention includes a data store 720 which is operative to store a plurality of such rules sets 721 for each of the devices in the ATM. For example the data store may include a default set of rules for a card reader object that specifies that if there is only one card reader device, a card reader object will be automatically connected thereto. If there is more than one printer device, a rule set can be created and used by a printer object that specifies that a receipt printer device is the default printer for receipts and a statement printer device is a fallback printer in cases where the receipt printer device is unavailable.

In the exemplary embodiment rule sets and their associated devices 724 can be created and saved in the data store 720 by a configuration program 722 in operative connection with the data store 720. Such a configuration program 722 is also operative to store which devices are currently installed in the ATM. The configuration program is further operative to store in the data store 720 specific features that are associated with each device. The results of the is-present method 714 can be determined by querying the data store 720 for the corresponding type of device and/or feature of the device.

In an alternative embodiment, where individual devices include self configuration features, such as Sun Microsystems JINI™ and Microsoft Universal Plug and Play™, individual devices 724 themselves may be operative to upload details of their features and/or corresponding service proxies to the data store 720.

The exemplary ATM 700 further includes a device interface layer 728. The exemplary device interface layer 728 may be comprised a plurality of ODS (Open Device Services). In addition the device interface layer 728 may be comprised of one or more device API layers such as a J/XFS (Java/eXtensions for Financial Services) kernel or a WOSA/XFS (Windows Open Services Architecture/eXtensions for Financial Services) manager. These components and layers of the device interface layer 728 are operative to provide an interface between the ATM objects 712 and corresponding hardware devices 724 and 726.

In one exemplary embodiment of the present invention, the ODS components and/or the XFS components are operatively programmed to provide an interface between the ATM objects 712 and the data store 720 for determining which devices and features of devices are present in the ATM. The device interface layer 728 is further operative to process rules in the data store 720 for determining default devices and the order of fallback devices. Responsive to the information associated with rules, present devices, and device capabilities stored in the data store 720, the device interface layer 728 is operative to have each ATM object 712 communicate with a device 724 that includes the appropriate capabilities required by the ATM object.

Figure 57:
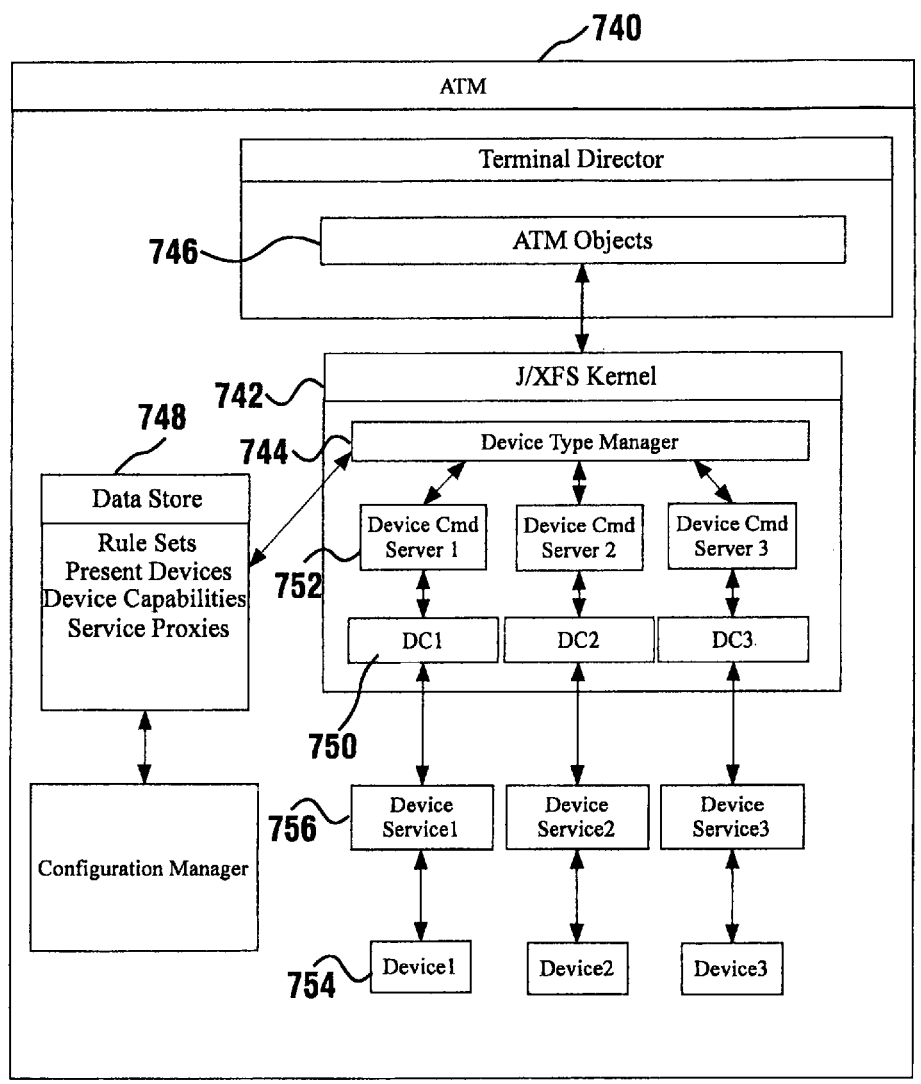
FIG. 57 is a schematic view representative of an alternative embodiment of an ATM that includes a modified J/XFS kernel for enabling ATM objects to determine the capabilities of devices and to specify rules for using fallback devices.

FIG. 57 shows an exemplary embodiment of an ATM 740 that includes a device interface layer comprised of an enhanced J/XFS kernel 742. The J/XFS kernel 742 includes a device type manager 744. The device type manager 744 is operative to communicate with a plurality of ATM objects 746 and create corresponding instances of device control 750 objects responsive to the rule sets selected by the ATM object. The rule sets are retrieved from a data store 748 in operative connection with the device type manager. The device controls 750 are operative to control the operation of ATM devices 754 through communication with device services 756 (i.e. device drivers) according to the J/XFS specification. The device controls 750 generally correspond to device services. Messages between the device type manager 744 and the device controls 750 are queued by device command servers 752 which generally correspond to the device controls 750.

The device type manager 744 routes messages to the correct device command server 752 responsive to the rule sets in the data store 748. The device type manager 744 is further responsive to a rule set to switch to the next appropriate device command server 752 if the health of one of the current devices 754 becomes inoperative.

Figure 58:
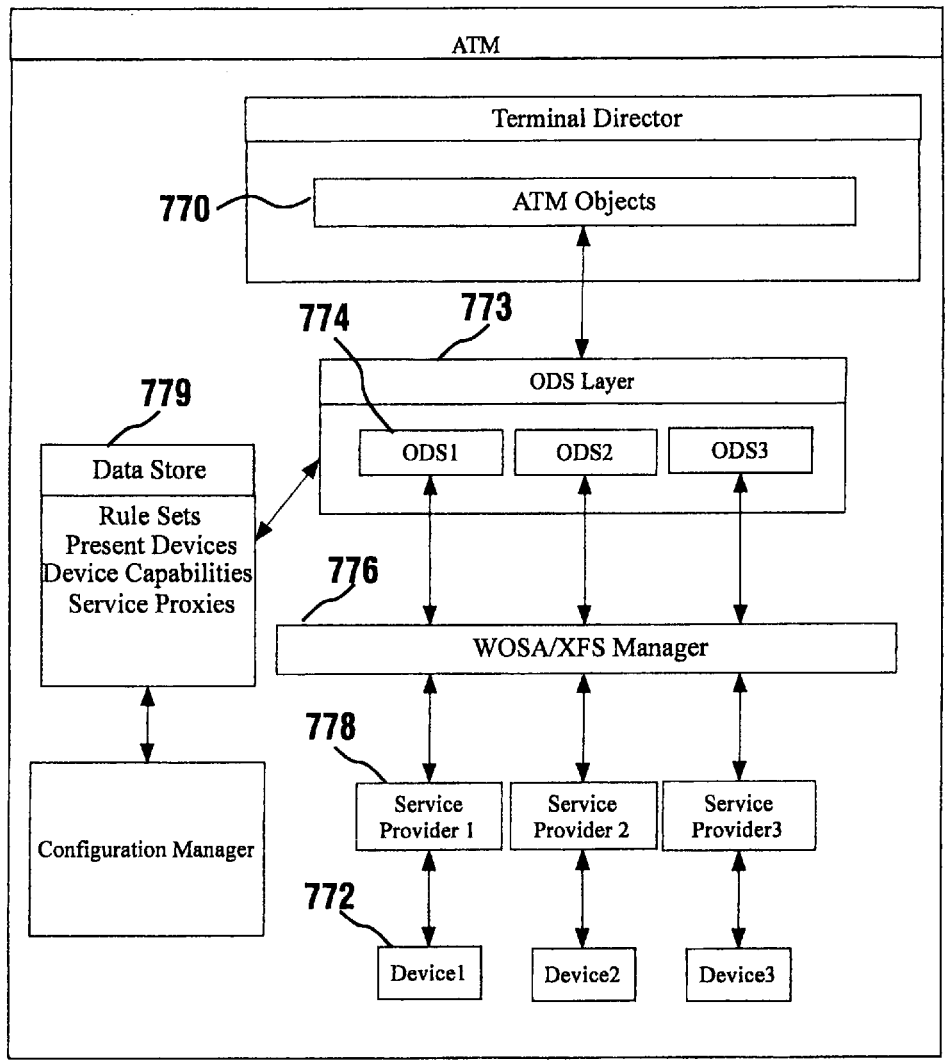
FIG. 58 is a schematic view representative of an alternative embodiment of an ATM that includes an enhanced ODS Layer for enabling ATM objects to determine the capabilities of devices and to specify rules for using fallback devices.

FIG. 58 shows another exemplary embodiment of the present invention. Here the ATM objects 770 are operative to control the operation of devices 772 through communication with ODS components 774. ODS components 774 are designed to abstract the differences between inconsistent vendor implementations of service provider interfaces 778 (i.e device drivers) beneath a consistent and uniform interface. In this described exemplary embodiment the ODS components 774 control the operation of the devices 772 through communication with a WOSA/XFS layer 776. The WOSA/XFS layer 776, in turn communicates with the devices 772 through the vendor provided service provider interfaces 778. In this described exemplary embodiment the ODS layer 773 has been enhanced to include the previously described functionality of the device interface layer. Thus the exemplary ODS components 774 are operative to communicate with the data store 779 to provide capability information to the ATM objects 770. The ODS components 774 are also operative to process rules sets for determining which service provider interfaces and devices are to be used initially and which are to be used as fallback devices when the default devices become inoperative.

Figure 59:
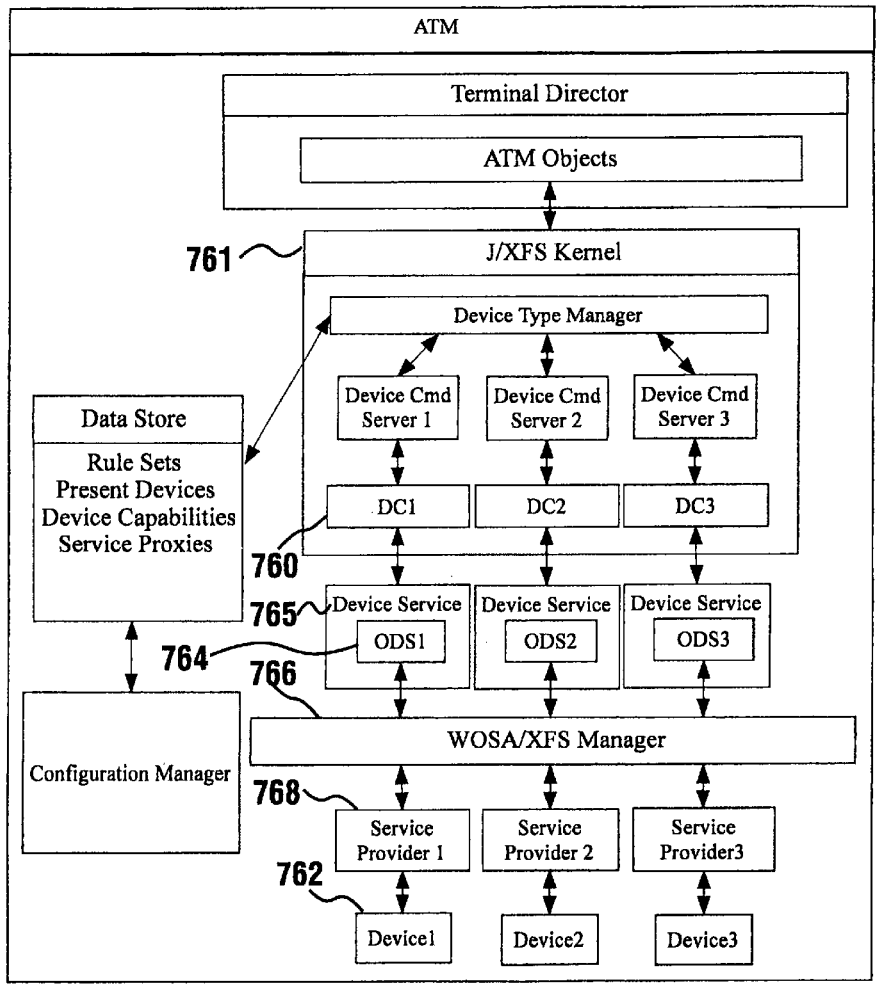
FIG. 59 is a schematic view representative of an alternative embodiment of an ATM that includes an ODS layer for providing an interface between a modified J/XFS kernel and a WOSA/XFS Manager.

FIG. 59 shows another exemplary embodiment of the present invention. Here the device controls 760 of the J/XFS layer 761 are operative to control the operation of devices 762 through communication with ODS components 764. As discussed previously the ODS components 764 control the operation of the devices 762 through communication with a WOSA/XFS manager 766. The WOSA/XFS manager communicates with the devices 762 through the vendor provided service provider interfaces 768. For ODS components that are comprised of C, C++, COMM, or other non-Java components, the present exemplary embodiment encompasses placing a JNI (Java Native Interface) wrapper around the ODS components 764 to form J/XFS compatible device services 765. The device services 765 provide an interface for the Java based J/XFS layer to communicate with the ODS components 764 and the windows based WOSA/XFS manager 766.

Computer software used in operating the automated transaction machines of the present invention and connected computers may be loaded from articles of various types into the respective computers. Such computer software may be included on and loaded from one or more articles such as diskettes or compact disks. Such software may also be included on articles such as hard disk drives, tapes or read-only memory devices. Other articles which include data representative of the instructions for operating computers in the manner described herein are suitable for use in achieving operation of transaction machines and systems in accordance with embodiments of the present invention.

The exemplary embodiments of the automated banking machines and systems described herein have been described with reference to particular software components and features. Other embodiments of the invention may include other or different software components which provide similar functionality.

Thus the new automated banking machine and system of the present invention achieves the above stated objectives, eliminates difficulties encountered in the use of prior devices and systems, solves problems and attains the desirable results described herein.

In the foregoing description certain terms have been used for brevity, clarity and understanding. However no unnecessary limitations are to be implied therefrom because such terms are for descriptive purposes and are intended to be broadly construed. Moreover the descriptions and illustrations herein are by way of examples and the invention is not limited to the details shown and described.

In the following claims any feature described as a means for performing a function shall be construed as encompassing any means known to those having skill in the art to be capable of performing the recited function and shall not be deemed limited to the particular means shown in the foregoing description or mere equivalents thereof.

Having described the features, discoveries and principles of the invention, the manner in which it is constructed and operated and the advantages and useful results attained; the new and useful structures, devices, elements, arrangements, parts, combinations, systems, equipment, operations, methods, processes and relationships are set forth in the appended claims.

We claim:

1. A method comprising:
 a) receiving with a reading device of an automated transaction machine, customer identification data from a machine customer,
  wherein the machine is affiliated with a transaction host;
 b) accessing a plurality of customer profile values that correspond to the customer identification data,
  wherein the customer profile values include a last withdrawal amount value representative of an amount of cash most recently withdrawn by the machine customer in a transaction involving the transaction host;
 c) displaying a markup language page in a browser with the automated transaction machine,
  wherein the page includes a plurality of selectable options for performing a transaction with the automated transaction machine,
   wherein a first selectable option of the selectable options corresponds to a dispensing of a first amount of cash equal to the last withdrawal amount value,
   wherein a second selectable option of the selectable options is associated with a dispensing of a second amount of cash having a value different from the last withdrawal amount value,
   wherein at least one of the selectable options is produced responsive at least in part to at least one of the accessed customer profile values;
 d) receiving customer input associated with either customer selection of the first selectable option or customer selection of the second selectable option,
  wherein received customer input associated with customer selection of the first selectable option is adapted to cause the first amount of cash to be dispensed,
  wherein received customer input associated with customer selection of the second selectable option is adapted to both cause the second amount of cash to be dispensed, and cause the last withdrawal amount value included in the customer profile values to be changed to the value of the second amount of cash;

e) dispensing with a cash dispenser device of the machine, an amount of cash corresponding to the customer input received in step (d); and f) updating the last withdrawal amount value included in the customer profile values to reflect a value that corresponds to the amount of cash dispensed in step (e).

2. The method according to claim 1 and further comprising g) receiving with the machine, information based on the customer identification data received in step (a);

h) operating the machine to generate a customized advertisement based on the information received in step (g);

i) operating the machine to present the customized advertisement to the customer.

3. The method according to claim 2 and further comprising j) updating marketing information included in the customer profile values to reflect that the customized advertisement was presented to the customer.

4. The method according to claim 1 and further comprising g) operating the machine to present a targeted advertisement to the customer, wherein the targeted advertisement is based on the customer selection received in step (d).

5. The method according to claim 1 and further comprising g) operating the machine to present a targeted advertisement to the customer, wherein the targeted advertisement is based on a particular transaction device of the machine which is required to be used in carrying out the customer selection received in step (d).

6. At least one article including computer executable instructions configured to cause at least one computer to carry out a method comprising:

(a) receiving with a reading device of an automated transaction machine, customer identification data from a machine customer, wherein the machine is affiliated with a transaction host;

(b) accessing a plurality of customer profile values that correspond to the customer identification data, wherein the customer profile values include a last withdrawal amount value representative of an amount of cash most recently withdrawn by the machine customer in a transaction involving the transaction host;

(c) displaying a markup language page in a browser with the automated transaction machine, wherein the page includes a plurality of selectable options for performing a transaction with the automated transaction machine, wherein a first selectable option of the selectable options corresponds to a dispensing of a first amount of cash equal to the last withdrawal amount value, wherein a second selectable option of the selectable options is associated with a dispensing of a second amount of cash having a value different from the last withdrawal amount value, wherein at least one of the selectable options is produced responsive at least in part to at least one of the accessed customer profile values;

(d) receiving customer input associated with either customer selection of the first selectable option or customer selection of the second selectable option, wherein received customer input associated with customer selection of the first selectable option is adapted to cause the first amount of cash to be dispensed, wherein received customer input associated with customer selection of the second selectable option is adapted to both cause the second amount of cash to be dispensed, and cause the last withdrawal amount value included in the customer profile values to be changed to the value of the second amount of cash;

(e) dispensing with a cash dispenser device of the machine, an amount of cash corresponding to the customer input received in (d); and (f) updating the last withdrawal amount value included in the customer profile values to reflect a value that corresponds to the amount of cash dispensed in (e).

7. The at least one article according to claim 6 and further comprising (g) receiving with the machine, information based on the customer identification data received in (a);

(h) operating the machine to generate a customized advertisement based on the information received in (g);

(i) operating the machine to present the customized advertisement to the customer.

8. The at least one article according to claim 7 and further comprising (j) updating marketing information included in the customer profile values to reflect that the customized advertisement was presented to the customer.

9. The at least one article according to claim 6 and further comprising (g) operating the machine to present a targeted advertisement to the customer, wherein the targeted advertisement is based on the customer selection received in (d).

10. The at least one article according to claim 6 and further comprising (g) operating the machine to present a targeted advertisement to the customer, wherein the targeted advertisement is based on a particular transaction device of the machine which is required to be used in carrying out the customer selection received in (d).

* * * * *